United States Patent
Severson et al.

(10) Patent No.: US 12,126,223 B2
(45) Date of Patent: Oct. 22, 2024

(54) BEARINGLESS ELECTRICAL MACHINES WITH REDUCED NUMBER OF INVERTERS

(71) Applicant: Wisconsin Alumni Research Foundation, Madison, WI (US)

(72) Inventors: Eric Loren Severson, Middleton, WI (US); Zhouzhou Wang, Fitchburg, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 387 days.

(21) Appl. No.: 17/734,519

(22) Filed: May 2, 2022

(65) Prior Publication Data

US 2023/0352997 A1 Nov. 2, 2023

(51) Int. Cl.
*H02K 1/2796* (2022.01)
*H02K 3/28* (2006.01)
*H02K 7/09* (2006.01)

(52) U.S. Cl.
CPC ............ *H02K 1/2796* (2022.01); *H02K 3/28* (2013.01); *H02K 7/09* (2013.01)

(58) Field of Classification Search
CPC .......... H02K 1/2796; H02K 3/28; H02K 7/09
See application file for complete search history.

(56) References Cited

U.S. PATENT DOCUMENTS

2010/0033046 A1* 2/2010 Chiba ................. F16C 32/0459
310/90.5

FOREIGN PATENT DOCUMENTS

CN 112436695 A * 3/2021 ............ H02K 1/146

OTHER PUBLICATIONS

CN-112436695-A_translate (Year: 2021).*
M.Kaliamoorthy. "3.1 Voltage Source Inverters." Associate Professor. PSNACET. http://kaliasgoldmedal.yolasite.com/resources/peres/vsi.pdf, Printed on Mar. 25, 2022. pp. 1-7.
Farhan, Ashad, et al. "Design of an ultra-high speed bearingless motor for significant rated power." *2020 IEEE Energy Conversion Congress and Exposition (ECCE)*. IEEE, 2020.
Severson, Eric, Srikant Gandikota, and Ned Mohan. "Practical implementation of dual purpose No. voltage drives for bearingless motors." *2015 IEEE Applied Power Electronics Conference and Exposition (APEC)*. IEEE, 2015.
M.Kaliamoorthy. "3.1 Voltage Source Inverters." Associate Professor. PSNACET. pp. 1-7.

* cited by examiner

*Primary Examiner* — Tulsidas C Patel
*Assistant Examiner* — Mohammed Ahmed Qureshi
(74) *Attorney, Agent, or Firm* — Bell & Manning, LLC

(57) ABSTRACT

A machine system includes a shaft, a first rotor, a first stator, a second rotor, a second stator, a first, first-phase coil and a second, first-phase coil of a first stator winding, a first, second-phase coil and a second, second-phase coil of a second stator winding, and a first, third-phase coil and a second, third-phase coil of a third stator winding wound about the first stator, a first, first-phase coil and a second, first-phase coil of a fourth stator winding, a first, second-phase coil and a second, second-phase coil of a fifth stator winding, and a first, third-phase coil and a second, third-phase coil of a sixth stator winding wound about the second stator, and an inverter drive system. The stator windings are configured to provide a torque and a suspension force under control of an inverter drive system consisting of only three inverters.

20 Claims, 36 Drawing Sheets

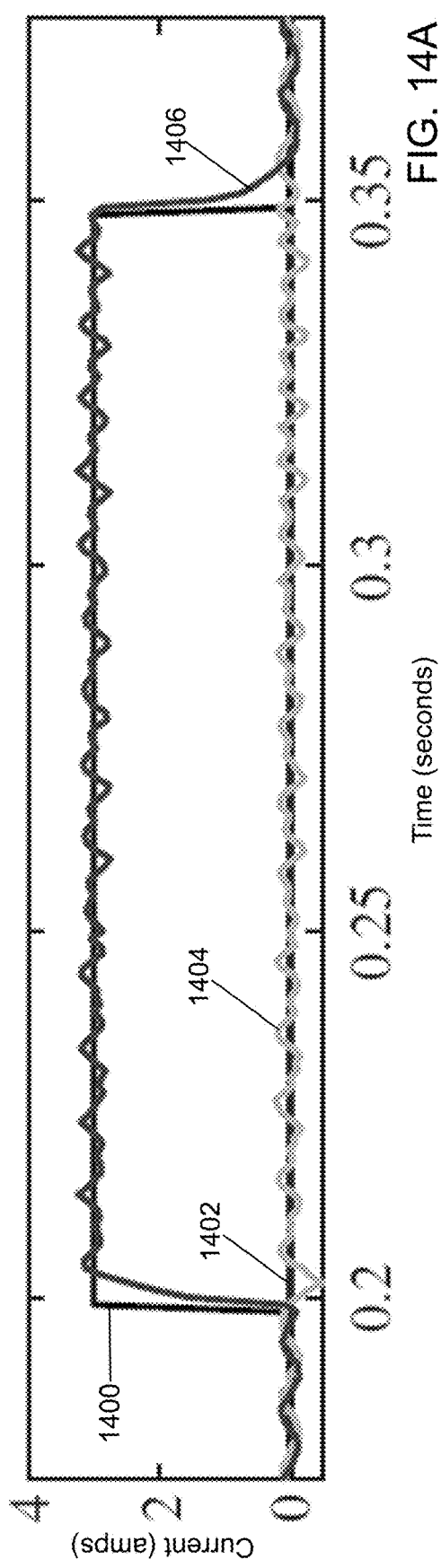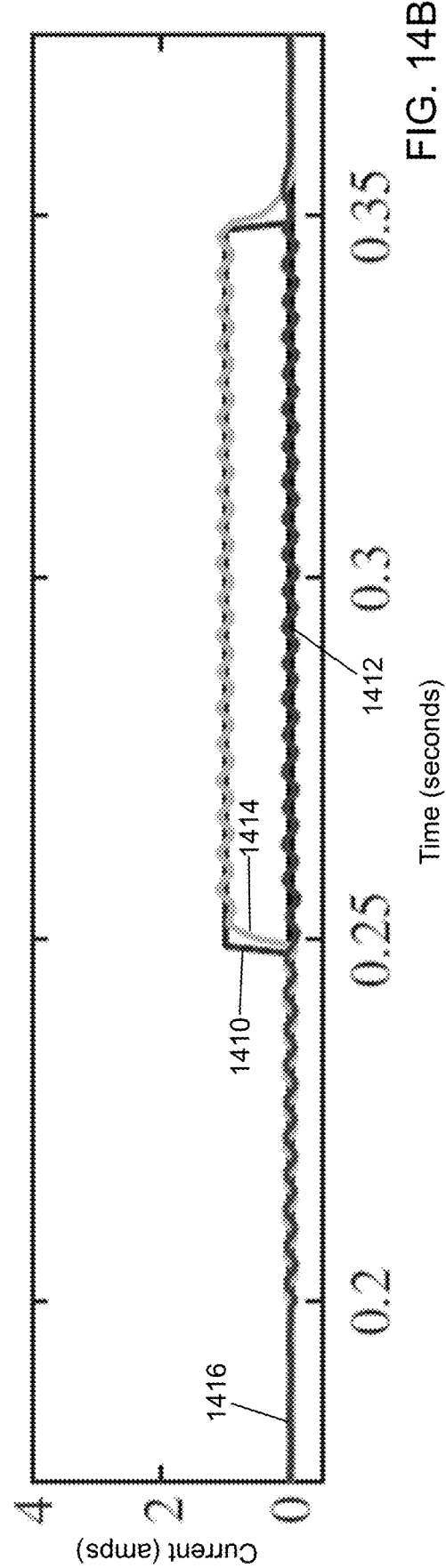

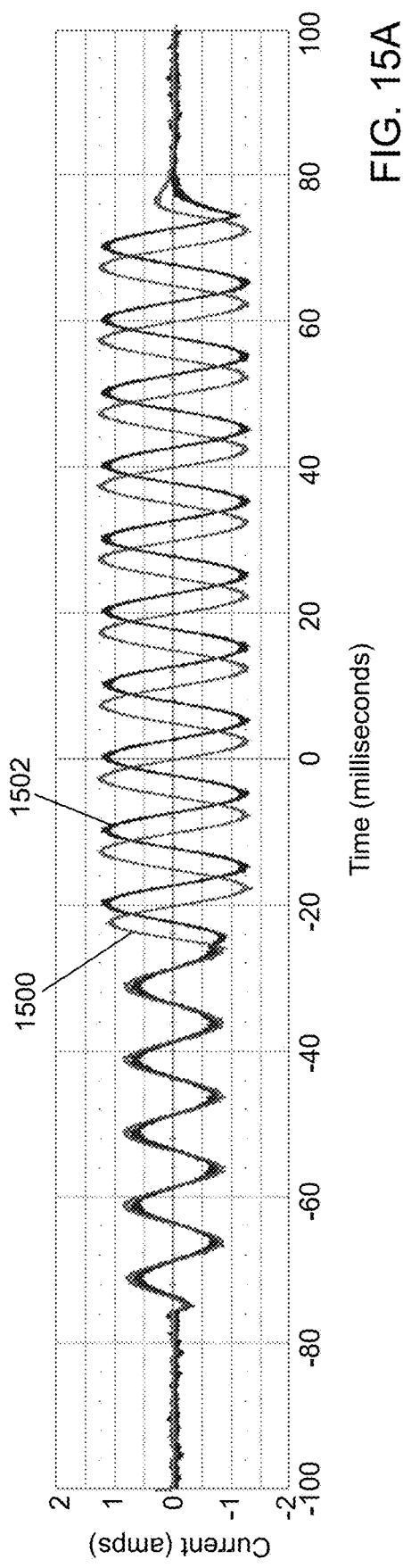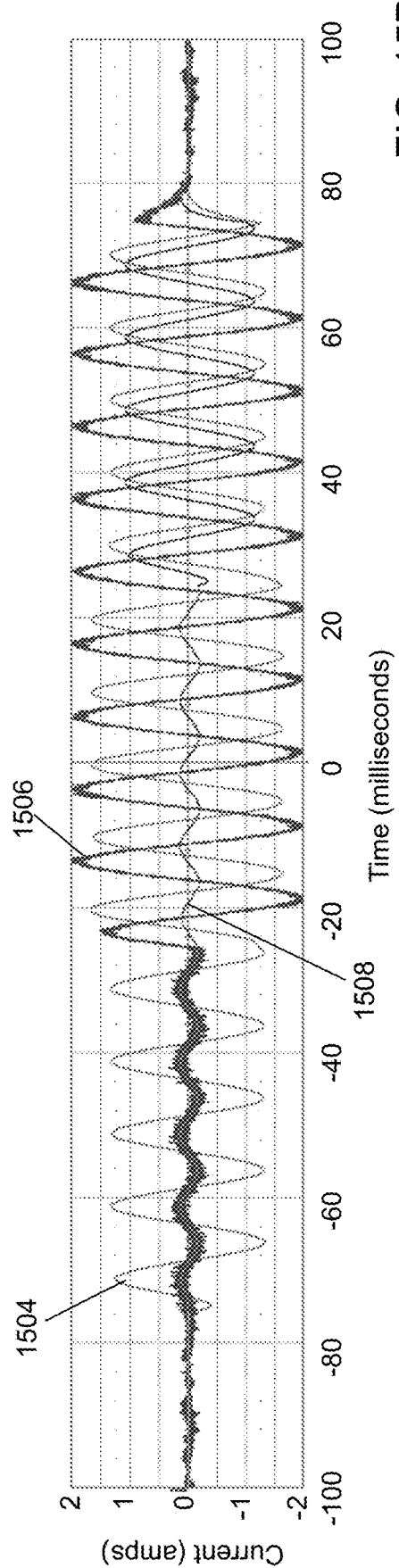

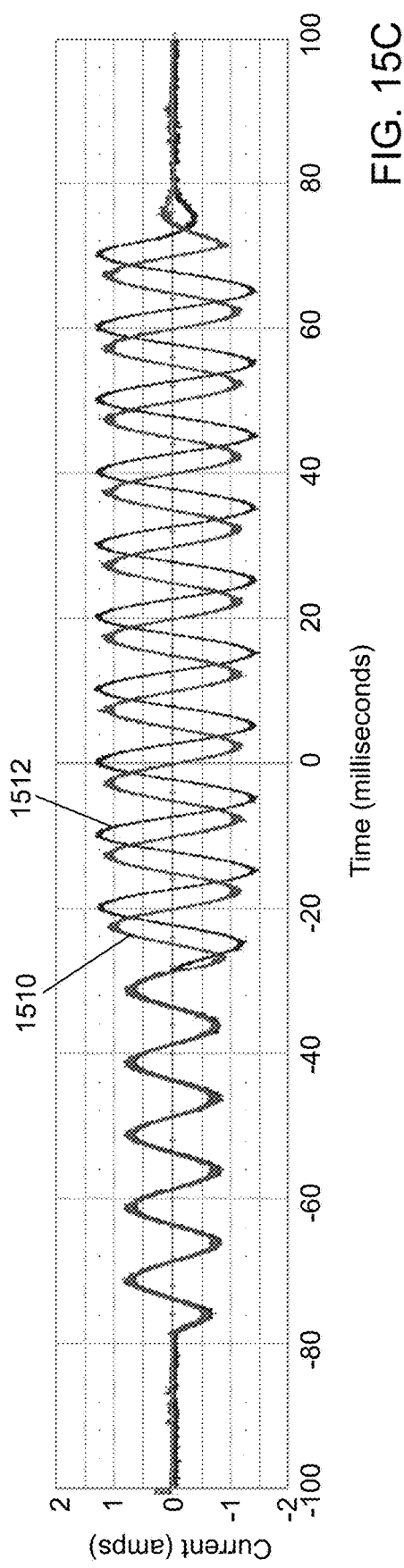
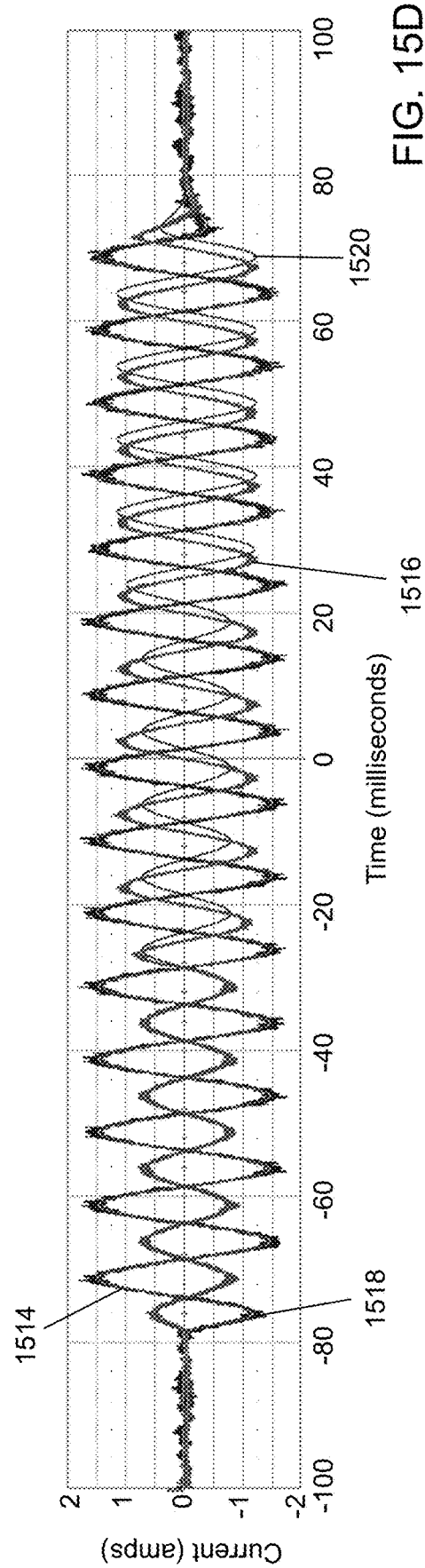

BEARINGLESS ELECTRICAL MACHINES WITH REDUCED NUMBER OF INVERTERS

BACKGROUND

Bearingless motors provide the functionality of a magnetic bearing and a motor in a single electric machine. Compared to systems that utilize a motor with separate magnetic bearings, bearingless technology results in a more integrated system that requires less raw material and can be designed for higher speeds due to shorter shaft lengths. Applications range from low speed, hygienic mixing devices, pumps, and artificial hearts to high and ultra-high speed machines for flywheels, spindle tools, and turbomachinery, etc. Bearingless motors have been widely developed as both asynchronous and synchronous motors, such as permanent magnet, synchronous reluctance, induction, consequent pole, and ac homopolar motors.

Using combined windings, the same stator coils are used for both torque and force creation. The combined winding allows the bearingless drive to dynamically allocate the stator's ampere turns to create force or torque based on real-time operating requirements. This facilitates better stator current utilization. Of the various combined winding approaches, multiphase (MP) and dual purpose no voltage (DPNV) windings are recognized as high performance solutions because of their ability to independently actuate torque, field weakening, and suspension force. Unfortunately, combined windings have been shown to increase the complexity and therefore, the cost of the power electronics required for bearingless motors.

SUMMARY

In an example embodiment, a bearingless electrical machine system is provided that includes, but is not limited to, a shaft, a first rotor mounted to rotate with the shaft, a first stator, a second rotor mounted to rotate with the shaft, a second stator, a first, first-phase coil and a second, first-phase coil of a first stator winding wound about the first stator, a first, second-phase coil and a second, second-phase coil of a second stator winding wound about the first stator, a first, third-phase coil and a second, third-phase coil of a third stator winding wound about the first stator, a first, first-phase coil and a second, first-phase coil of a fourth stator winding wound about the second stator, a first, second-phase coil and a second, second-phase coil of a fifth stator winding wound about the second stator, a first, third-phase coil and a second, third-phase coil of a sixth stator winding wound about the second stator, and an inverter drive system. The first stator is mounted on a side of the first rotor separated by a first air gap between a surface of the first rotor and a surface of the first stator. The second stator is mounted on a side of the second rotor separated by a second air gap between a surface of the second rotor and a surface of the second stator. The first stator winding is configured to provide a torque and a suspension force relative to the shaft when current is provided to the first stator winding. The second stator winding is configured to provide the torque and the suspension force relative to the shaft when current is provided to the second stator winding. The third stator winding is configured to provide the torque and the suspension force relative to the shaft when current is provided to the third stator winding. The fourth stator winding is configured to provide the torque and the suspension force relative to the shaft when current is provided to the fourth stator winding. The fifth stator winding is configured to provide the torque and the suspension force relative to the shaft when current is provided to the fifth stator winding. The sixth stator winding is configured to provide the torque and the suspension force relative to the shaft when current is provided to the sixth stator winding. The inverter drive system consists of only a first inverter, a second inverter, and a third inverter. Each inverter of the inverter drive system comprises a first connection for a first-phase, a second connection for a second-phase, and a third connection for a third-phase. Each first-phase coil is connected to the first connection of the first inverter, the second inverter, or the third inverter. Each second-phase coil is connected to the second connection of the first inverter, the second inverter, or the third inverter. Each third-phase coil is connected to the third connection of the first inverter, the second inverter, or the third inverter.

Other principal features of the disclosed subject matter will become apparent to those skilled in the art upon review of the drawings described below, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 14A shows torque currents generated using the winding configuration of FIG. 4A in accordance with an illustrative embodiment.

FIG. 14B shows first suspension force currents generated using the winding configuration of FIG. 4A in accordance with an illustrative embodiment.

FIG. 15A shows phase currents generated using the winding configuration of FIG. 4A in accordance with an illustrative embodiment.

FIG. 15B shows output inverter currents generated using the winding configuration of FIG. 4A in accordance with an illustrative embodiment.

FIG. 15C shows phase currents generated using a parallel DPNV combined winding configuration with four inverters in accordance with an illustrative embodiment.

FIG. 15D shows output inverter currents generated using the parallel DPNV combined winding configuration with four inverters in accordance with an illustrative embodiment.

DETAILED DESCRIPTION

Figure 1:
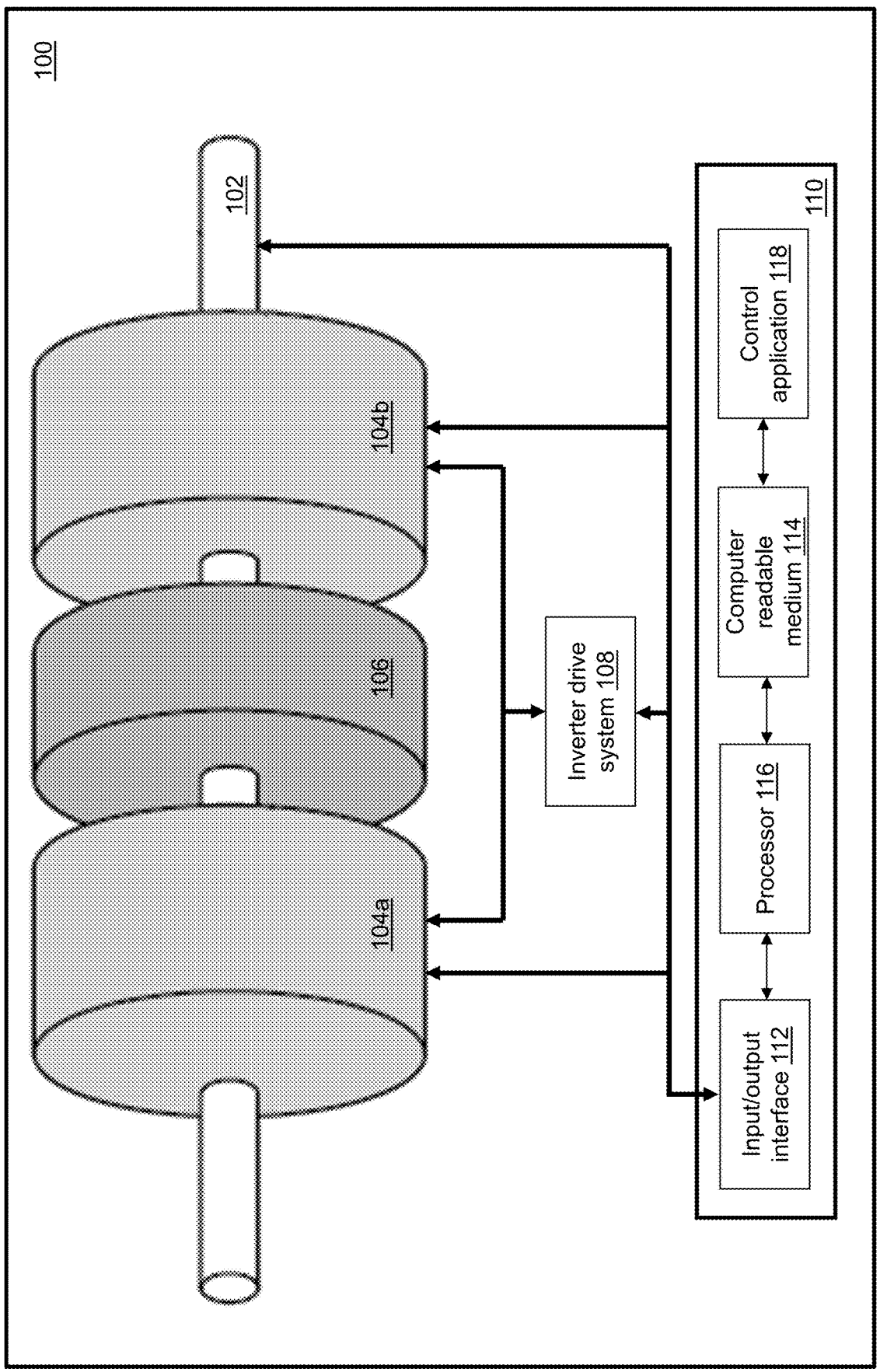
FIG. 1 depicts a diagram of a twin bearingless machine system in accordance with an illustrative embodiment.

Referring to FIG. 1, a twin bearingless machine system 100 is shown in accordance with an illustrative embodiment. By relying on a first bearingless machine 104a and a second bearingless machine 104b for tilting and radial force control, twin bearingless machine system 100 includes only a single axial magnetic bearing 106. An inverter drive system 108 includes three inverters to control first bearingless machine 104a and second bearingless machine 104b instead of the typical four inverters resulting in a significant decrease in cost. First bearingless machine 104a, second bearingless machine 104b, and axial magnetic bearing 106 are mounted to a shaft 102 for simultaneous rotation with shaft 102. When twin bearingless machine system 100 is operated as a generator, shaft 102 is rotated under control of an external force to generate electricity. When twin bearingless machine system 100 is operated as a motor, shaft 102 is rotated under control of inverter drive system 108.

Controller 110 determines and sends control signals to inverter drive system 108. Controller 110 may include an input/output (I/O) interface 112, a non-transitory computer-readable medium 114, a processor 116, and a control application 118. Fewer, different, and/or additional components may be incorporated into controller 110.

I/O interface 112 provides an interface for receiving and/or for outputting information from/to the user or another device for entry into controller 110 or output from controller 110 as understood by those skilled in the art. I/O interface 112 may interface with various I/O technologies including, but not limited to, a keyboard, a mouse, a display, a track ball, a keypad, one or more buttons, an Ethernet port, a Bluetooth antenna, etc. to allow the user or another device to provide or receive information to/from controller 110. I/O interface 112 may receive and/or transmit data or other electrical signals between devices using various protocols, transmission technologies, and media as understood by those skilled in the art. I/O interface 112 may support communication using various transmission media that may be wired and/or wireless. Controller 110 may have one or more I/O interfaces that use the same or a different I/O interface technology.

Computer-readable medium 114 is an electronic holding place or storage for information so the information can be accessed by processor 116 as understood by those skilled in the art. Computer-readable medium 114 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Controller 110 may have one or more computer-readable media that use the same or a different memory media technology. For example, computer-readable medium 114 may include different types of computer-readable media that may be organized hierarchically to provide efficient access to the data stored therein as understood by a person of skill in the art.

Processor 116 executes instructions as understood by those skilled in the art. The instructions may be carried out by a special purpose computer, logic circuits, or hardware circuits. Processor 116 may be implemented in hardware and/or firmware. Processor 116 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 116 operably couples with I/O interface 112 to receive and to send information and with computer-readable medium 114 to process information. Processor 116 may retrieve a set of instructions from a permanent memory device and copy the instructions in an executable form to a temporary memory device that is generally some form of RAM. Controller 110 may include a plurality of processors that use the same or a different processing technology.

Control application 118 performs operations associated with receiving sensor signals such as current sensor data and computing gate signals for input to inverter drive system 108. The operations may be implemented using hardware, firmware, software, or any combination of these methods.

Referring to the example embodiment of FIG. 1, control application 118 is implemented in software (comprised of computer-readable and/or computer-executable instructions) stored in computer-readable medium 114 and accessible by processor 116 for execution of the instructions that embody the operations of control application 118. Control application 118 may be written using one or more programming languages, assembly languages, scripting languages, etc. Control application 118 may be integrated with other analytic tools.

Twin bearingless machine system 100 may include first bearingless machine 104a and second bearingless machine 104b that each use a multiphase (MP) and/or a parallel DPNV combined winding to independently control torque, field weakening, and force with a minimum number of drive phases. While the literature typically treats combined winding as two distinct windings, both the MP and parallel DPNV winding configurations actually use the same machine winding layout, albeit with different drive connections, and therefore are fundamentally the same winding technology.

For illustration, first bearingless machine 104*a* and second bearingless machine 104*b* may each be implemented as a bearingless machine as described in a paper titled *Design of an Ultra-High Speed Bearingless Motor for Significant Rated Power* by Ashad Farhan et al., IEEE Energy Conversion Congress and Exposition pages 246-253 (Oct. 11, 2020). For further illustration, first bearingless machine 104*a* and second bearingless machine 104*b* may each be implemented as a bearingless machine as described in a paper titled *Practical Implementation of Dual-Purpose No-Voltage Drives for Bearingless Motors* by Eric Severson et al., IEEE TRANSACTIONS ON INDUSTRY APPLICATIONS, VOL. 52, NO. 2, MARCH/APRIL 2016. For still further illustration, first bearingless machine 104*a* and second bearingless machine 104*b* may each be implemented as a bearingless machine as described in U.S. Patent Publication No. 2021/0184550 titled ROTOR WINDING WITH A NEUTRAL PLATE FOR A BEARINGLESS INDUCTION MACHINE and published Jun. 17, 2021.

Figure 11:
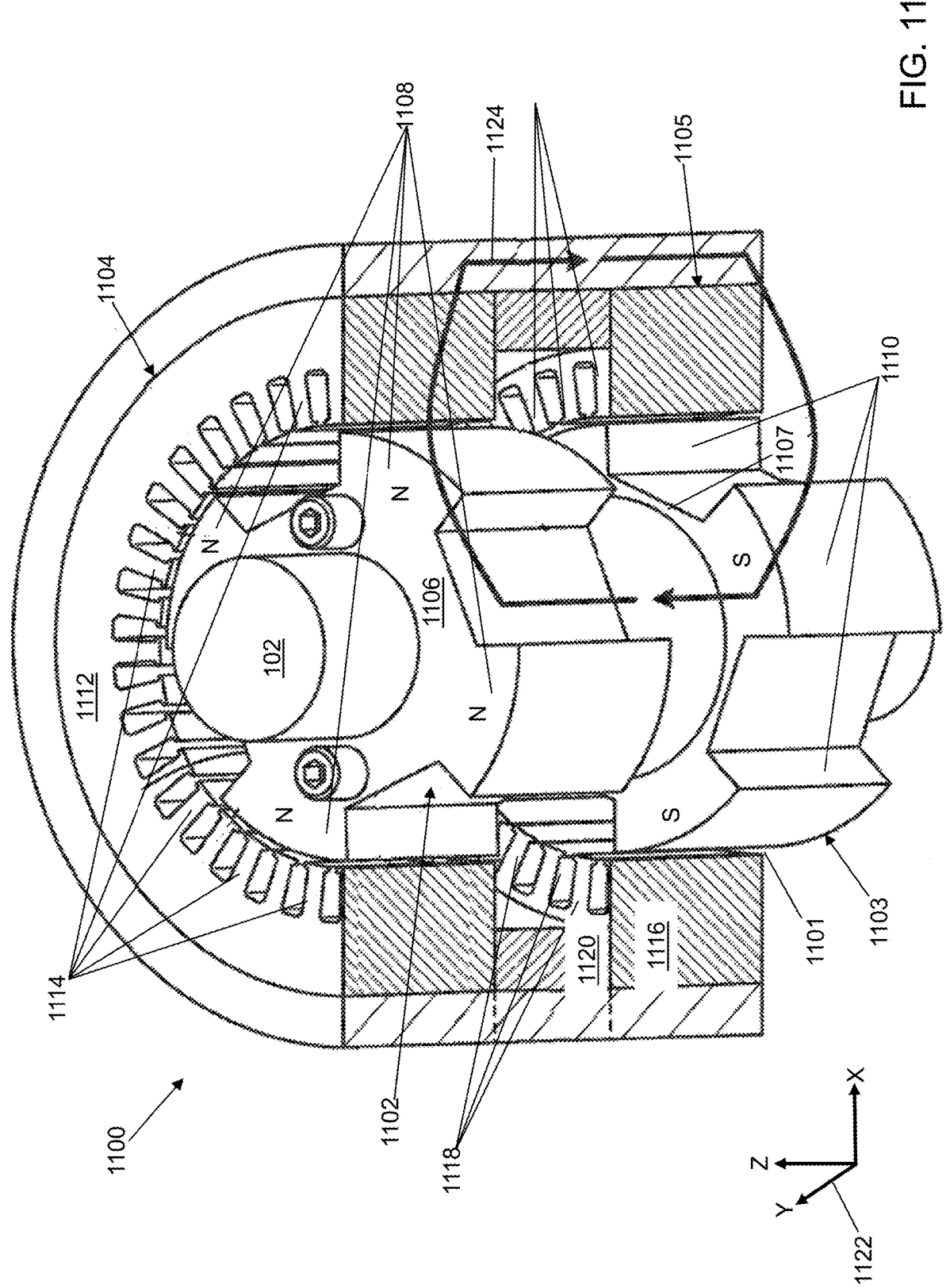
FIG. 11 depicts a front perspective view of a radial flux machine in accordance with an illustrative embodiment.
Figure 12:
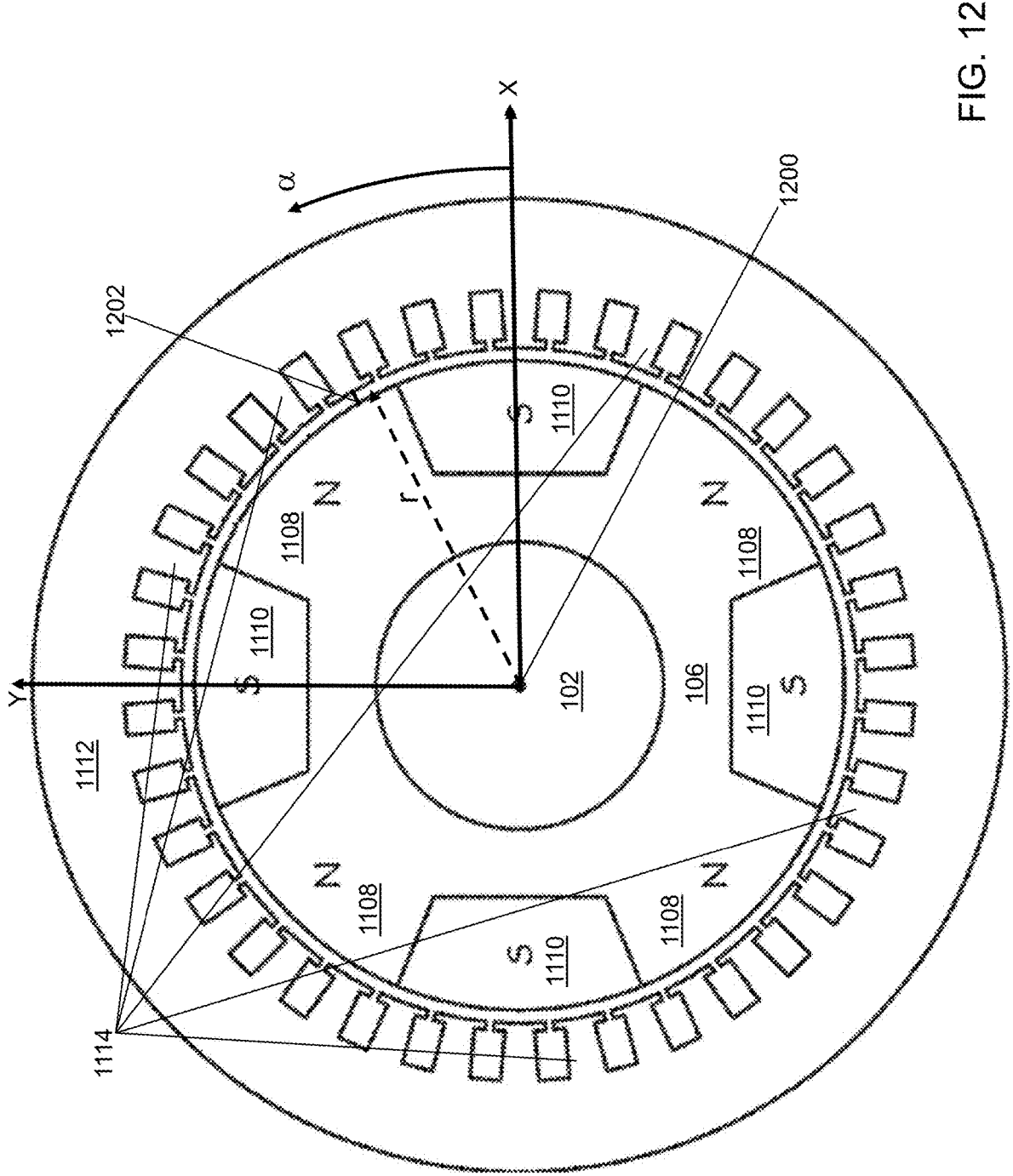
FIG. 12 depicts a top view of the radial flux machine of FIG. 11 in accordance with an illustrative embodiment.
Figure 13:
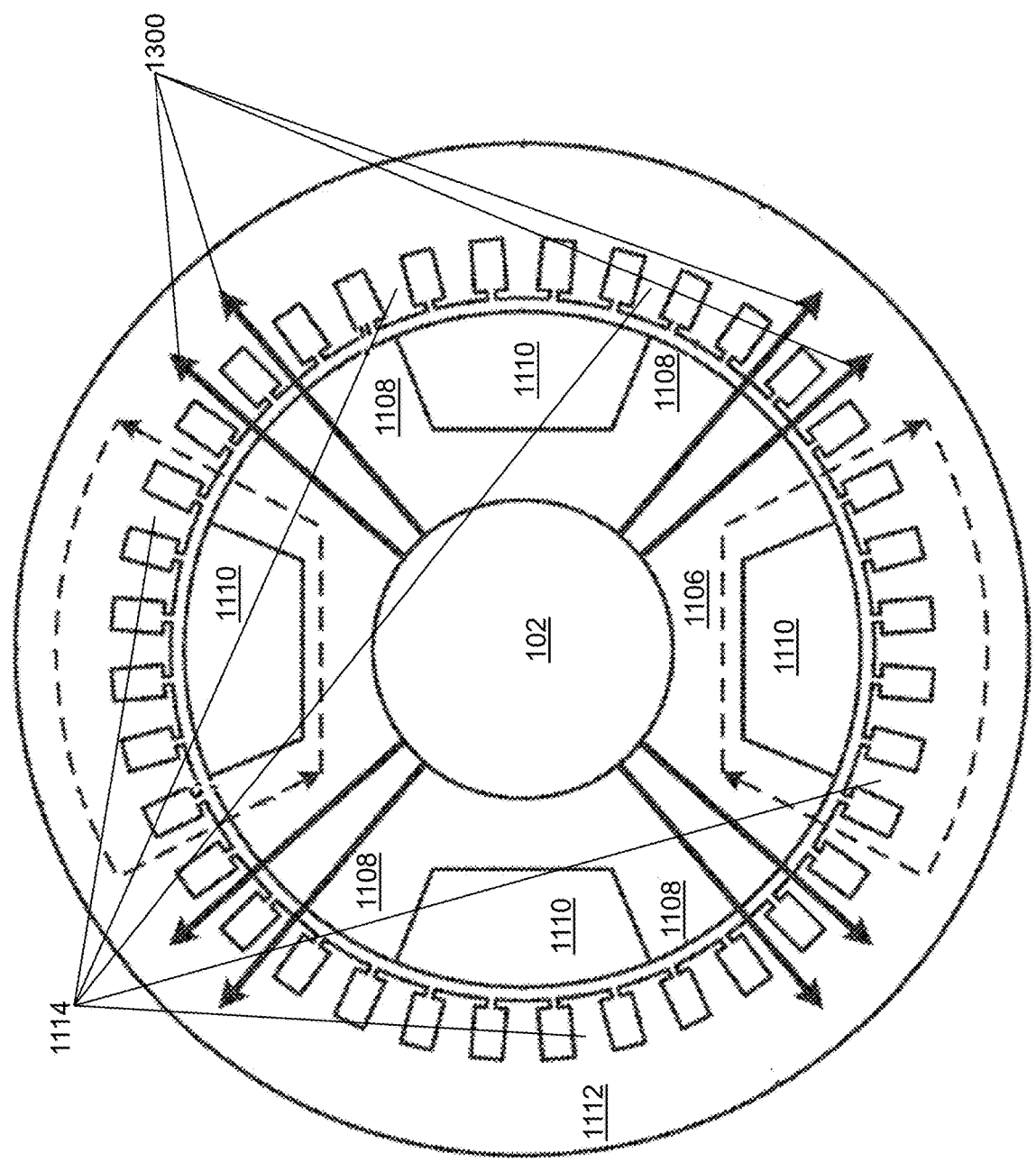
FIG. 13 depicts the top view of the radial flux machine of FIG. 12 showing force fields in accordance with an illustrative embodiment.

Referring to FIG. 11, a front perspective view of a radial flux machine 1100 is shown in accordance with an illustrative embodiment. Referring to FIG. 12, a top view of radial flux machine 1100 is shown in accordance with an illustrative embodiment. Referring to FIG. 13, the top view of radial flux machine 1100 showing a radial force is shown in accordance with an illustrative embodiment. Radial flux machine 1100 can be implemented as any type of radial flux machine such as a permanent magnet (PM) machine, a synchronous reluctance machine, an induction machine, a consequent-pole machine, an alternating current (AC) homopolar machine, etc. In the illustrative embodiment of FIG. 11, radial flux machine 1100 is an AC homopolar bearingless motor.

In an illustrative embodiment, radial flux machine 1100 forms an AC homopolar machine that may include a top rotor 1102, a bottom rotor 1103, a top stator 1104, a bottom stator 1105, a field winding 1120, and shaft 102. Merely for illustration, first bearingless machine 104*a* and second bearingless machine 104*b* may be implemented as radial flux machine 1100. Thus, twin bearingless machine system 100 may be a single radial flux machine 1100 that forms first bearingless machine 104*a* and second bearingless machine 104*b* because it includes top rotor 1102 mounted adjacent top stator 1104 and bottom rotor 1103 mounted adjacent bottom stator 1105 that form two bearingless machines.

Top rotor 1102 is positioned radially interior of top stator 1104 separated by a top air gap 1202 that varies circumferentially around top rotor 1102 based on a location of poles of top rotor 1102. Similarly, bottom rotor 1103 is positioned radially interior of bottom stator 1105 separated by a bottom air gap 1101. In the illustrative embodiment of FIG. 11, top rotor 1102 and bottom rotor 1103 are mounted interior of top stator 1104 and bottom stator 1105, respectively, though top stator 1104 and bottom stator 1105 could instead be mounted interior of top rotor 1102 and bottom rotor 1103 in an alternative embodiment. Top stator 1104, bottom stator 1105, and shaft 102 have generally circular cross sections as shown with reference to FIG. 11. In alternative embodiments, radial flux machine 1100 can include a fewer or a greater number of stators and rotors depending on the machine type.

Top rotor 1102 and bottom rotor 1103 are mounted to shaft 102 for rotation with shaft 102. When radial flux machine 1100 is operating as a motor, electrical energy provided to top stator 1104 and to bottom stator 1105 rotates top rotor 1102 and bottom rotor 1103, and thereby shaft 102. When radial flux machine 1100 is operating as a generator, shaft 102 is rotated to generate electrical energy from stator windings of top stator 1104 and bottom stator 1105.

Top stator 1104 and bottom stator 1105 may be formed of a ferromagnetic material such as iron, cobalt, nickel, etc. Top stator 1104 may include a top stator core 1112 and a top plurality of teeth 1114. In the illustrative embodiment, the top plurality of teeth 1114 extend from top stator core 1112 towards a center 1200 of an interior of shaft 102. Top stator slots are formed between successive pairs of the top plurality of teeth 1114. In the illustrative embodiment, the top plurality of teeth 1114 of top stator 1104 includes 36 teeth that define 36 stator slots.

Bottom stator 1105 may include a bottom stator core 1116 and a bottom plurality of teeth 1118. In the illustrative embodiment, the bottom plurality of teeth 1118 extend from bottom stator core 1116 towards center 1200 of the interior of shaft 102. Bottom stator slots are formed between successive pairs of the bottom plurality of teeth 1118. In the illustrative embodiment, the bottom plurality of teeth 1118 of bottom stator 1105 includes 36 teeth that define 36 stator slots.

As understood by a person of skill in the art, top stator 1104 and bottom stator 1105 may be formed of laminations mounted closely together and stacked in a z-direction indicated by a z-axis and cut to define a shape and a size of top stator core 1112 and the top plurality of teeth 1114 and of bottom stator core 1116 and the bottom plurality of teeth 1118. An x-axis is perpendicular to a y-axis, and both the x-axis and the y-axis are perpendicular to the z-axis to form a right-handed coordinate reference frame denoted x-y-z frame 1122. The x-y plane defines a cross section of radial flux machine 1100 and the z-axis defines a height of radial flux machine 1100.

The top plurality of teeth 1114 and the bottom plurality of teeth 1118 extend from top stator core 1112 and from bottom stator core 1116 at equal angular intervals and have a common arc length dimension. Each tooth of the top plurality of teeth 1114 and of the bottom plurality of teeth 1118 may generally form a "T" shape though other shapes may be used in alternative embodiments.

Top rotor 1102 may be formed of a ferromagnetic material such as iron, cobalt, nickel, etc. Top rotor 1102 may include a top rotor core 1106 and a plurality of top rotor pole pieces 1108 mounted exterior of top rotor core 1106. In the illustrative embodiment, the top rotor pole pieces 1108 extend outward from top rotor core 1106 toward the top plurality of teeth 1114 of top stator 1104. As understood by a person of skill in the art, top rotor 1102 may be formed of laminations mounted closely together and stacked in the z-direction.

Bottom rotor 1103 may be formed of a ferromagnetic material such as iron, cobalt, nickel, etc. Bottom rotor 1103 may include a bottom rotor core 1107 and a plurality of bottom rotor pole pieces 1110 mounted exterior of bottom rotor core 1107. In the illustrative embodiment, the bottom rotor pole pieces 1110 extend outward from bottom rotor core 1107 toward the bottom plurality of teeth 1118 of bottom stator 1105. As understood by a person of skill in the art, bottom rotor 1103 may be formed of laminations mounted closely together and stacked in the z-direction.

In the illustrative embodiment, the plurality of top rotor pole pieces 1108 and the plurality of bottom rotor pole pieces 1110 have a generally polygonal shape with a curved exterior surface adjacent top stator 1104 and bottom stator 1105, respectively, though the plurality of top rotor pole pieces 1108 and the plurality of bottom rotor pole pieces 1110 may have various shapes based on a type of electrical machine of radial flux machine as understood by a person of skill in the art. In the illustrative embodiment, the plurality of top rotor pole pieces 1108 and the plurality of bottom rotor pole pieces 1110 each include four pole pieces though a fewer or a greater number of pole pieces may be formed to extend from top rotor core 1106 and from bottom rotor core 1107, respectively, in alternative embodiments. The plurality of top rotor pole pieces 1108 and the plurality of bottom rotor pole pieces 1110 include at least two pole pieces.

Field winding 1120, or permanent magnets in alternative embodiments, creates a magnetization indicated by a north (N) and a south (S) pole indicator for top rotor 1102 and for bottom rotor 1103. Field winding 1120, or the permanent magnets, create a magnetomotive force resulting in flux that flows along a flux path 1124 shown at an instant in time as top rotor 1102 and bottom rotor 1103 rotate about the z-axis defined through center 200.

Stator windings (not shown in FIGS. 1-3) are wound around the top plurality of teeth 1114 and the bottom plurality of teeth 1118 and held within the top stator slots and the bottom stator slots, respectively. The stator windings carry a current between a set of connectors (not shown in FIGS. 1-3) also called terminals. The stator windings are connected to three inverters in various configurations as discussed further below. One or more windings may be used for each phase. The stator windings are wound around the top plurality of teeth 1114 and the bottom plurality of teeth 1118 using various techniques to form a number of magnetic pole-pairs p between a set of connectors that carry one phase of a plurality of phases of electrical current depending on the winding technique as discussed further below. For example, radial flux machine 1100 may include stator windings with a stator winding for each phase. For three phases designated as u, v, w, a first stator winding may be associated with a u-phase, a second stator winding may be associated with a v-phase, and a third stator winding may be associated with a w-phase.

Top rotor 1102 and bottom rotor 1103 further may include rotor windings and/or permanent magnets in alternative embodiments. When rotated, top rotor 1102 and bottom rotor 1103 produce a rotating magnetic field. Through an interaction between the magnetic field and currents flowing in the windings a torque is generated to rotate shaft 102 such that radial flux machine 1100 operates as a motor. Alternatively, shaft 102 is mechanically rotated, which generates currents flowing in the stator windings such that radial flux machine 1100 operates as a generator. DPNV windings use the same stator winding for both torque and suspension forces and are a type of combined winding.

The stator windings can be connected to create a suspension force in top air gap 1202 and bottom air gap 1101, respectively. For example, a radial suspension force 1300 created by the stator windings is shown in accordance with an illustrative embodiment in FIG. 13. Controller 110 controls a flow of current through each coil of the stator windings to rotate shaft 1102 to generate a torque and to create a radial suspension force on shaft 102.

Radial flux bearingless motors produce radial suspension forces by creating an unsymmetrical flux density in top air gap 1202 and/or bottom air gap 1101. Non-bearingless machines have symmetry that cancels the radial forces. The forces can be calculated using the Maxwell stress tensor, which for the idealized case of radial fields that do not vary with the axial length (along the z-axis), can be written as $$F_x = \frac{lr}{2\mu_0} \int_0^{2\pi} B_r(\alpha)^2 \cos \alpha \, d\alpha$$

$$F_y = \frac{lr}{2\mu_0} \int_0^{2\pi} B_r(\alpha)^2 \sin \alpha \, d\alpha$$

where l is an active axial length, r is the air gap radius, and $B_r$ is a cumulative radial flux density in top air gap 1202 and/or bottom air gap 1101 at angular location α shown referring to FIG. 12. To create a radial force, $B_r(\alpha)$ contains components that differ in harmonic index by one.

For conventional radial flux machine types, such as PM or induction motors, and assuming that harmonics are neglected, a radial air gap flux density can be defined using $B_T(\alpha) = \hat{B}_T \cos(-p\alpha + \phi_T)$, where p represents the number of pole-pairs of radial flux machine 1100, and $\phi_T$ indicates an angular location of a torque producing magnetic field at an instant of time. The magnetic field is composed of a magnetizing field (for example, produced by the PM's or a rotor winding) and an armature reaction field. To transform this type of motor into a bearingless motor, a suspension coil with either $p_s = p+1$ or $p_s = p-1$ pole-pairs can be added, for example, to top stator 1104 and to bottom stator 1105 in the illustrative embodiment, to produce a radial flux density that differs in harmonic index by one $B_S(\alpha) = \hat{B}_S \cos(-(p \pm 1)\alpha + \phi_S)$, where $\phi_S$ indicates an angular location of a suspension force producing magnetic field at an instant of time and $p_s$ is a number of suspension pole-pairs. Thus, $B_r(\alpha) = \hat{B}_T \cos(-p\alpha + \phi_T) + \hat{B}_S \cos(-(p \pm 1)\alpha + \phi_S)$, which includes a torque flux density portion and a suspension flux density portion.

The suspension flux density portion is produced by balanced sinusoidal suspension currents $$i'_u = \hat{I}_S \cos \phi_S$$

$$i'_v = \hat{I}_S \cos \left(\phi_s - \frac{2\pi}{3}\right)$$

$$i'_v = \hat{I}_S \cos \left(\phi_s + \frac{2\pi}{3}\right).$$

These currents can be transformed into an equivalent two-phase system using the well-known direct-quadrature (DQ) transformation. If this is done with respect to the angle $\phi_T$, the following constant expressions for the radial force result $$F_x = k_f i_x$$

$$F_y = k_f i_y$$

where $i_x$ and $i_y$ are the two-phase DQ currents, respectively, from the DQ transformation and $k_f = f(\hat{B}_T, \text{geometry})$. Typically, a suspension controller specifies required values of $F_x$ and $F_y$ that are used to determine phase currents via an inverse DQ transformation. Noting that $\phi_T$ increases at a speed of an armature winding frequency, to produce a constant force, the suspension currents have the same frequency as the armature currents.

An AC homopolar bearingless motor and a consequent-pole bearingless motor can be viewed as having a constant radial air gap flux density component that does not vary with the angular position, $B_T(\alpha) = \hat{B}_T$. Radial forces are produced by adding a $p_s = 1$ pole-pair suspension coil to the stator winding, which produces a flux density given by $B_S(\alpha) = \hat{B}_S \cos(-\alpha + \phi_S)$ with the suspension currents as defined previously.

A DQ transformation with $\phi_7=0$ can be used to transform the suspension currents of the AC homopolar bearingless motor and the consequent-pole bearingless motor into equivalent x-y currents to compute the force expressions as defined above. The same inverse DQ transformation is used to calculate the suspension phase currents again with $\phi_7=0$. Since $\phi_7=0$, to produce a constant force, the suspension currents are direct current (DC). Additionally, no information regarding the air gap flux density's location is needed for suspension force creation, which may be an advantage of the AC homopolar bearingless motor and the consequent-pole bearingless motor. For the consequent-pole and AC homopolar motors, this requires p≥4.

The stator winding is responsible for generating two airgap magneto-motive forces (MMF): a p pole-pair MMF for torque and a $p_s$ pole-pair MMF for suspension forces. While conventional bearingless motors use separate windings for creating each MMF, the DPNV windings use a single winding for creating both MMFs. The defining features of a DPNV winding can be summarized as: 1) using the same winding to construct a p pole-pair torque MMF and a $p_s$ pole-pair suspension MMF; and 2) having suspension terminals which connect to the same winding as the torque terminals, but with half of the windings direction reversed so that these terminals experience no motional-electromotive force (EMF).

By definition, bearingless machines produce torque and suspension force simultaneously. This is typically modeled as $\vec{T}=T_d+j\tau=\overline{k}_t \vec{i}_t$ and $\vec{F}=F_x+jF_y=\overline{k}_f \vec{i}_s$, where $T_d$ and $\tau$ represent flux weakening and shaft torque, $F_x$ and $F_y$ are shaft forces in the x and y direction, $\vec{i}_t$ and $\vec{i}_s$ are space vector transformations of the stator torque and suspension winding currents, and $\overline{k}_t$ and $\overline{k}_f$ are complex factors that relate the current space vectors to the motor and suspension quantities and are of the form $\overline{k}_t=k_t e^{-j\theta_t}$ and $\overline{k}_f=k_f e^{-j\theta_f}$, respectively. $k_t$ and $k_f$ are machine constants, and $\theta_t$ and $\theta_f$ are determined from the rotor's angle and depend on the bearingless machine type.

In typical control systems, an outer control loop determines reference values for $\vec{T}*$ and $\vec{F}*$ that are converted to reference current space vectors $\vec{i}_t*$ and $\vec{i}_s*$ by solving $\vec{T}=T_d+j\tau=\overline{k}_t \vec{i}_t$ and $\vec{F}=F_x+jF_y=\overline{k}_f \vec{i}_s$. The relationship between $\vec{i}_t*$, $\vec{i}_s*$, the drive inverter's phase currents, and the motor winding currents depends on the type of winding used and the drive's connections to the winding.

Figure 2A:
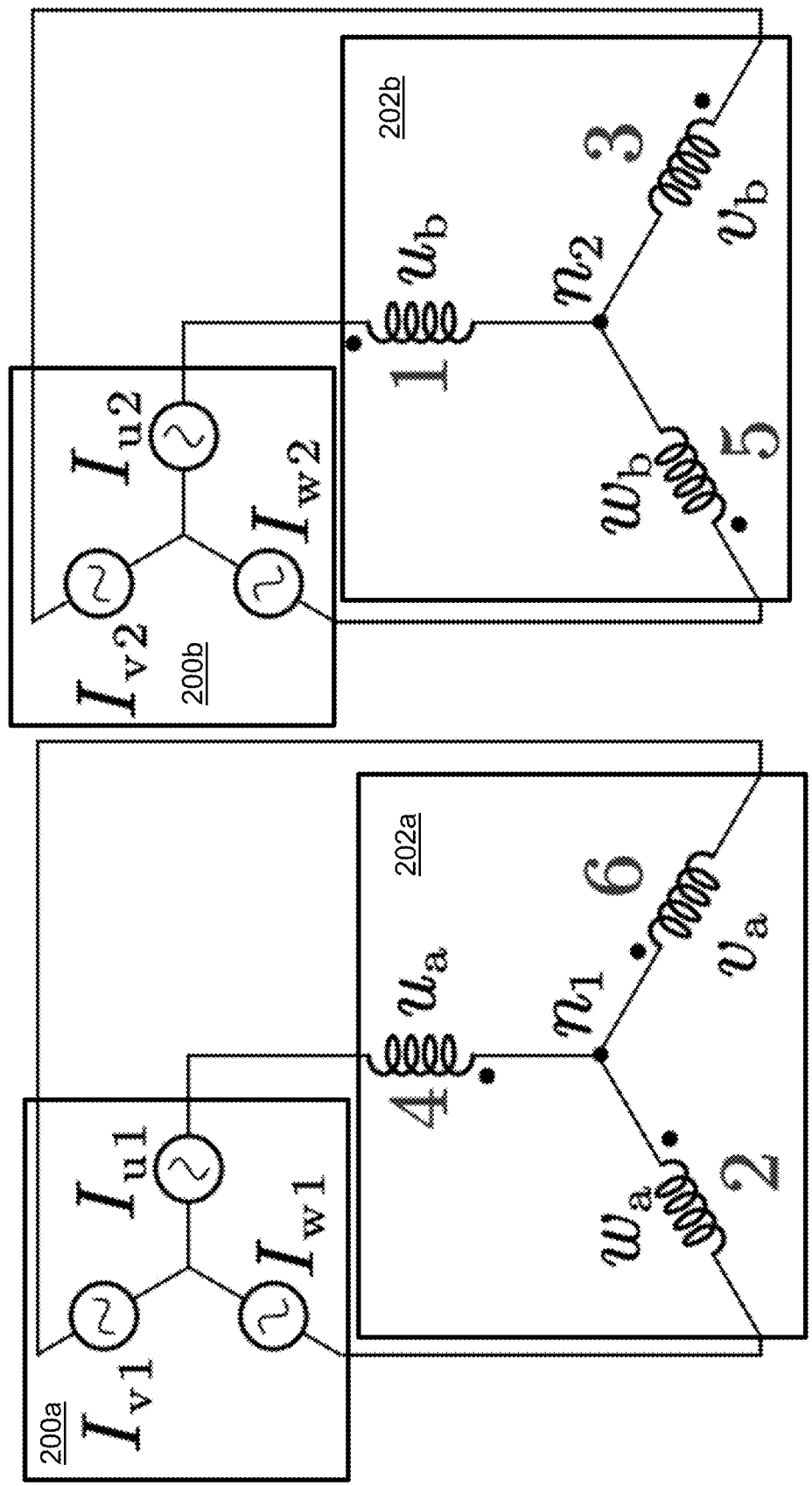
FIG. 2A depicts a multiphase (MP) winding configuration in accordance with an illustrative embodiment.
Figure 3:
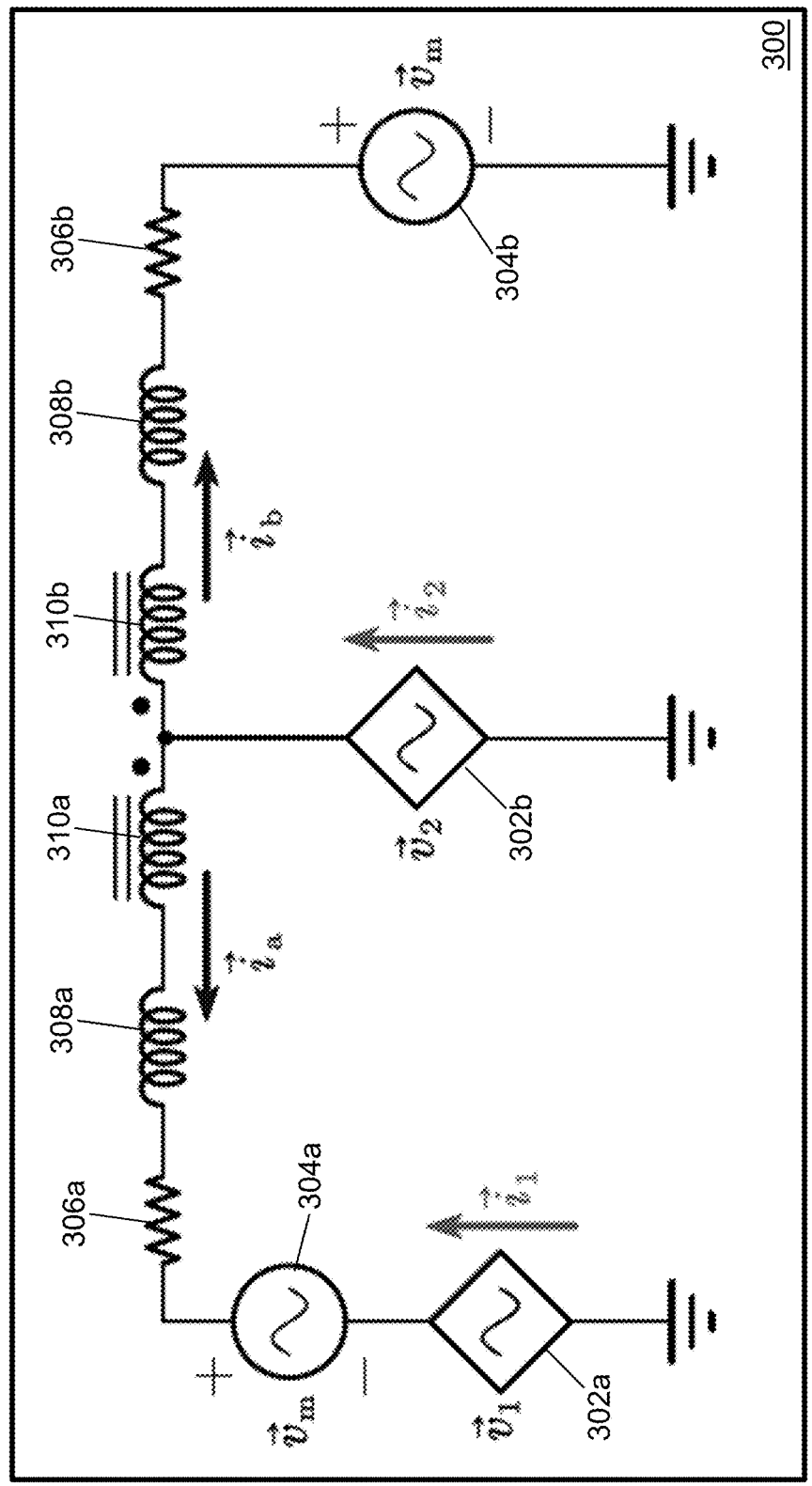
FIG. 3 depicts a space-vector diagram of the parallel DPNV combined winding configuration of FIG. 2B in accordance with an illustrative embodiment.

As already stated, electric machines produce torque when the stator winding creates an airgap field with the same number of pole pairs p as the magnetizing field of the machine and that a bearingless machine produces force when the stator winding creates a second airgap field with $p_s=p\pm1$ pole-pairs. Referring to FIG. 2A, a multiphase (MP) winding configuration is shown in accordance with an illustrative embodiment. The MP winding configuration may include a first inverter 200a and a second inverter 200b. A first MP winding 202a is shown for a first stator such as top stator 1104, and a second MP winding 202b is shown for a second stator such as bottom stator 1105. First inverter 200a is connected to first MP winding 202a, and second inverter 200b is connected to second MP winding 202b. A negative terminal of a first u-phase winding $u_a$ is connected to a u-phase leg or half-bridge of first inverter 200a as understood by a person of skill in the art. A positive terminal of the first u-phase winding $u_a$ is connected to a neutral connector $n_1$. A first v-phase winding $v_a$ and a first w-phase winding $w_a$ are similarly connected between first inverter 200a and neutral connector 206a. A second u-phase winding $u_b$, a second v-phase winding $v_b$, and a second w-phase winding $w_b$ are similarly connected between second inverter 200b and a neutral connector $n_2$.

For the six-phase winding of FIG. 2A to create the torque and suspension fields, each phase's winding function contains these harmonics. By neglecting all other harmonics, the winding function for phase k, which is shown next to each coil such as k=4 for coil $u_a$, takes the form $$N_k(\alpha) = \hat{N}_p \cos\left(p\alpha - [k-1]p\frac{\pi}{3}\right) + \hat{N}_{p_s} \cos\left(p_s\alpha - [k-1]p_s\frac{\pi}{3}\right),$$

$$k = 1, \ldots, 6$$

where $\hat{N}_p$ and $\hat{N}_{p_s}$ are the amplitude at harmonic p and $p_s$ and $\alpha$ is the angular location in the airgap. The torque p and suspension $p_s$ pole-pair fields can be independently controlled by regulating the winding phase currents as $$i_k = \hat{I}_t \cos\left(\phi_t - [k-1]p\frac{\pi}{3}\right) + \hat{I}_s \cos\left(\phi_s - [k-1]p_s\frac{\pi}{3}\right), k = 1, \ldots, 6$$

where $\hat{I}_t$ and $\phi_t$ determine the amplitude and the angular location, respectively, of the pole-pair machine field, and $\hat{I}_s$ and $\phi_s$ determine the amplitude and the angular location, respectively, of the pole-pair suspension field.

The amplitude invariant generalized Clarke transform may be used to calculate independent current space vectors from these phase currents as $$\vec{i}_t = \frac{1}{3}\sum_{k=1}^{6} i_k e^{jp[k-1]\frac{\pi}{3}} = \hat{I}_t e^{j\phi_t}$$

$$\vec{i}_s = \frac{1}{3}\sum_{k=1}^{6} i_k e^{jp_s[k-1]\frac{\pi}{3}} = \hat{I}_s e^{j\phi_s}$$

Standard torque and force calculation approaches (e.g., the Maxwell stress tensor or co-energy) can be used with the current space vectors to determine the force and torque model summarized $\vec{T}=T_d+j\tau=\overline{k}_t \vec{i}_t$ and $\vec{F}=F_x+jF_y=\overline{k}_f \vec{i}_s$. Each drive inverter phase is rated to carry the same maximum phase current of $\hat{I}_t+\hat{I}_s$ and withstand the same back-electromotive force (EMF).

Figure 2B:
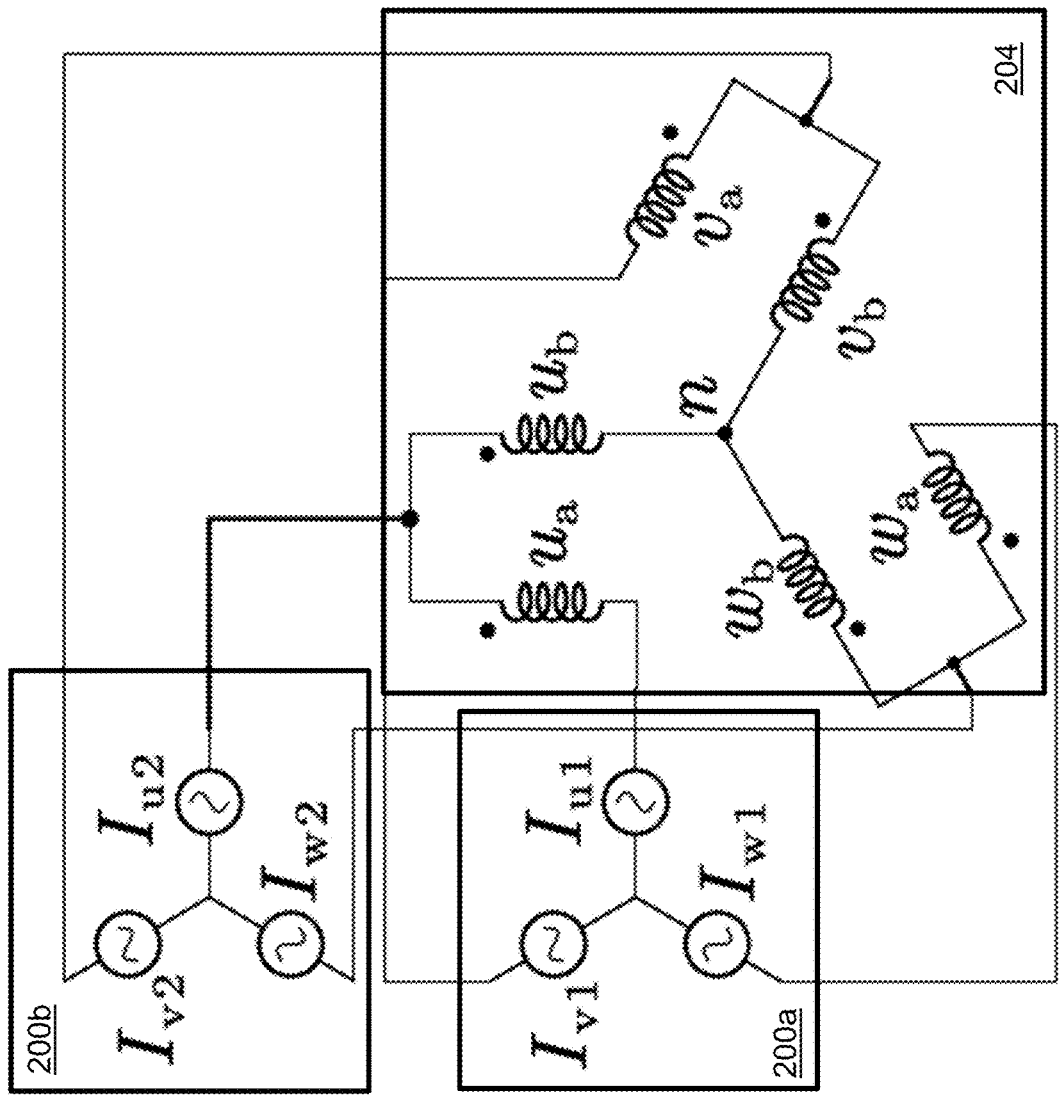
FIG. 2B depicts a parallel, dual purpose no voltage (DPNV) combined winding configuration in accordance with an illustrative embodiment.

Referring to FIG. 2B, a parallel DPNV winding configuration is shown in accordance with an illustrative embodiment. The parallel DPNV winding configuration may include first inverter 200a and second inverter 200b. A first DPNV winding 204 is shown for the first stator such as top stator 1104 or for the second stator such as bottom stator 1105. First inverter 200a and second inverter 200b are connected to first DPNV winding 204. The negative terminal of the first u-phase winding $u_a$ is connected to a u-phase half-bridge of first inverter 200a, and the positive terminal of the first u-phase winding $u_a$ is connected to a u-phase half-bridge of second inverter 200b. The positive terminal of the first u-phase winding $u_a$ is also connected to the positive terminal of the second u-phase winding $u_b$. The negative terminal of the second u-phase winding $u_b$ is connected to a neutral connector n. The first v-phase winding $v_a$, the second v-phase winding $v_b$, the first w-phase winding $w_a$, and the second w-phase winding $w_b$ are similarly connected between first inverter 200a, second inverter 200b, and the neutral connector n.

Connecting the drive in this manner changes the current and voltage requirements of each drive inverter phase as discussed in U.S. Pat. No. 10,879,829 that issued Dec. 29, 2020 and is titled BEARINGLESS ELECTRICAL MACHINE WITH FLOATING CAPACITOR. The parallel DPNV winding can be described as a three-phase winding, where each phase is divided into two coil groups (or subphases) a and b. For $p_s=2$ and $p=1$, the equivalency between the MP and parallel configuration may be based on a correspondence between the values of k shown in FIG. 2A and the coil group labels of $u_a$, $u_b$, $v_a$, $v_b$, $w_a$, $w_b$ shown in FIG. 2B with dots denoting a phase connection direction between negative terminals and positive terminals where the dot indicates the positive terminal. Other pole combinations may have a different correspondence between MP and DPNV windings. A conventional (three-phase) Clarke transform can be used to construct current space vectors for the current in each of the coil groups as $$\vec{i}_x = \frac{2}{3}\left(i_{u_x} + i_{v_x} e^{j\frac{2\pi}{3}} + i_{w_x} e^{j\frac{4\pi}{3}}\right)$$

where x is either a or b and current is defined as positive entering the dotted terminal of each coil group. The torque and suspension current space vectors can be calculated in terms of $\vec{i}_a$ and $\vec{i}_b$. The resulting space vectors can be related back to the coil group currents using $$\vec{i}_t = \vec{i}_a + \vec{i}_b = 2\hat{i}_t e^{j\phi_t} \text{ and } \vec{i}_s = 0.5(\vec{i}_b - \vec{i}_a) = \vec{i}_s e^{j\phi_s}.$$

These expressions can be inverted to find the coil group currents in terms of $\vec{i}_t$ and $\vec{i}_s$ as $\vec{i}_a = 0.5(\vec{i}_t - \vec{i}_s)$ and $\vec{i}_b = 0.5(\vec{i}_t + \vec{i}_s)$. The drive inverter terminal currents can be solved as $\vec{i}_1 = \vec{i}_s - 0.5\vec{i}_t$ and $\vec{i}_2 = \vec{i}_t$. A behavior of this drive configuration can be summarized with a space-vector equivalent circuit or a first space-vector diagram 300, shown referring to FIG. 3. First space-vector diagram 300 indicates a first voltage source 302a, a first back EMF 304a, a first resistor 306a, a first inductor 308a, and a first mutual inductance 310a, a second voltage source 302b, a second back EMF 304b, a second resistor 306b, a second inductor 308b, and a second mutual inductance 310b of DPNV winding 204 for each phase. Currents $\vec{i}_a$, $\vec{i}_b$, $\vec{i}_1$, and $\vec{i}_2$ are also indicated. $\vec{i}_1$ and $\vec{i}_2$ indicate the currents from first inverter 200a and second inverter 200b, respectively. $\vec{i}_a$, $\vec{i}_b$ indicate the currents through the first set of phase windings, $u_a$, $v_a$, $w_a$, and the second set of phase windings, $u_b$, $v_b$, $w_b$, respectively. First mutual inductance 310a and second mutual inductance 310b form a mutual inductance between the first set of phase windings, $u_a$, $v_a$, $w_a$, and the second set of phase windings, $u_b$, $v_b$, $w_b$. The dotted inductors represent a polarity of mutual inductance that corresponds to the dotted terminals of FIG. 2B.

By controlling first inverter 200a and second inverter 200b using $\vec{i}_1 = \vec{i}_s - 0.5\vec{i}_t$ and $\vec{i}_2 = \vec{i}_t$, the stator winding's phase currents become $$i_k = \hat{i}_t \cos\left(\phi_t - [k-1]p\frac{\pi}{3}\right) + \hat{i}_s \cos\left(\phi_s - [k-1]p_s\frac{\pi}{3}\right), k = 1, \ldots, 6,$$

meaning that both the MP and parallel DPNV connection approaches result in identical stator currents. However, the drive inverter's have quite different requirements for the parallel DPNV winding, with first inverter 200a having a phase current rating of $\vec{i}_t + \vec{i}_s$ and experiencing no back-EMF, while second inverter 200b has a phase current rating of $2\vec{i}_t$ and does experience the motor's back-EMF, first back EMF 304a and first back EMF 304b.

A natural extension of the drives to twin bearingless machine system 100 is to have an independent drive for each of the two stators resulting in four inverters. In this case, $\vec{T} = T_d + j\tau = \bar{k}_t \vec{i}_t$ and $\vec{F} = F_x + jF_y = \bar{k}_f \vec{i}_s$ is used for each of first bearingless machine 104a and second bearingless machine 104b, where each machine may be responsible for half of the total shaft torque on shaft 102. Taking this approach has the disadvantage of doubling the amount of power electronics required as compared to a single bearingless electric machine due to the pair of inverters required for each bearingless machine, which increases the cost and volume of the entire machine system.

When two drives are used to actuate first bearingless machine 104a and second bearingless machine 104b, the drive electronics are able to control more degrees of freedom than are required. That is, each drive solves $\vec{T} = T_d + j\tau = \bar{k}_t \vec{i}_t$ and $\vec{F} = F_x + jF_y = \bar{k}_f \vec{i}_s$ to actuate torque and force in the airgap of each machine; however, in a typical application, the user is only interested in actuating the total shaft torque $\vec{T}$ that may be split between first bearingless machine 104a and second bearingless machine 104b. As a result, the typical twin bearingless machine system has three fundamental control degrees of freedom that need to be actuated: $\vec{T} = \vec{T}_1 + \vec{T}_2$, $\vec{F}_1$, and $\vec{F}_2$ where the subscripts 1 and 2 are used to denote first bearingless machine 104a and second bearingless machine 104b, respectively. It follows then that only three control current space vectors are required, $\vec{i}_t = \vec{i}_{t,1} + \vec{i}_{t,2}$, $\vec{i}_{s,1}$, and $\vec{i}_{s,2}$ that can be realized by regulating the terminal currents of three inverters instead of four inverters. $\vec{i}_t$ indicates a torque current, $\vec{i}_{s,1}$ indicates a first suspension current for first bearingless machine 104a, and $\vec{i}_{s,2}$ indicates a second suspension current for second bearingless machine 104b.

There are many options for connecting three inverters to first bearingless machine 104a and second bearingless machine 104b. To simplify this analysis, both first bearingless machine 104a and second bearingless machine 104b may be considered to be identical and the space vector equivalent circuit is used so that each machine is depicted as having two coil groups a and b. There are seven unique connection structures as depicted in FIGS. 7A-7G. Each of these structures can form multiple unique drive topologies by changing the inductor symbol that each coil group is assigned to as machine 1 or machine 2 and coil group a or b, a coil group direction (positive orientation), and a node at which each of the three inverters inject current. Each structure includes a first coil 700, a second coil 702, a third coil 704, and a fourth coil 706, where each coil represents a three-phase stator winding.

Figure 7A:
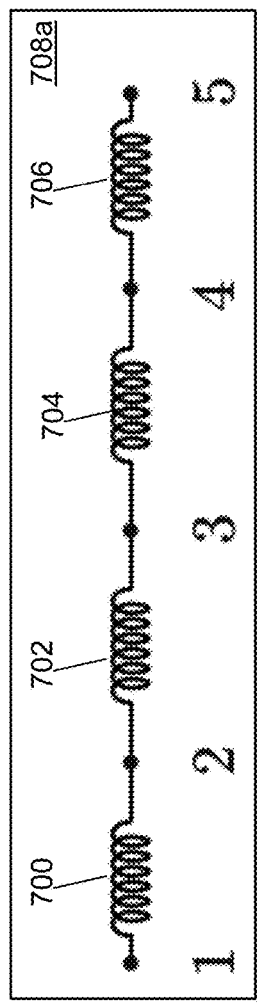
FIGS. 7A-7G depict alternative drive structures for the twin bearingless machine system of FIG. 1 in accordance with an illustrative embodiment.

A first coil group structure 708a is shown referring to FIG. 7A in accordance with an illustrative embodiment. First coil group structure 708a includes series connected combinations of machine 1 and machine 2 between nodes 1 and 2, between nodes 2 and 3, between nodes 3 and 4, and between nodes 4 and 5. For example, first coil 700 is connected between nodes 1 and 2, second coil 702 is connected between nodes 2 and 3, third coil 704 is connected between nodes 3 and 4, and fourth coil 706 is connected between nodes 4 and 5 in series.

A first combination is machine 1, machine 2, machine 2, and machine 1, respectively. A second combination is machine 1, machine 2, machine 1, and machine 2, respectively. A third combination is machine 1, machine 1, machine 2, and machine 2, respectively. Coil group a or b can be assigned to each coil position. First coil group structure 708a has three unique sets of coil group assignments assuming that 1, 1, 2, 2, is equivalent to 2, 2, 1, 1. Similarly, changing the assignment between coil group a and b does not create a new topology as these coil groups are equivalent. Machine 1 refers to first bearingless machine 104a, and machine 2 refers to second bearingless machine 104b.

In first coil group structure 708a, first inverter 200a, second inverter 200b, and a third inverter 200c (e.g., shown referring to FIG. 4A) can be connected to any three of the nodes 1 through 5. For example, first inverter 200a can be connected to node 1, second inverter 200b can be connected to any of the remaining nodes 2-5, and third inverter 200c can be connected to any of the remaining nodes not connected to first inverter 200a or second inverter 200b. There are many possible permutations for assigning the three inverters to the five nodes as well as assigning coil group a or b of each machine to first coil 700, second coil 702, third coil 704, and fourth coil 706.

Figure 7B:
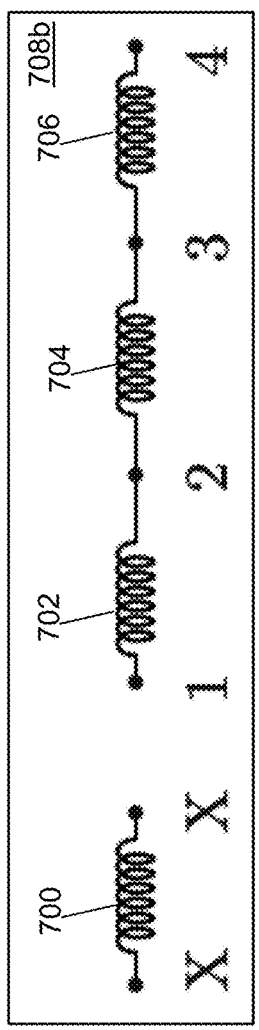

A second coil group structure 708b is shown referring to FIG. 7B in accordance with an illustrative embodiment. Second coil group structure 708b includes an islanded, or isolated, X node connection and series connected combinations of machine 1 and machine 2 between nodes 1 and 2, between nodes 2 and 3, and between nodes 3 and 4. Nodes designated with "X" can be assigned to any of the three inverters without changing the total number of unique coil group assignments. For example, first coil 700 is islanded as indicated by the X nodes and second coil 702 is connected between nodes 1 and 2, third coil 704 is connected between nodes 2 and 3, and fourth coil 706 is connected between nodes 3 and 4 in series. A first combination is machine 1, machine 2, machine 1, and machine 2, respectively. A second combination is machine 1, machine 1, machine 2, and machine 2, respectively.

In second coil group structure 708b, any two of first inverter 200a, second inverter 200b, and third inverter 200c can be connected to any pair of the nodes 1 through 4 while the remaining inverter is connected to first coil 700. For example, first inverter 200a can be connected to first coil 700, second inverter 200b can be connected to any of the nodes 1-4, and third inverter 200c can be connected to any of the remaining nodes not connected to second inverter 200b. There are many possible permutations for assigning the three inverters to the four nodes as well as assigning coil group a or b of each machine to first coil 700, second coil 702, third coil 704, and fourth coil 706.

Figure 7C:
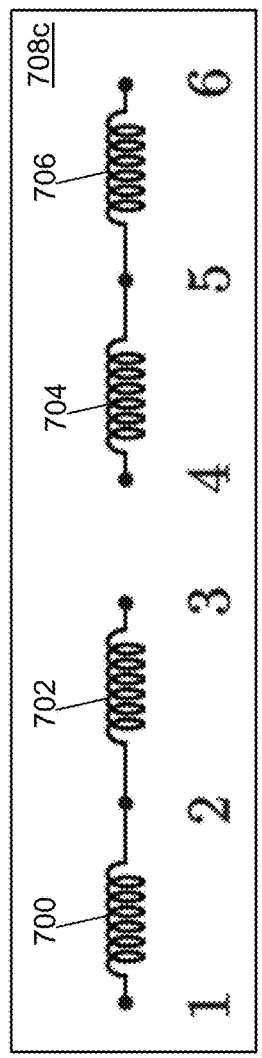

A third coil group structure 708c is shown referring to FIG. 7C in accordance with an illustrative embodiment. Third coil group structure 708c includes first series connected combinations of machine 1 and machine 2 between nodes 1 and 2 and between nodes 2 and 3 that are islanded relative to second series connected combinations of machine 1 and machine 2 between nodes 4 and 5 and 5 and 6. For example, first coil 700 is connected between nodes 1 and 2 and second coil 702 is connected between nodes 2 and 3 in series with first coil 700; third coil 704 is connected between nodes 4 and 5 and fourth coil 706 is connected between nodes 5 and 6 in series with third coil 704. A first combination is machine 1, machine 2, machine 1, and machine 2, respectively. A second combination is machine 1, machine 1, machine 2, and machine 2, respectively.

In third coil group structure 708c, one or two of first inverter 200a, second inverter 200b, and third inverter 200c can be connected to any of the nodes 1 through 3 while the remaining inverter(s) is(are) connected to any of the nodes 4 through 6. For example, first inverter 200a can be connected to node 1, second inverter 200b can be connected to node 4, and third inverter 200c can be connected to any of the remaining nodes not connected to first inverter 200a or second inverter 200b. There are many possible permutations for assigning the three inverters to the six nodes as well as assigning coil group a or b of each machine to first coil 700, second coil 702, third coil 704, and fourth coil 706.

Figure 7D:
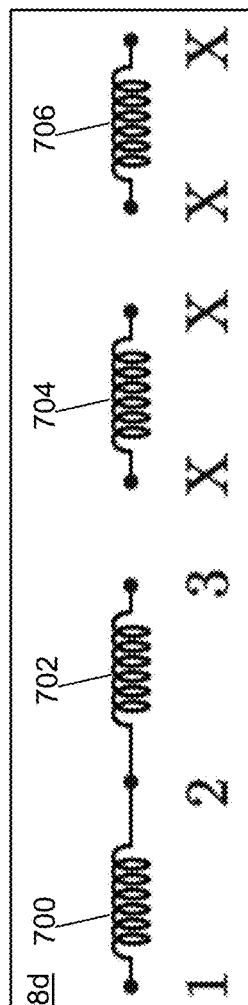

A fourth coil group structure 708d is shown referring to FIG. 7D in accordance with an illustrative embodiment. Fourth coil group structure 708d includes the first series connected combinations of machine 1 and machine 2 between nodes 1 and 2 and between nodes 2 and 3, and two islanded X node connections. For example, first coil 700 is connected between nodes 1 and 2 and second coil 702 is connected between nodes 2 and 3 in series with first coil 700; third coil 704 is islanded from the other coils, and fourth coil 706 is islanded from the other coils. A first combination is machine 1, machine 1, machine 2 and machine 2, respectively. A second combination is machine 1, machine 2 and either combination of machine 1, and machine 2, respectively.

In fourth coil group structure 708d, one of first inverter 200a, second inverter 200b, and third inverter 200c is connected to third node 704, one of the remaining inverters is connected to fourth node 706, and the remaining inverter is connected to any of the nodes 1 through 3. For example, first inverter 200a can be connected to any of nodes 1 through 3, second inverter 200b can be connected to third node 704, and third inverter 200c can be connected to fourth node 706. There are many possible permutations for assigning the inverter to the three nodes as well as assigning coil group a or b of each machine to first coil 700, second coil 702, third coil 704, and fourth coil 706.

Figure 7E:
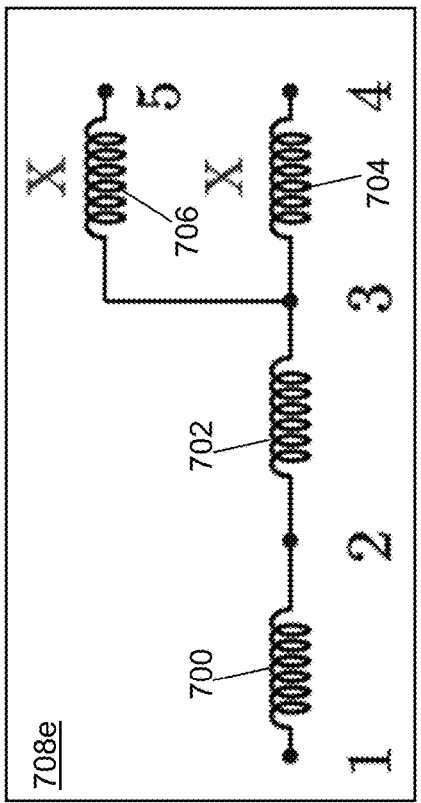

A fifth coil group structure 708e is shown referring to FIG. 7E in accordance with an illustrative embodiment. Fifth coil group structure 708e includes the first series connected combinations of machine 1 and machine 2 between nodes 1 and 2, between nodes 2 and 3, and between nodes 3 and 4, and another machine connection between nodes 3 and 5. The "X" above coil means that the coil can be assigned to coil groups "a" and "b" in machine 1 and machine 2. The different selections of "X" are equivalent. Therefore, the selection of "X" will not change the total number of unique coil group assignments. For example, first coil 700 is connected between nodes 1 and 2, second coil 702 is connected between nodes 2 and 3 in series with first coil 700, third coil 704 is connected between nodes 3 and 4 in series with second coil 702, and fourth coil 706 is connected between nodes 3 and 5. Node 3 is a common connection between second coil 702, third coil 704, and fourth coil 706. A first combination is machine 1, machine 1, machine 2, and machine 2, respectively. A second combination is machine 1, machine 2 and either combination of machine 1 and machine 2 between nodes 3 and 4 and between nodes 3 and 5, respectively.

In fifth coil group structure 708e, first inverter 200a, second inverter 200b, and third inverter 200c can be connected to any three of the nodes 1 through 5. For example, first inverter 200a can be connected to node 1, second inverter 200b can be connected to any of the remaining nodes 2-5, and third inverter 200c can be connected to any of the remaining nodes not connected to first inverter 200a or second inverter 200b. There are many possible permutations for assigning the three inverters to the five nodes as well as assigning coil group a or b of each machine to first coil 700, second coil 702, third coil 704, and fourth coil 706.

Figure 7F:
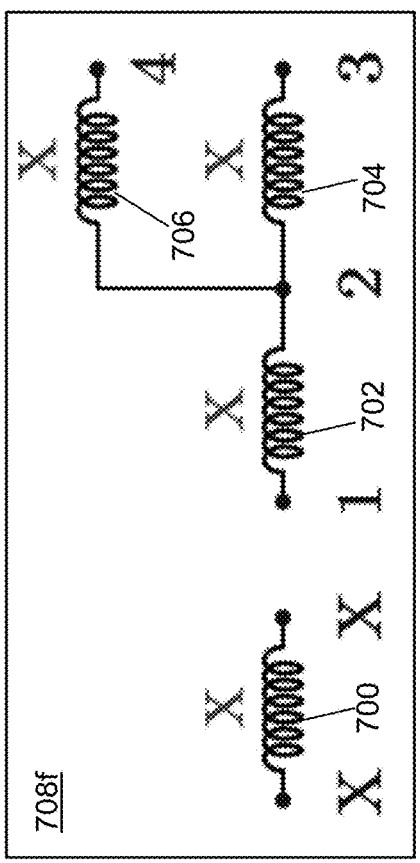

A sixth coil group structure 708f is shown referring to FIG. 7F in accordance with an illustrative embodiment. Sixth coil group structure 708f includes an islanded X node connection, and a series connected combination of machine 1 and machine 2 between nodes 1 and 2 and between nodes 2 and 3 and another machine connection between 2 and 4. For example, first coil 700 is islanded, second coil 702 is connected between nodes 1 and 2, third coil 704 is connected between nodes 2 and 3 in series with second coil 702, and fourth coil 706 is connected between nodes 2 and 4. Node 2 is a common connection between second coil 702, third coil 704, and fourth coil 706.

In sixth coil group structure 708f, any two of first inverter 200a, second inverter 200b, and third inverter 200c can be connected to any pair of the nodes 1 through 4 while the remaining inverter is connected to first coil 700. For example, first inverter 200a can be connected to first coil 700, second inverter 200b can be connected to any of the nodes 1-4, and third inverter 200c can be connected to any of the remaining nodes not connected to second inverter 200b. There are many possible permutations for assigning the three inverters to the four nodes as well as assigning coil group a or b of each machine to first coil 700, second coil 702, third coil 704, and fourth coil 706.

Figure 7G:
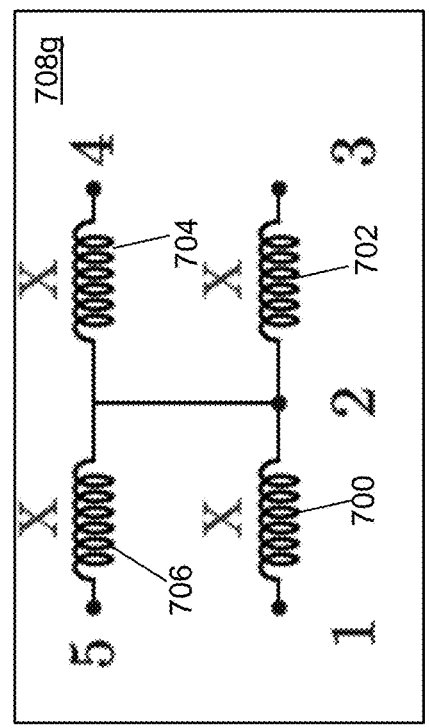

A seventh coil group structure 708g is shown referring to FIG. 7G in accordance with an illustrative embodiment. Seventh coil group structure 708g includes a machine node connection between nodes 1 and 2, between nodes 2 and 3, between nodes 2 and 4, and between nodes 2 and 5. For example, first coil 700 is connected between nodes 1 and 2, second coil 702 is connected between nodes 2 and 3 in series with first coil 700, third coil 704 is connected between nodes 2 and 4, and fourth coil 706 is connected between nodes 2 and 5. Node 2 is a common connection between first coil 700, second coil 702, third coil 704, and fourth coil 706.

In seventh coil group structure 708g, first inverter 200a, second inverter 200b, and third inverter 200c can be connected to any three of the nodes 1 through 5. For example, first inverter 200a can be connected to node 1, second inverter 200b can be connected to any of the remaining nodes 2-5, and third inverter 200c can be connected to any of the remaining nodes not connected to first inverter 200a or second inverter 200b. There are many possible permutations for assigning the three inverters to the five nodes as well as assigning coil group a or b of each machine to first coil 700, second coil 702, third coil 704, and fourth coil 706.

Sixth coil group structure 708f and seventh coil group structure 708g include a single unique coil group assignment set. In FIG. 7F, second coil 702, third coil 704, and fourth coil 706 are connected together and form a common node 2. The three coils are equivalent. If the islanded coil, first coil 700 in the illustrative embodiment, is assigned to machine 1, the assignment of the remaining three coils does not influence the total number of unique structures. Thus, only one unique structure can be formed when first coil 700 is assigned to machine 1. Furthermore, machine 1 and machine 2 are equivalent and interchangeable. In the case of first coil 700 being assigned to machine 2, the structure is no different from that in the case of first coil 700 being assigned to machine 1. As a result, there is only one unique structure for sixth coil group structure 708f and, similarly, for seventh coil group structure 708g.

Reversing the connection direction of any coil group results in a unique configuration. Since there are four coil groups (coil group a and b of machine 1 and 2), there are $2^4=16$ variations within each set of coil group assignments. The circuit nodes of FIGS. 7A-7G are indicated with the dots. Unique topologies are created for each coil group assignment of each structure by assigning the three inverters to different combinations of the nodes. No more than one inverter may be assigned to a single node. For coil groups that are islanded, an inverter may be placed at one of the nodes and a neutral point is placed at the other node. Therefore, both nodes are indicated with "X" in FIGS. 7A-7G. Each set of inverter node assignments requires a unique placement of neutral points at other nodes to ensure that current can reach all coil groups. Based on the formula for combinations, there are 1,393 possible arrangements that can be formed.

Referring to FIGS. 4A-4J, stator winding connections to first inverter 200a, second inverter 200b, and third inverter 200c are shown for first bearingless machine 104a and second bearingless machine 104b in accordance with an illustrative embodiment. $u_{a1}$, $u_{b1}$, $v_{a1}$, $v_{b1}$, $w_{a1}$, $w_{b1}$ are the three-phase windings u, v, w of coil groups a and b of first bearingless machine 104a. $u_{a2}$, $u_{b2}$, $v_{a2}$, $v_{b2}$, $w_{a2}$, $w_{b2}$ are the three-phase windings u, v, w of coil groups a and b of second bearingless machine 104b.

Figure 4A:
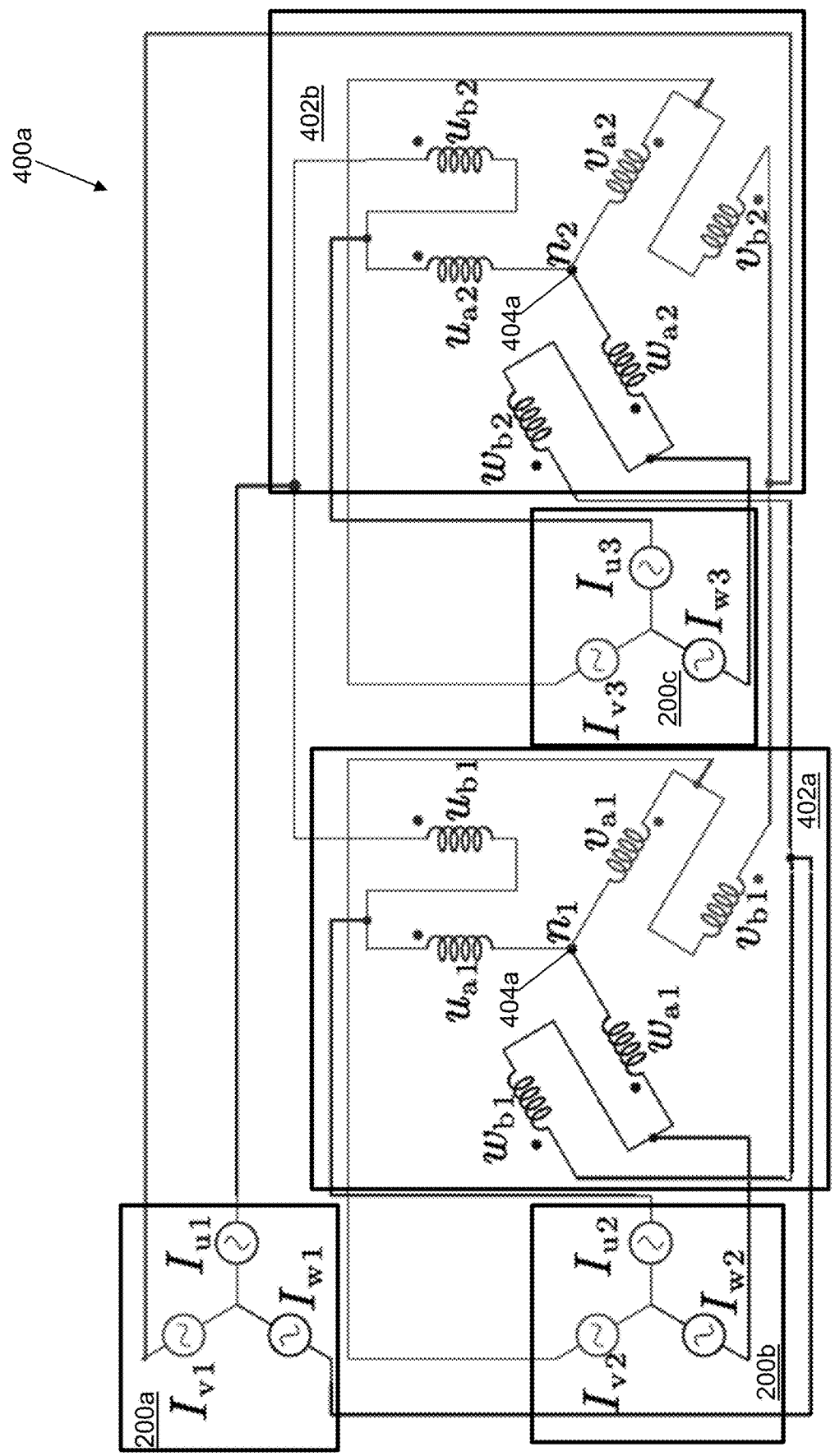
FIGS. 4A-4J depict stator winding connections with three inverters for the twin bearingless machine system of FIG. 1 in accordance with an illustrative embodiment.

Referring to FIG. 4A, a first stator winding connection 400a is shown that includes a first stator winding 402a and a second stator winding 402b. First stator winding 402a connects $u_{a1}$, $u_{b1}$, $v_{a1}$, $v_{b1}$, and $w_{a1}$, $w_{b1}$ between first inverter 200a, second inverter 200b, and a first neutral connector 404a. Second stator winding 402b connects $u_{a2}$, $u_{b2}$, $v_{a2}$, $v_{b2}$, and $w_{a2}$, $w_{b2}$ between third inverter 200c, the respective phase windings of first stator winding 402a, and a second neutral connector 404b. First stator winding connection 400a is an example of first coil group structure 708a.

Figure 5:
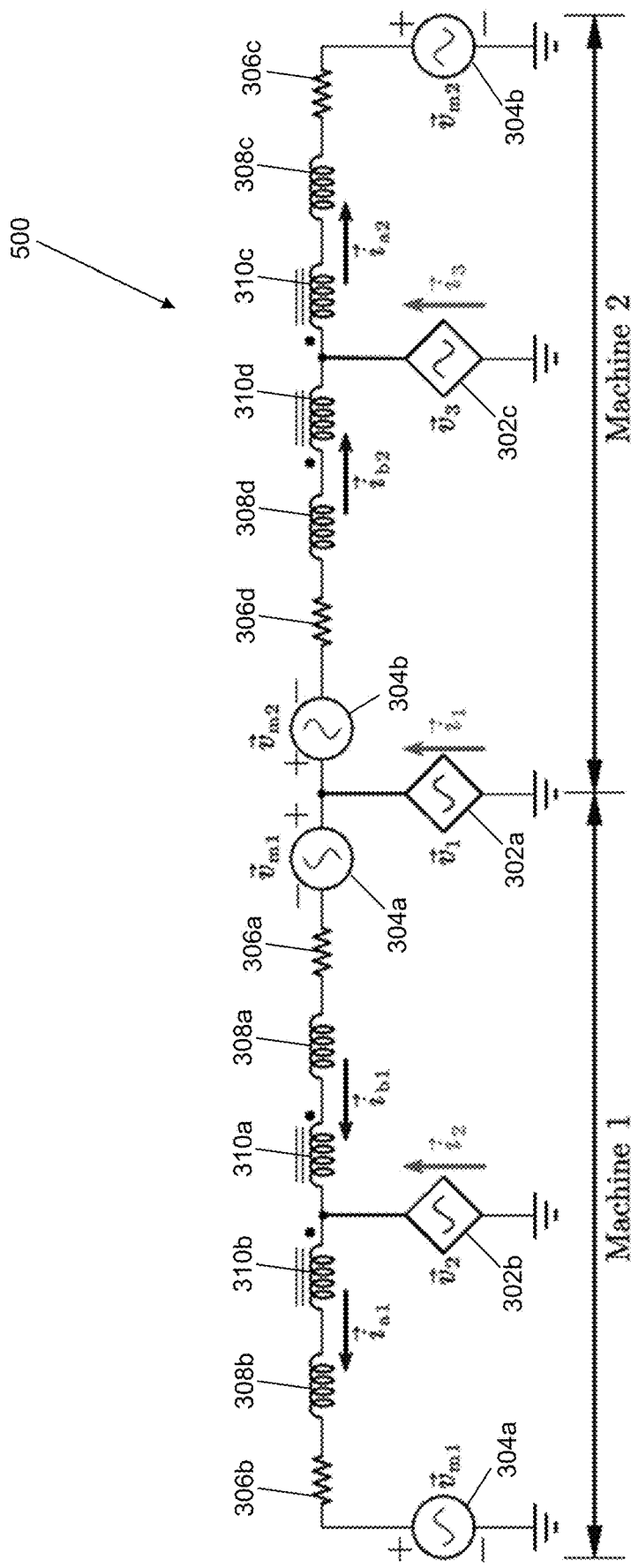
FIG. 5 depicts a space-vector diagram for the winding configuration of FIG. 4A in accordance with an illustrative embodiment.

Referring to FIG. 5, a second space-vector diagram 500 is shown for first stator winding connection 400a in accordance with an illustrative embodiment. First inverter 200a, second inverter 200b, and third inverter 200c are denoted using current sources $\vec{i}_1$, $\vec{i}_2$, and $\vec{i}_3$, and neutral points are indicated using ground symbols. Second space-vector diagram 500 indicates first voltage source 302a, first back EMF 304a, first resistor 306a, first inductor 308a, first mutual inductance 310a, second voltage source 302b, second back EMF 304b, second resistor 306b, second inductor 308b, and second mutual inductance 310b of first stator winding connection 400a for each phase of first bearingless machine 104a. A third voltage source 302c, a third back EMF 304c, a third resistor 306c, a third inductor 308c, a third mutual inductance 310c, a fourth back EMF 304d, a fourth resistor 306d, a fourth inductor 308d, and a fourth mutual inductance 310d of second stator winding 402b for each phase. Currents $\vec{i}_{a1}$, $\vec{i}_{b1}$, $\vec{i}_{a2}$, and $\vec{i}_{b2}$ are also indicated. The dotted inductors represent a polarity of mutual inductance that corresponds to the dotted terminals of FIG. 4A.

For each coil group structure of FIGS. 7A-7G, the machines' coil group current space vectors ($\vec{i}_{a1}$, $\vec{i}_{a2}$, $\vec{i}_{b1}$, $\vec{i}_{b2}$) can be calculated in terms of the inverter currents ($\vec{i}_1$, $\vec{i}_2$, $\vec{i}_3$) and expressed as a matrix $$\begin{bmatrix} \vec{i}_{a1} \\ \vec{i}_{a2} \\ \vec{i}_{b1} \\ \vec{i}_{b2} \end{bmatrix} = T_C \begin{bmatrix} \vec{i}_1 \\ \vec{i}_2 \\ \vec{i}_3 \end{bmatrix} \quad (1)$$

The matrix $T_C$ is unique for each coil group structure and can be obtained from the structure's space vector circuit by using superposition and writing Kirchhoff's Current Law expressions. The control currents $\vec{i}_t = \vec{i}_{t,1} + \vec{i}_{t,2}$, $\vec{i}_{s,1}$, and $\vec{i}_{s,2}$ are determined using $\vec{i}_t = \vec{i}_a + \vec{i}_b = 2\hat{I}_t e^{j\Phi_t}$ and $\vec{i}_s = 0.5(\vec{i}_b - \vec{i}_a) = \hat{I}_s e^{j\Phi_s}$ as $$\begin{bmatrix} \vec{i}_{s,1} \\ \vec{i}_{s,2} \\ \vec{i}_t \end{bmatrix} = T_F \begin{bmatrix} \vec{i}_{a1} \\ \vec{i}_{a2} \\ \vec{i}_{b1} \\ \vec{i}_{b2} \end{bmatrix} \quad T_F = \begin{bmatrix} -\frac{1}{2} & \frac{1}{2} & 0 & 0 \\ 0 & 0 & -\frac{1}{2} & \frac{1}{2} \\ 1 & 1 & 1 & 1 \end{bmatrix} \quad (2)$$

where the required inverter terminal currents necessary to obtained the desired control currents can be obtained when $T_F T_C$ is invertible using $$\begin{bmatrix} \vec{i}_1 \\ \vec{i}_2 \\ \vec{i}_3 \end{bmatrix} = (T_F T_C)^{-1} \begin{bmatrix} \vec{i}_{s,1} \\ \vec{i}_{s,2} \\ \vec{i}_t \end{bmatrix}$$

The coil group currents are then calculated in terms of the control currents. Applying this to second space-vector diagram 500 results in $$T_c = \begin{bmatrix} 1/2 & 3/4 & 1/4 \\ 1/2 & -1/4 & 1/4 \\ 1/2 & 1/4 & 3/4 \\ 1/2 & 1/4 & -1/4 \end{bmatrix}$$

$$\vec{i}_{a1} = \frac{1}{4}\vec{i}_t - \vec{i}_{s,1}, \, \vec{i}_{b1} = \frac{1}{4}\vec{i}_t + \vec{i}_{s,1}, \, \vec{i}_{a2} = \frac{1}{4}\vec{i}_t - \vec{i}_{s,2}, \, \vec{i}_{b2} = \frac{1}{4}\vec{i}_t + \vec{i}_{s,2}$$

$$\vec{i}_1 = \frac{1}{2}\vec{i}_t + \vec{i}_{s,1} + \vec{i}_{s,2}, \, \vec{i}_2 = -2\vec{i}_{s,1}, \, \vec{i}_3 = -2\vec{i}_{s,2}$$

Voltage equations can be derived for each set of inverter terminals to design current regulators and can be used to determine the voltage requirement of each inverter. Each inverter's voltage equation can be determined by applying Kirchoff's Voltage Law (KVL) around a loop from the inverter of interest to the nearest neutral point in a manner that does not pass through another inverter.

For example, applying this to second space-vector diagram 500 results in the inverter voltage expressions $$\vec{v}_1 = R(\vec{i}_{a1} + \vec{i}_{b1}) + (L+M)\frac{d}{dt}(\vec{i}_{a1} + \vec{i}_{b1}) + 2\vec{v}_m$$

$$\vec{v}_2 = R\vec{i}_{a1} + L\frac{d}{dt}\vec{i}_{a1} + M\frac{d}{dt}\vec{i}_{b1} + \vec{v}_m$$

$$\vec{v}_3 = R\vec{i}_{a2} + L\frac{d}{dt}\vec{i}_{a2} + M\frac{d}{dt}\vec{i}_{b2} + \vec{v}_m$$

where the term $\vec{v}_m$ represents the back-EMF of the machine that appears within a coil group, $\vec{i}_{a1}$, $\vec{i}_{b1}$, $\vec{i}_{a2}$, and $\vec{i}_{b2}$ represent the current in each respective coil group, and $\vec{v}_1$, $\vec{v}_2$, and $\vec{v}_3$ represent the voltage in each respective inverter. In this coil group structure, first inverter 200a is exposed to more back-EMF ($2\vec{v}_m$) as compared to second inverter 200b and third inverter 200c ($\vec{v}_m$) and will likely require higher voltage electronics.

Because first bearingless machine 104a and second bearingless machine 104b are identical, R indicates a resistance of first resistor 306a, second resistor 306b, third resistor 306c, and fourth resistor 306d; L indicates an inductance of first inductor 308a, second inductor 308b, third inductor 308c, and fourth inductor 308d; M indicates a mutual inductance of first mutual inductance 310a, second mutual inductance 310b, third mutual inductance 310c, and fourth mutual inductance 310d; and $\vec{v}_m$ indicates a back-EMF of first back EMF 304a, second back EMF 304b, third back EMF 304c, and fourth back EMF 304d.

Figure 6A:
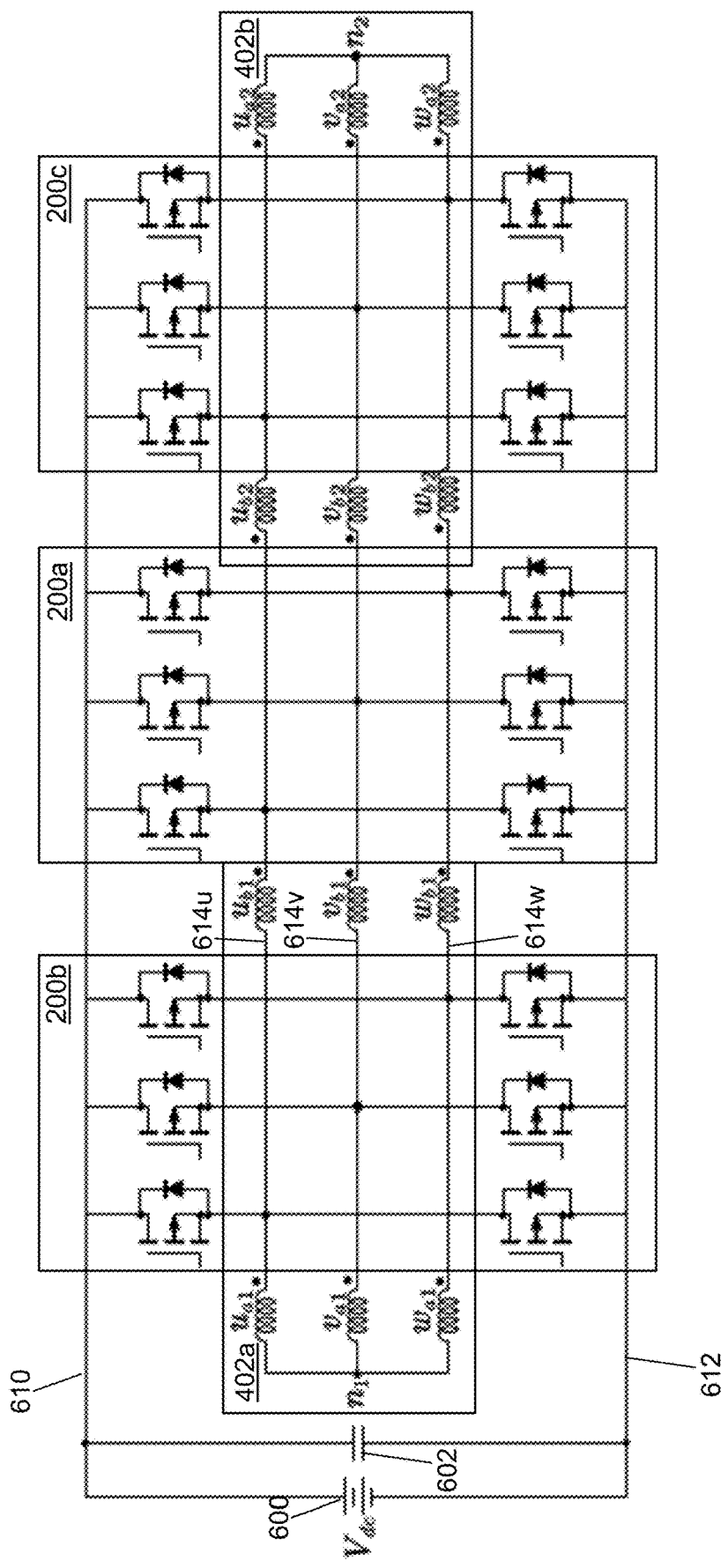
FIG. 6A depicts a circuit diagram for the winding configuration of FIG. 4A in accordance with an illustrative embodiment.
Figure 6B:
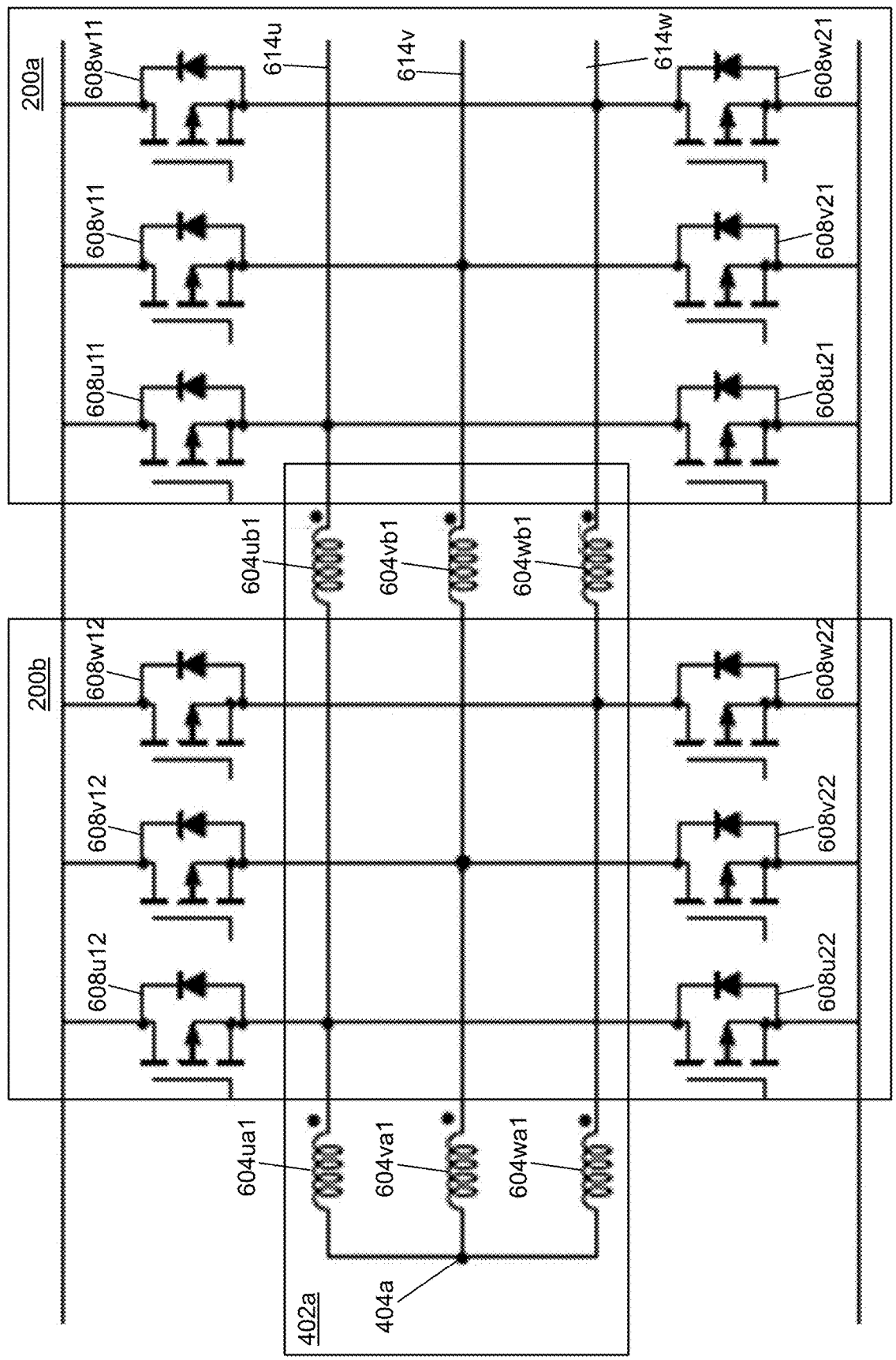
FIG. 6B depicts a zoomed view of the circuit diagram FIG. 6A showing a first inverter and a second inverter in accordance with an illustrative embodiment.
Figure 6C:
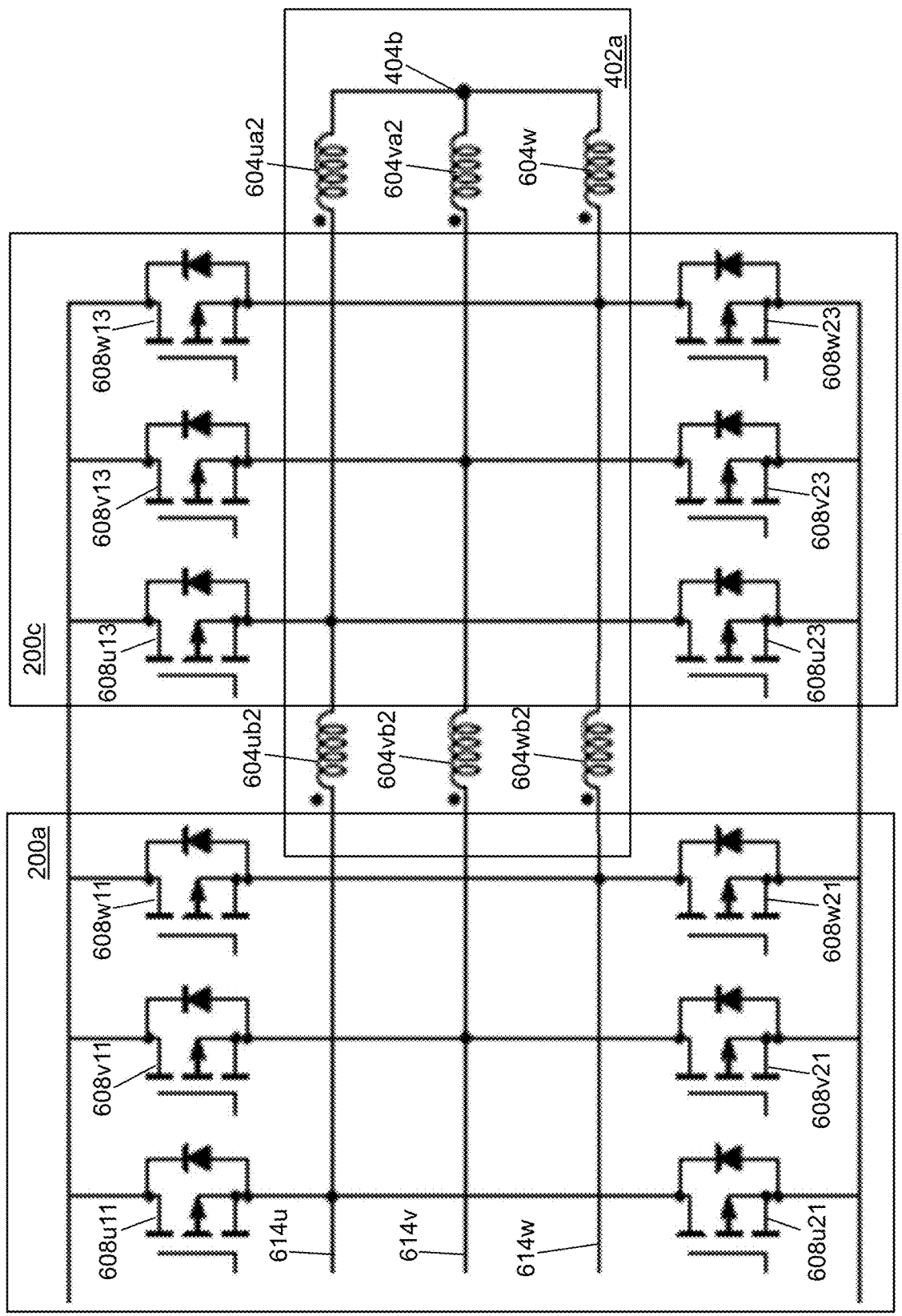
FIG. 6C depicts a zoomed view of the circuit diagram FIG. 6A showing the first inverter and a third inverter in accordance with an illustrative embodiment.

Referring to FIG. 6A, a circuit diagram for first stator winding connection 400a is shown in accordance with an illustrative embodiment. Referring to FIG. 6B, a zoomed view of the circuit diagram FIG. 6A showing first inverter 200a and second inverter 200b is shown in accordance with an illustrative embodiment. Referring to FIG. 6C, a zoomed view of the circuit diagram FIG. 6A showing first inverter 200a and third inverter 200c is shown in accordance with an illustrative embodiment.

A machine voltage source 600 is connected in parallel across a capacitor 602, first inverter 200a, second inverter 200b, and third inverter 200a between a first line 610 and a second line 612. First stator winding connection 400a includes a first phase, first machine, first winding 604ua1, a second phase, first machine, first winding 604va1, a third phase, first machine, first winding 604wa1, a first phase, first machine, second winding 604ub1, a second phase, first machine, second winding 604vb1, a third phase, first machine, second winding 604wb1, first neutral connector 404a, a first phase, second machine, first winding 604ua2, a second phase, second machine, first winding 604va2, a third phase, second machine, first winding 604wa2, a first phase, second machine, second winding 604ub2, a second phase, second machine, second winding 604vb2, a third phase, second machine, second winding 604wb2, and second neutral connector 404b.

A first phase line 614u connects first phase, first machine, first winding 604ua1, first phase, first machine, second winding 604ub1, first phase, second machine, second winding 604ub2, and first phase, second machine, first winding 604ua2 in series between first neutral connector 404a and second neutral connector 404b. A second phase line 614v connects second phase, first machine, first winding 604va1, second phase, first machine, second winding 604vb1, second phase, second machine, second winding 604vb2, and second phase, second machine, first winding 604va2 in series between first neutral connector 404a and second neutral connector 404b. A third phase line 614w connects third phase, first machine, first winding 604wa1, third phase, first machine, second winding 604wb1, third phase, second machine, second winding 604wb2, and third phase, second machine, first winding 604wa2 in series between first neutral connector 404a and second neutral connector 404b.

First inverter 200a may include a first phase, first inverter, first transistor 608u11, a first phase, first inverter, second transistor 608u21, a second phase, first inverter, first transistor 608v11, a second phase, first inverter, second transistor 608v21, a third phase, first inverter, first transistor 608w11, and a third phase, first inverter, second transistor 608w21. First phase, first inverter, first transistor 608u11 and first phase, first inverter, second transistor 608u21 are connected in series between first line 610 and second line 612 as understood by a person of skill in the art. A portion of first phase line 614u between first phase, first machine, second winding 604ub1 and first phase, second machine, second winding 604ub2 is connected between first phase, first inverter, first transistor 608u11 and first phase, first inverter, second transistor 608u21.

Similarly, second phase, first inverter, first transistor 608v11 and second phase, first inverter, second transistor 608v21 are connected in series between first line 610 and second line 612. A portion of second phase line 614v between second phase, first machine, second winding 604vb1 and second phase, second machine, second winding 604vb2 is connected between second phase, first inverter, first transistor 608v11 and second phase, first inverter, second transistor 608v21.

Similarly, third phase, first inverter, first transistor 608w11 and third phase, first inverter, second transistor 608w21 are connected in series between first line 610 and second line 612. A portion of third phase line 614w between third phase, first machine, second winding 604wb1 and third phase, second machine, second winding 604wb2 is connected between third phase, first inverter, first transistor 608w11 and third phase, first inverter, second transistor 608w21.

Second inverter 200b may include a first phase, second inverter, first transistor 608u12, a first phase, second inverter, second transistor 608u22, a second phase, second inverter, first transistor 608v12, a second phase, second inverter, second transistor 608v22, a third phase, second inverter, first transistor 608w12, and a third phase, second inverter, second transistor 608w22. First phase, second inverter, first transistor 608u12 and first phase, second inverter, second transistor 608u22 are connected in series between first line 610 and second line 612 as understood by a person of skill in the art. A portion of first phase line 614u between first phase, first machine, first winding 604ua1 and first phase, first machine, second winding 604ub1 is connected between first phase, second inverter, first transistor 608u12 and first phase, second inverter, second transistor 608u22.

Similarly, second phase, second inverter, first transistor 608v12 and second phase, second inverter, second transistor 608v22 are connected in series between first line 610 and second line 612. A portion of second phase line 614v between second phase, first machine, first winding 604va1 and second phase, first machine, second winding 604vb1 is connected between second phase, second inverter, first transistor 608v12 and second phase, second inverter, second transistor 608v22.

Similarly, third phase, second inverter, first transistor 608w12 and third phase, second inverter, second transistor 608w22 are connected in series between first line 610 and second line 612. A portion of third phase line 614w between third phase, first machine, first winding 604wa1 and third phase, first machine, second winding 604wb1 is connected between third phase, second inverter, first transistor 608w12 and third phase, second inverter, second transistor 608w22.

Third inverter 200c may include a first phase, third inverter, first transistor 608u13, a first phase, third inverter, second transistor 608u23, a second phase, third inverter, first transistor 608v13, a second phase, third inverter, second transistor 608v23, a third phase, third inverter, first transistor 608w13, and a third phase, third inverter, second transistor 608w23. First phase, third inverter, first transistor 608u13 and first phase, third inverter, second transistor 608u23 are connected in series between first line 610 and second line 612 as understood by a person of skill in the art. A portion of first phase line 614u between first phase, second machine, second winding 604ub2 and first phase, second machine, first winding 604ua2 is connected between first phase, third inverter, first transistor 608u13 and first phase, third inverter, second transistor 608u23.

Similarly, second phase, third inverter, first transistor 608v13 and second phase, second inverter, second transistor 608v23 are connected in series between first line 610 and second line 612. A portion of second phase line 614v between second phase, second machine, second winding 604vb2 and second phase, second machine, first winding 604va2 is connected between second phase, third inverter, first transistor 608v13 and second phase, third inverter, second transistor 608v23.

Similarly, third phase, third inverter, first transistor 608w13 and third phase, second inverter, second transistor 608w23 are connected in series between first line 610 and second line 612. A portion of third phase line 614w between third phase, second machine, second winding 604wb2 and third phase, second machine, first winding 604a2 is connected between third phase, third inverter, first transistor 608w12 and third phase, third inverter, second transistor 608w23.

A half-bridge is included for each phase output from first inverter 200a, second inverter 200b, and third inverter 200c. Each half bridge includes a first transistor such as first phase, second inverter, first transistor 608u12 and a second transistor such as first phase, second inverter, second transistor 608u22 with the phase line to a stator winding therebetween as understood by a person of skill in the art.

Referring again to FIG. 4A, in first stator winding 402a, the positive terminal of first machine, second winding is connected to a respective phase terminal of first inverter 200a and the negative terminal of first machine, second winding is connected to the positive terminal of first machine, first winding and the negative terminal of first machine, first winding is connected to first neutral connector 404a. The positive terminal of first machine, first winding is also connected to a respective phase terminal of second inverter 200b. In second stator winding 402b, the positive terminal of second machine, second winding is connected to a respective phase terminal of first inverter 200a and the negative terminal of second machine, second winding is connected to the positive terminal of second machine, first winding and the negative terminal of second machine, first winding is connected to second neutral connector 404b. The positive terminal of second machine, first winding is also connected to a respective phase terminal of third inverter 200c.

In summary, in the illustrative configuration of FIGS. 4A, 5, and 6A, each respective phase winding is connected in series in the order, first neutral connector 404a, the first machine, first winding followed by the first machine, second winding followed by the second machine, second winding followed by the second machine, first winding followed by second neutral connector 404b. Second inverter 200b is connected between the first machine, first winding and the first machine, second winding. First inverter 200a is connected between the first machine, second winding and the second machine, second winding. Third inverter 200c is connected between the second machine, second winding and the second machine, first winding.

As understood by a person of skill in the art, each transistor may include a drain, a gate, and a source like a metal-oxide-semiconductor field-effect transistor (MOSFET) or include a collector, a gate, and an emitter like an insulated-gate bipolar transistor (IGBT), or include a collector, a base, and an emitter like a bipolar junction transistor (BJT). Depending on the switching logic and whether each transistor is an n-type or a p-type, the drain and the source may be reversed. A voltage or current applied to the gate or base determines a switching state of each transistor. Controller 110 continuously provides gate signals to control a state of each transistor to generate the inverter currents. At any point in time, only one of the first transistor and the second transistor of each half-bridge is effectively closed.

Figure 4B:
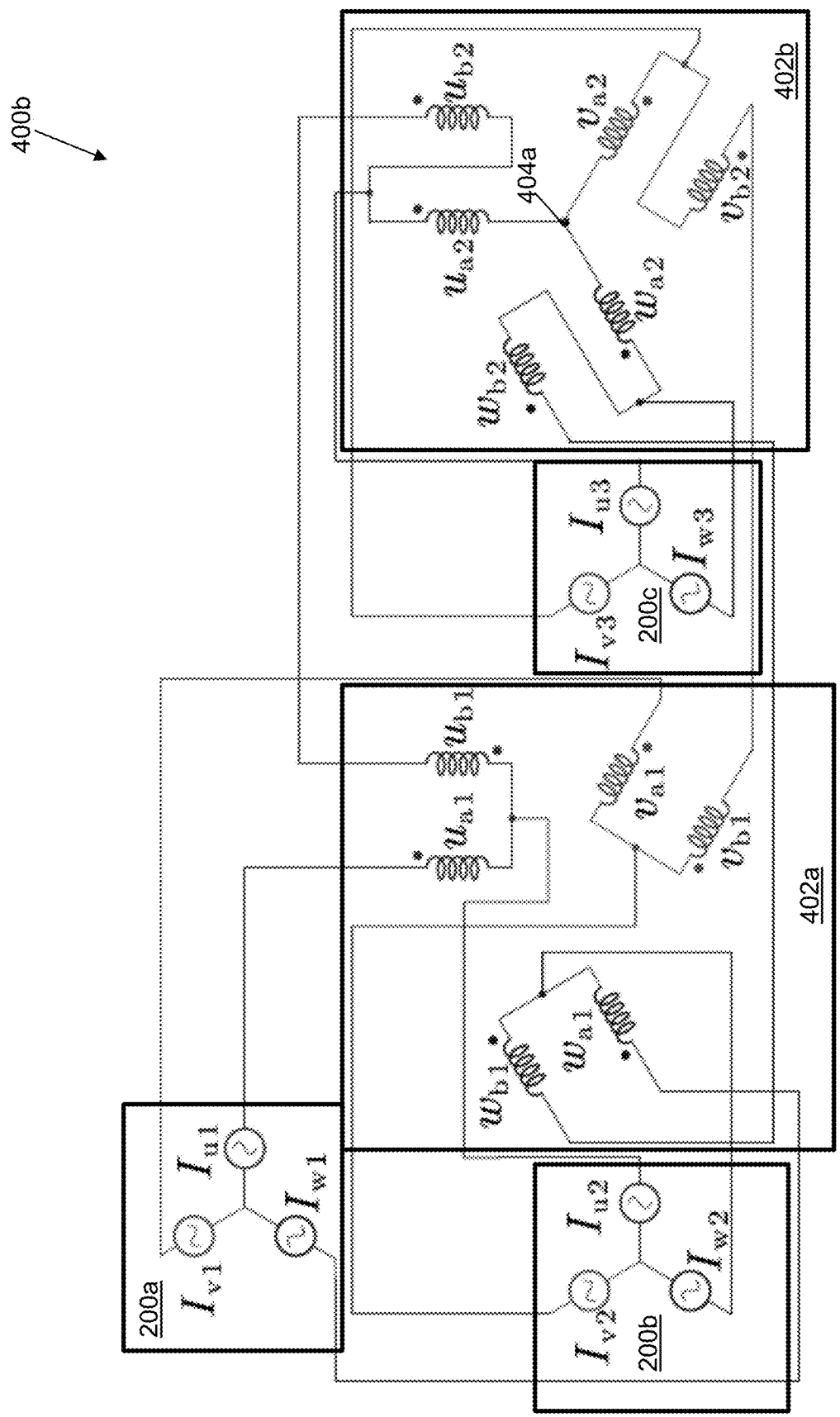

Referring to FIG. 4B, a second stator winding connection 400b is shown that includes first stator winding 402a and second stator winding 402b. First stator winding 402a connects $u_{a1}$, $u_{b1}$, $v_{a1}$, $v_{b1}$, and $w_{a1}$, $w_{b1}$ between first inverter 200a and second inverter 200b. Second stator winding 402b connects $u_{a2}$, $u_{b2}$, $v_{a2}$, $v_{b2}$, and $w_{a2}$, $w_{b2}$ between third inverter 200c and the respective phase windings of first stator winding 402a. Second stator winding connection 400b is a second example of first coil group structure 708a.

In the illustrative configuration of FIG. 4B, in first stator winding 402a, the positive terminal of first machine, first winding is connected to the respective phase terminal of first inverter 200a and the negative terminal of first machine, first winding is connected to the positive terminal of first machine, second winding and to a respective phase terminal of second inverter 200b. The negative terminal of first machine, second winding is also connected to the positive terminal of second machine, second winding. In second stator winding 402b, the negative terminal of second machine, second winding is connected to a respective phase terminal of third inverter 200c and the negative terminal of second machine, first winding. The negative terminal of second machine, first winding is connected to first neutral connector 404a.

For second stator winding connection 400b, $$T_c = \begin{bmatrix} 1 & 0 & 0 \\ 1 & 1 & 0 \\ 1 & 1 & 1 \\ 1 & 1 & 0 \end{bmatrix}$$

$$\vec{i}_{a1} = \frac{1}{4}\vec{i}_t - \frac{3}{2}\vec{i}_{s,1} + \frac{1}{2}\vec{i}_{s,2}, \vec{i}_{b1} = \frac{1}{4}\vec{i}_t + \frac{1}{2}\vec{i}_{s,1} + \frac{1}{2}\vec{i}_{s,2},$$

$$\vec{i}_{a2} = \frac{1}{4}\vec{i}_t + \frac{1}{2}\vec{i}_{s,1} - \frac{3}{2}\vec{i}_{s,2},$$

$$\vec{i}_{b2} = \frac{1}{4}\vec{i}_t + \frac{1}{2}\vec{i}_{s,1} + \frac{1}{2}\vec{i}_{s,2}$$

$$\vec{i}_1 = \frac{1}{4}\vec{i}_t - \frac{3}{2}\vec{i}_{s,1} + \frac{1}{2}\vec{i}_{s,2}, \vec{i}_2 = 2\vec{i}_{s,1}, \vec{i}_3 = -2\vec{i}_{s,2}$$

Figure 4C:
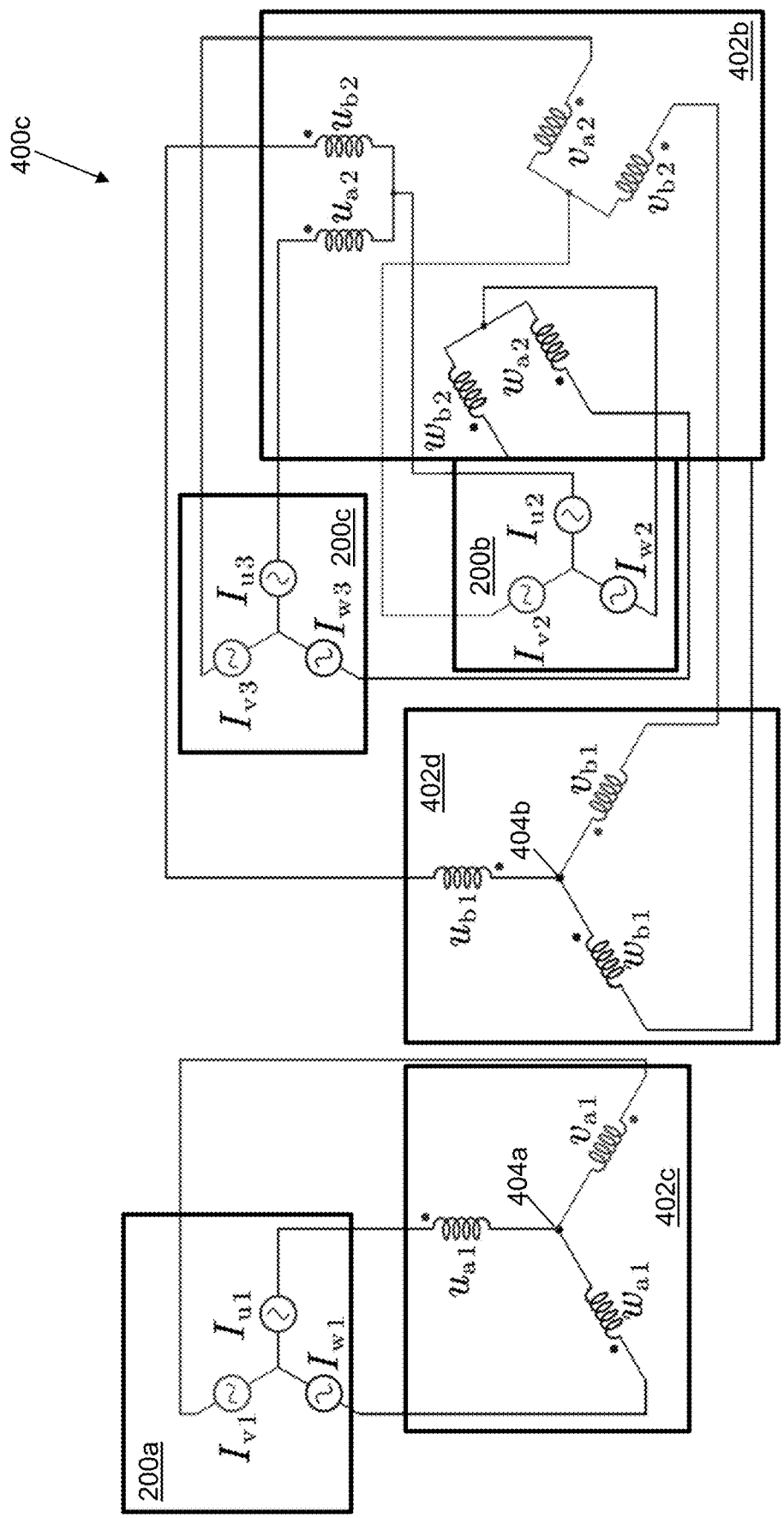

Referring to FIG. 4C, a third stator winding connection 400c is shown that includes a first stator MP winding 402c, a second stator MP winding 402d, and second stator winding 402b. First stator MP winding 402c connects $u_{a1}$, $v_{a1}$, and $w_{a1}$ to first inverter 200a. Second stator winding 402b connects $u_{a2}$, $u_{b2}$, $v_{a2}$, $v_{b2}$, and $w_{a2}$, $w_{b2}$ between third inverter 200c and the respective phase windings of second stator MP winding 402d. Third stator winding connection 400c is an example of second coil group structure 708b.

In the illustrative configuration of FIG. 4C, the positive terminal of first machine, first winding is connected to the respective phase terminal of first inverter 200a and the negative terminal of first machine, first winding is connected to first neutral connector 404a. In second stator winding 402b, the positive terminal of second machine, first winding is connected to the respective phase terminal of third inverter 200c and the negative terminal of second machine, first winding is connected to the negative terminal of second machine, second winding. The positive terminal of second machine, second winding is connected to the negative terminal of first machine, second winding. The negative terminal of first machine, second winding is connected to second neutral connector 404b. The negative terminal of second machine, first winding and of second machine, second winding is connected to the respective phase terminal of second inverter 200b.

Figure 8A:
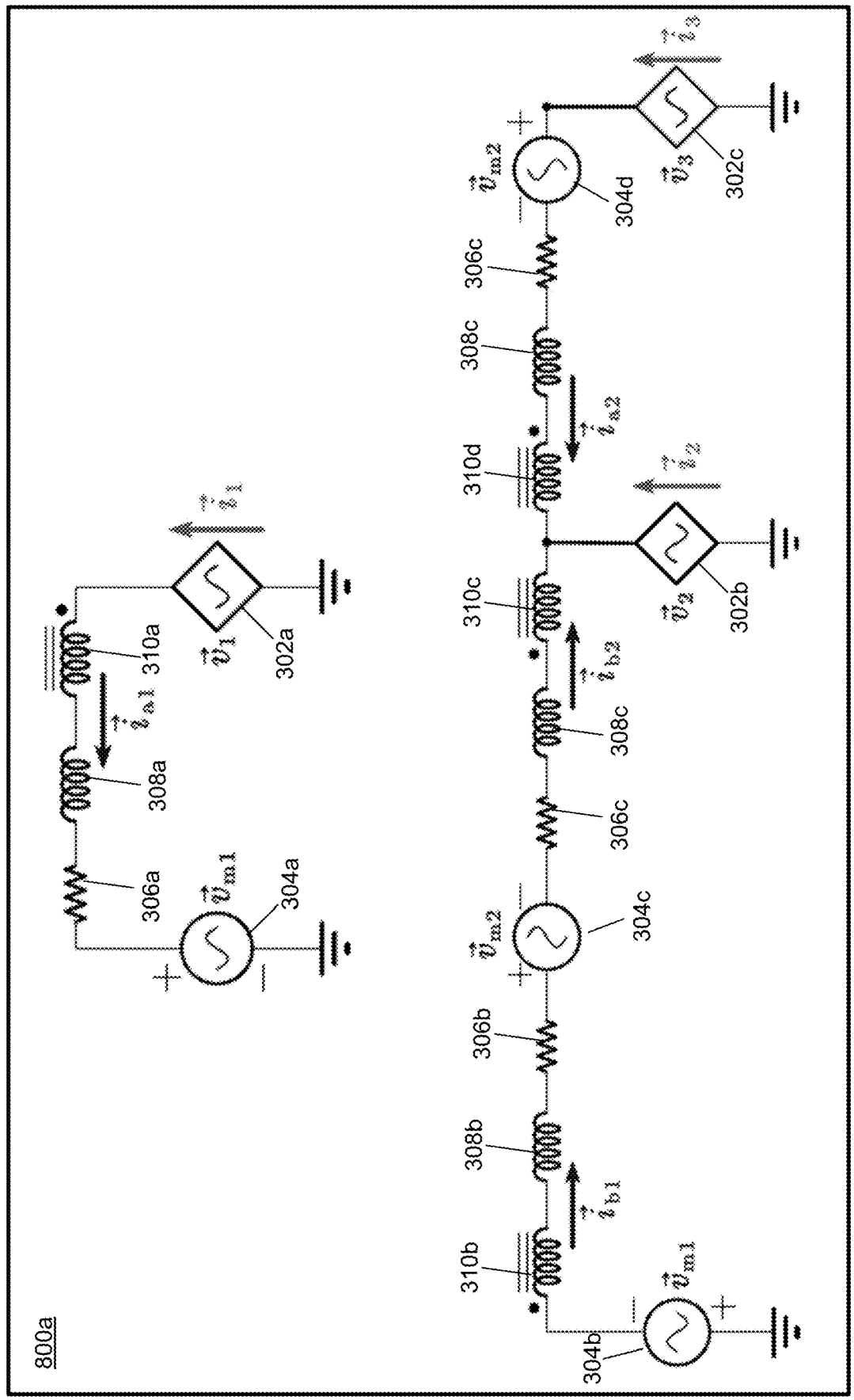
FIGS. 8A-8F depict space-vector diagrams for the stator winding configurations of FIG. 4C-4H, respectively, in accordance with an illustrative embodiment.

Referring to FIG. 8A, a third space-vector diagram 800a is shown for third stator winding connection 400c in accordance with an illustrative embodiment. For third stator winding connection 400c, $$T_c = \begin{bmatrix} 1 & 0 & 0 \\ 0 & -1 & -1 \\ 0 & 0 & 1 \\ 0 & -1 & -1 \end{bmatrix}$$

$$\vec{i}_{a1} = \frac{1}{4}\vec{i}_t - \frac{3}{2}\vec{i}_{s,1} + \frac{1}{2}\vec{i}_{s,2}, \vec{i}_{b1} = \frac{1}{4}\vec{i}_t + \frac{1}{2}\vec{i}_{s,1} + \frac{1}{2}\vec{i}_{s,2},$$

$$\vec{i}_{a2} = \frac{1}{4}\vec{i}_t + \frac{1}{2}\vec{i}_{s,1} - \frac{3}{2}\vec{i}_{s,2},$$

$$\vec{i}_{b2} = \frac{1}{4}\vec{i}_t + \frac{1}{2}\vec{i}_{s,1} + \frac{1}{2}\vec{i}_{s,2}$$

$$\vec{i}_1 = \frac{1}{4}\vec{i}_t - \frac{3}{2}\vec{i}_{s,1} + \frac{1}{2}\vec{i}_{s,2}, \vec{i}_2 = -\frac{1}{2}\vec{i}_t - \vec{i}_{s,1} + \vec{i}_{s,2},$$

$$\vec{i}_3 = \frac{1}{4}\vec{i}_t + \frac{1}{2}\vec{i}_{s,1} - \frac{3}{2}\vec{i}_{s,2}$$

Figure 4D:
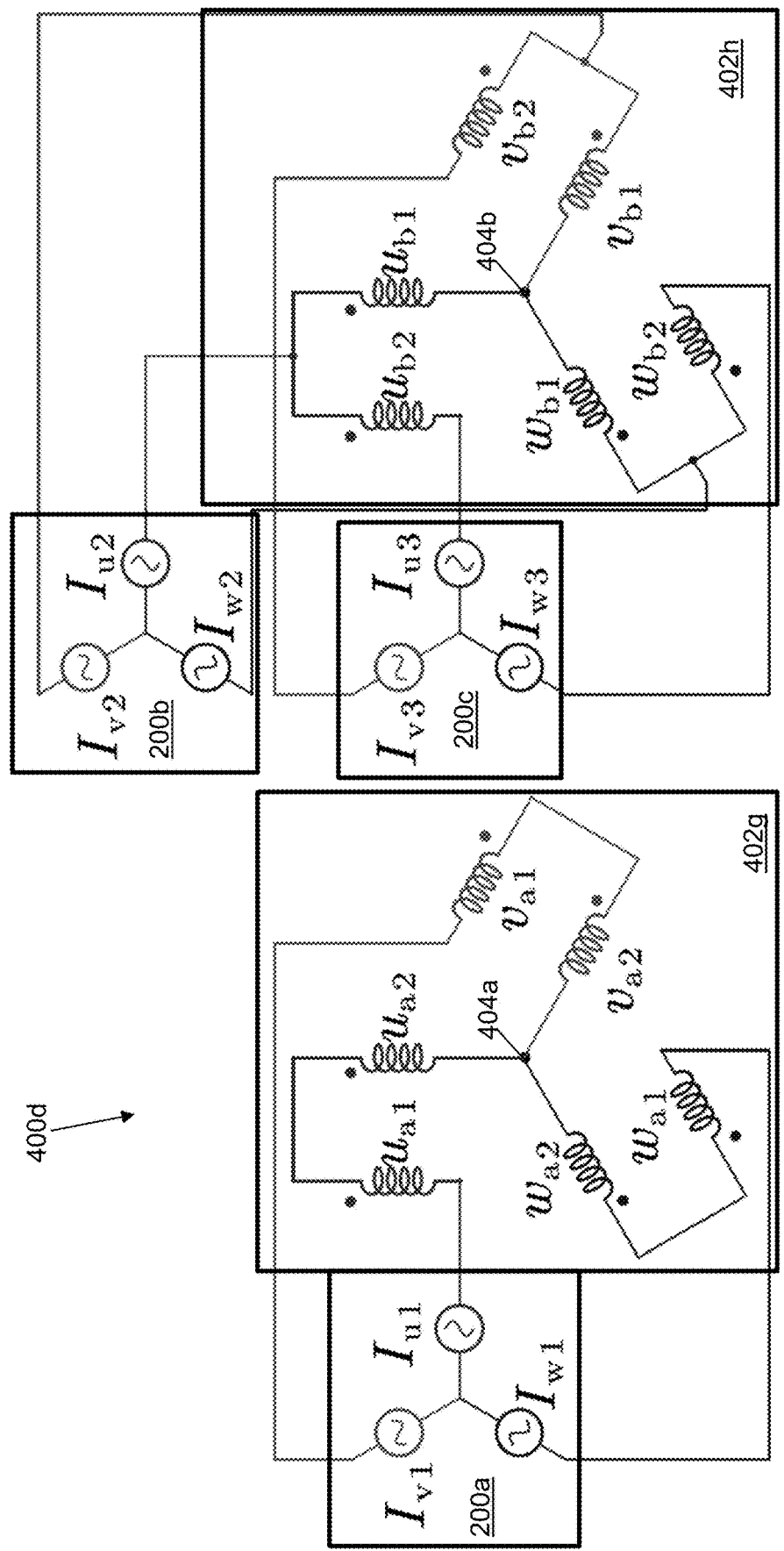

Referring to FIG. 4D, a fourth stator winding connection 400d is shown that includes a third stator winding 402g and a fourth stator winding 402h. Third stator winding 402g connects $u_{a1}$, $u_{a2}$, $v_{a1}$, $v_{a2}$, and $w_{a1}$, $w_{a2}$ between first inverter 200a and first neutral connector 404a. Fourth stator winding 402h connects $u_{b1}$, $u_{b2}$, $v_{b1}$, $v_{b2}$, and $w_{b1}$, $w_{b2}$ between third inverter 200c and second inverter 200b. Fourth stator winding connection 400d is an example of third coil group structure 708c.

In third stator winding 402g, the negative terminal of first machine, first winding is connected to the respective phase terminal of first inverter 200a and the positive terminal of first machine, first winding is connected to the positive terminal of second machine, first winding. The negative terminal of second machine, first winding is connected to first neutral connector 404a. In fourth stator winding 402h, the negative terminal of second machine, second winding is connected to the respective phase terminal of third inverter 200c and the positive terminal of second machine, second winding is connected to the positive terminal of first machine, second winding and to the respective phase terminal of second inverter 200b. The negative terminal of first machine, second winding is connected to second neutral connector 404b.

Figure 8B:
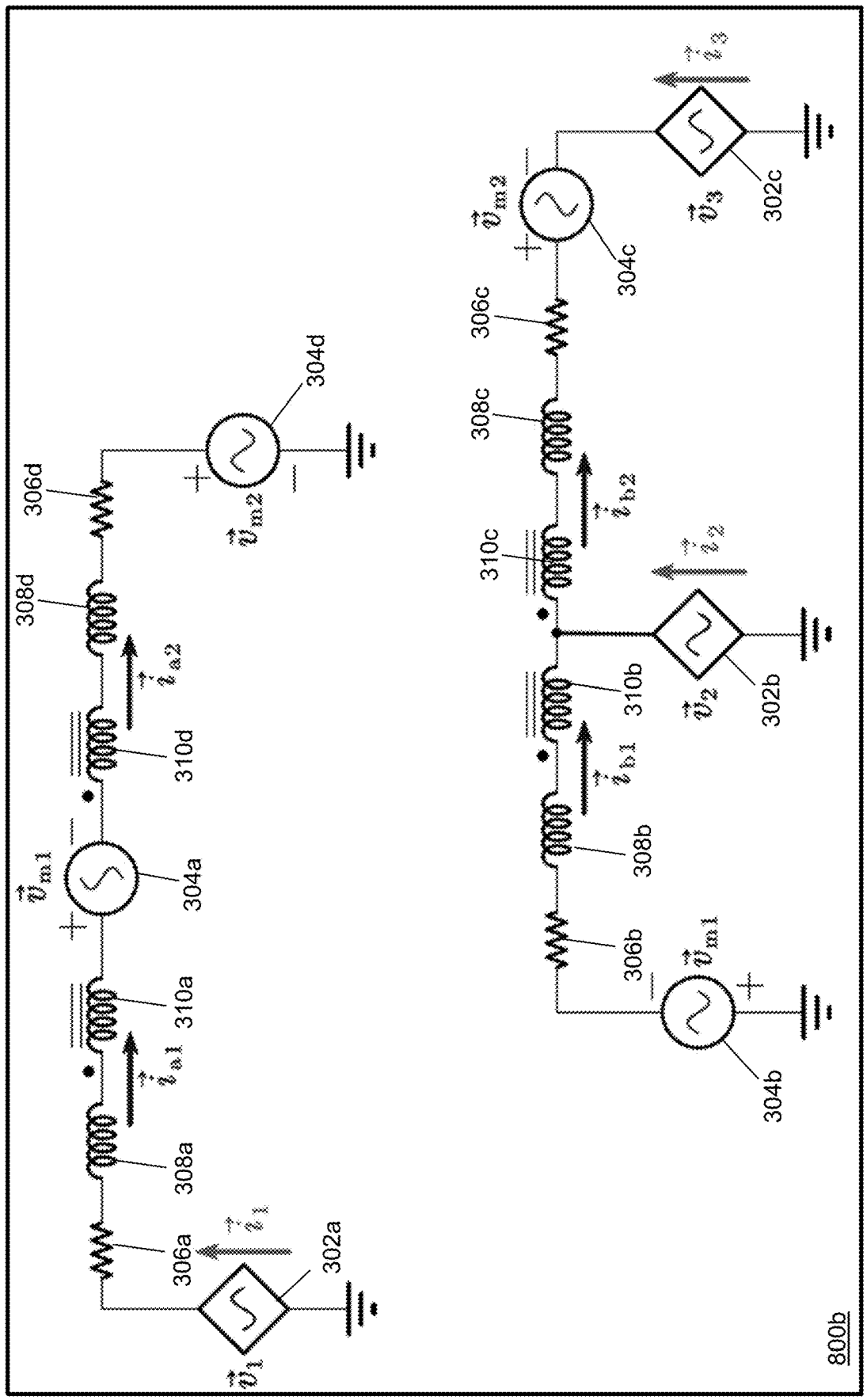

Referring to FIG. 8B, a fourth space-vector diagram 800*b* is shown for fourth stator winding connection 400*d* in accordance with an illustrative embodiment. For fourth stator winding connection 400*d*, $$T_c = \begin{bmatrix} 1 & 0 & 0 \\ 0 & 1 & 1 \\ 1 & 0 & 0 \\ 0 & 0 & -1 \end{bmatrix}$$

$$\vec{i}_{a1} = \frac{1}{4}\vec{i}_t - \frac{1}{2}\vec{i}_{s,1} - \frac{1}{2}\vec{i}_{s,2}, \vec{i}_{b1} = \frac{1}{4}\vec{i}_t + \frac{3}{2}\vec{i}_{s,1} - \frac{1}{2}\vec{i}_{s,2},$$

$$\vec{i}_{a2} = \frac{1}{4}\vec{i}_t - \frac{1}{2}\vec{i}_{s,1} - \frac{1}{2}\vec{i}_{s,2},$$

$$\vec{i}_{b2} = \frac{1}{4}\vec{i}_t - \frac{1}{2}\vec{i}_{s,1} + \frac{3}{2}\vec{i}_{s,2}$$

$$\vec{i}_1 = \frac{1}{4}\vec{i}_t - \frac{1}{2}\vec{i}_{s,1} - \frac{1}{2}\vec{i}_{s,2}, \vec{i}_2 = \frac{1}{2}\vec{i}_t + \vec{i}_{s,1} + \vec{i}_{s,2},$$

$$\vec{i}_3 = -\frac{1}{4}\vec{i}_t + \frac{1}{2}\vec{i}_{s,1} - \frac{3}{2}\vec{i}_{s,2}$$

Figure 4E:
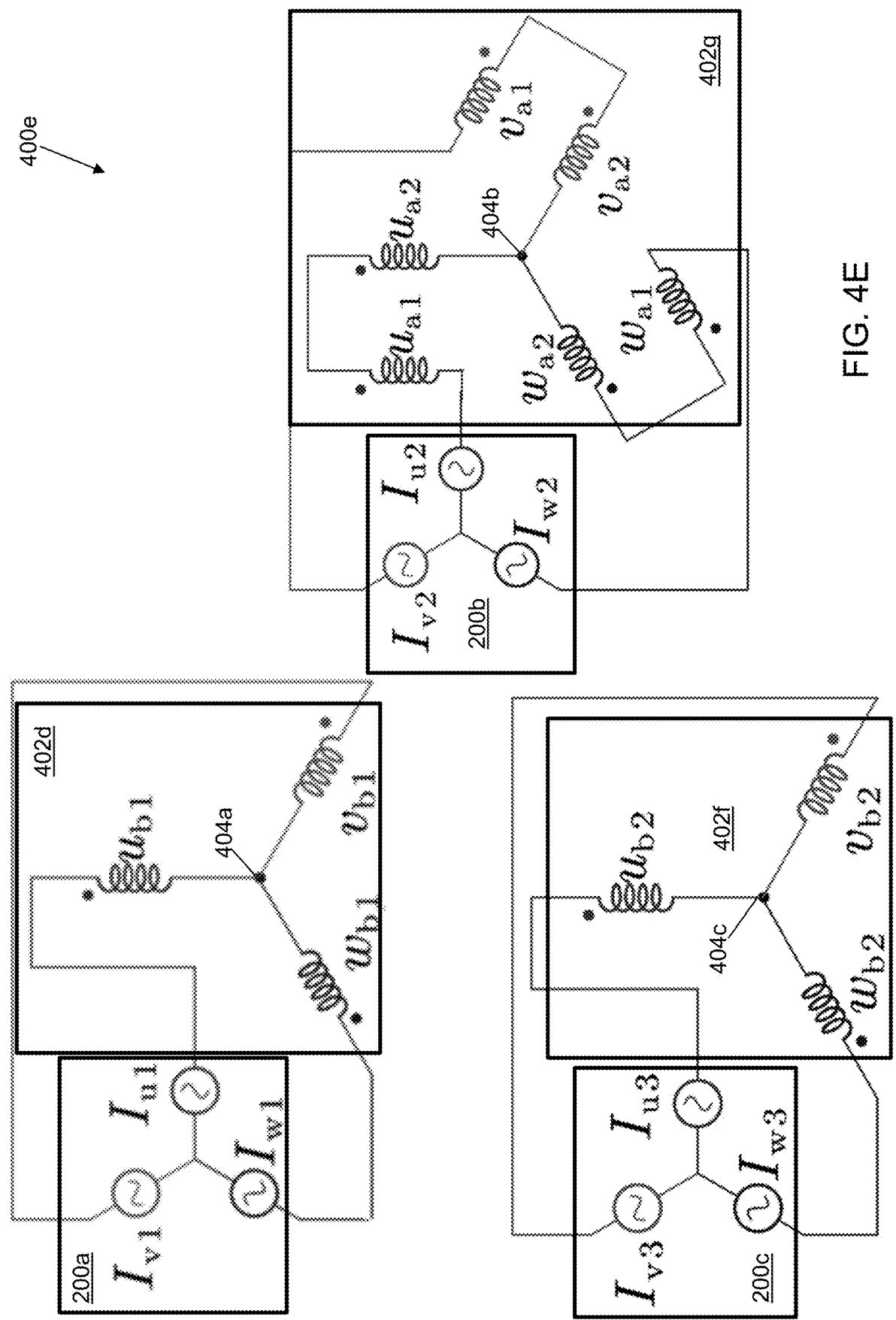

Referring to FIG. 4E, a fifth stator winding connection 400*e* is shown that includes second stator MP winding 402*d*, third stator winding 402*g* and a third stator MP winding 402*f*. Second stator MP winding 402*d* connects $u_{b1}$, $v_{b1}$, and $w_{b1}$ between first inverter 200*a* and first neutral connector 404*a*. Third stator winding 402*g* connects $u_{a1}$, $u_{a2}$, $v_{a1}$, $v_{a2}$, and $w_{a1}$, $w_{a2}$ between second inverter 200*b* and second neutral connector 404*b*. Third stator MP winding 402*f* connects $u_{b2}$, $v_{b2}$, and $w_{b2}$ between third inverter 200*c* and a third neutral connector 404*c*. Fifth stator winding connection 400*e* is an example of fourth coil group structure 708*d*.

In third stator winding 402*g*, the negative terminal of first machine, first winding is connected to a respective phase terminal of second inverter 200*b* and the positive terminal of first machine, first winding is connected to the positive terminal of second machine, first winding. The negative terminal of second machine, first winding is connected to second neutral connector 404*b*. In second stator MP winding 402*d*, the positive terminal of first machine, second winding is connected to a respective phase terminal of first inverter 200*a* and the negative terminal of first machine, second winding is connected to first neutral connector 404*a*. In third stator MP winding 402*f*, the positive terminal of second machine, second winding is connected to a respective phase terminal of third inverter 200*c* and the negative terminal of second machine, second winding is connected to third neutral connector 404*c*.

Figure 8C:
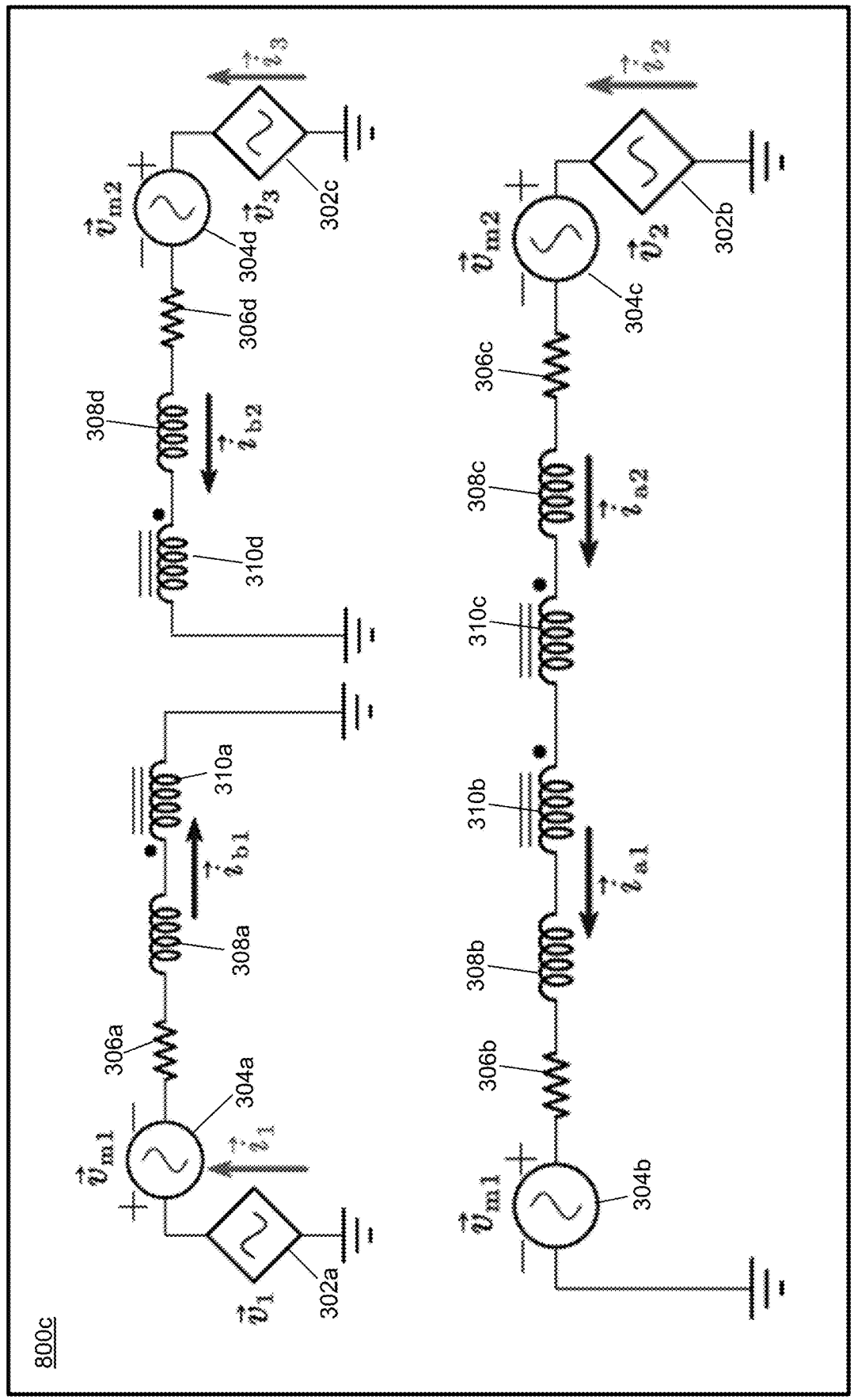

Referring to FIG. 8C, a fifth space-vector diagram 800*c* is shown for fifth stator winding connection 400*e* in accordance with an illustrative embodiment. For fifth stator winding connection 400*e*, $$T_c = \begin{bmatrix} 0 & 1 & 0 \\ 1 & 0 & 0 \\ 0 & 1 & 0 \\ 0 & 0 & 1 \end{bmatrix}$$

$$\vec{i}_{a1} = \frac{1}{4}\vec{i}_t - \frac{1}{2}\vec{i}_{s,1} - \frac{1}{2}\vec{i}_{s,2}, \vec{i}_{b1} = \frac{1}{4}\vec{i}_t + \frac{3}{2}\vec{i}_{s,1} - \frac{1}{2}\vec{i}_{s,2},$$

$$\vec{i}_{a2} = \frac{1}{4}\vec{i}_t - \frac{1}{2}\vec{i}_{s,1} - \frac{1}{2}\vec{i}_{s,2},$$

$$\vec{i}_{b2} = \frac{1}{4}\vec{i}_t - \frac{1}{2}\vec{i}_{s,1} + \frac{3}{2}\vec{i}_{s,2}$$

-continued $$\vec{i}_1 = \frac{1}{4}\vec{i}_t + \frac{3}{2}\vec{i}_{s,1} - \frac{1}{2}\vec{i}_{s,2}, \vec{i}_2 = \frac{1}{4}\vec{i}_t - \frac{1}{2}\vec{i}_{s,1} - \frac{1}{2}\vec{i}_{s,2},$$

$$\vec{i}_3 = \frac{1}{4}\vec{i}_t - \frac{1}{2}\vec{i}_{s,1} + \frac{3}{2}\vec{i}_{s,2}$$

Figure 4F:
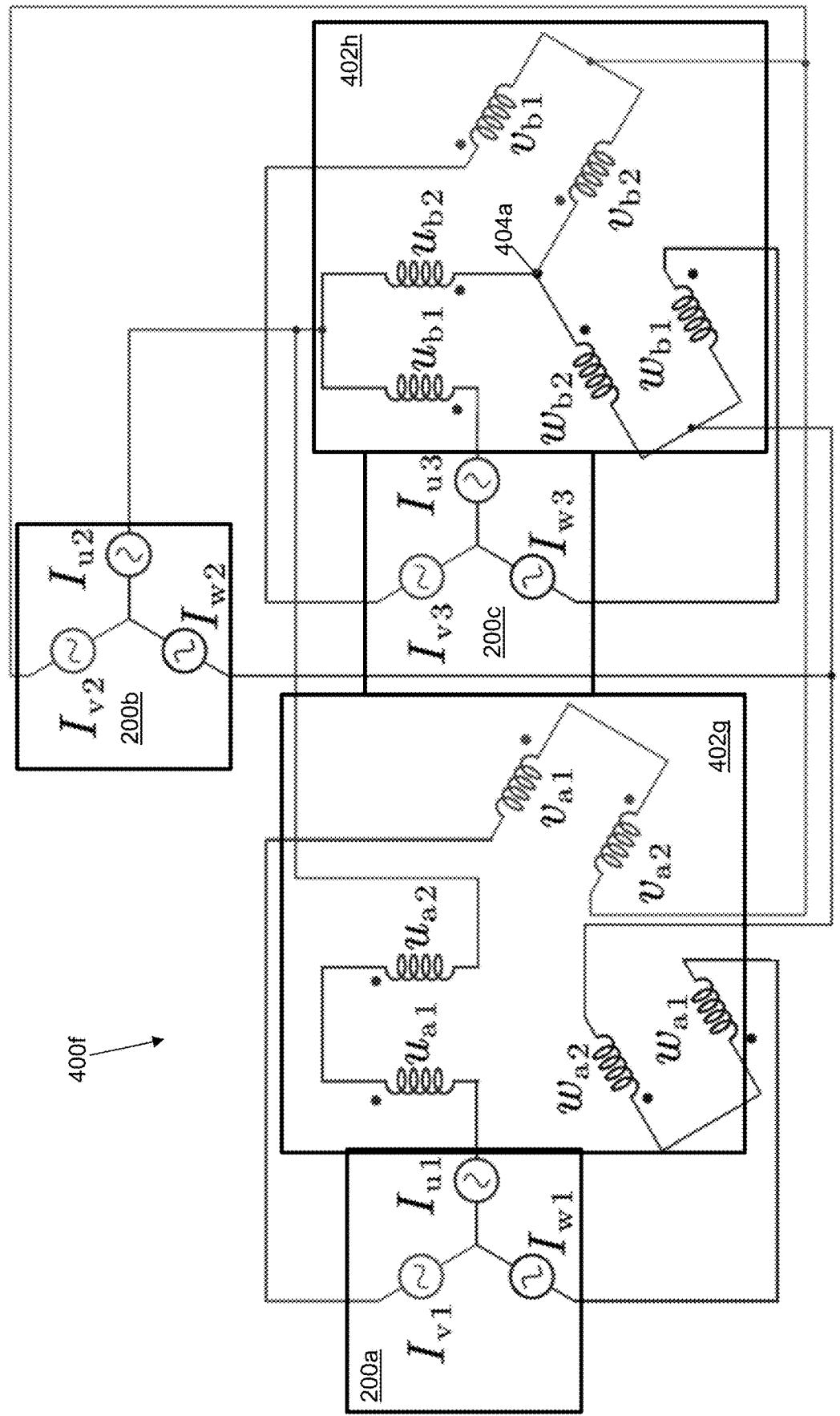

Referring to FIG. 4F, a sixth stator winding connection 400*f* is shown that includes third stator winding 402*g* and fourth stator winding 402*h*. Third stator winding 402*g* connects $u_{a1}$, $u_{a2}$, $v_{a1}$, $v_{a2}$, and $w_{a1}$, $w_{a2}$ between first inverter 20*a* and fourth stator winding 402*h*. Fourth stator winding 402*h* connects $u_{b1}$, $u_{b2}$, $v_{b1}$, $v_{b2}$, and $w_{b1}$, $w_{b2}$ between third inverter 200*c* and second inverter 200*b*. Sixth stator winding connection 400*f* is an example of fifth coil group structure 708*e*.

In third stator winding 402*g*, the negative terminal of first machine, first winding is connected to the respective phase terminal of first inverter 200*a* and the positive terminal of first machine, first winding is connected to the positive terminal of second machine, first winding. The negative terminal of second machine, first winding is connected to the negative terminal of first machine, second winding and of second machine, second winding. The negative terminal of second machine, first winding is also connected to the respective phase terminal of second inverter 200*b*. In fourth stator winding 402*h*, the positive terminal of first machine, second winding is connected to a respective phase terminal of third inverter 200*c* and the negative terminal of first machine, second winding is connected to the negative terminal of second machine, second winding. The positive terminal of second machine, second winding is connected to first neutral connector 404*a*.

Figure 8D:
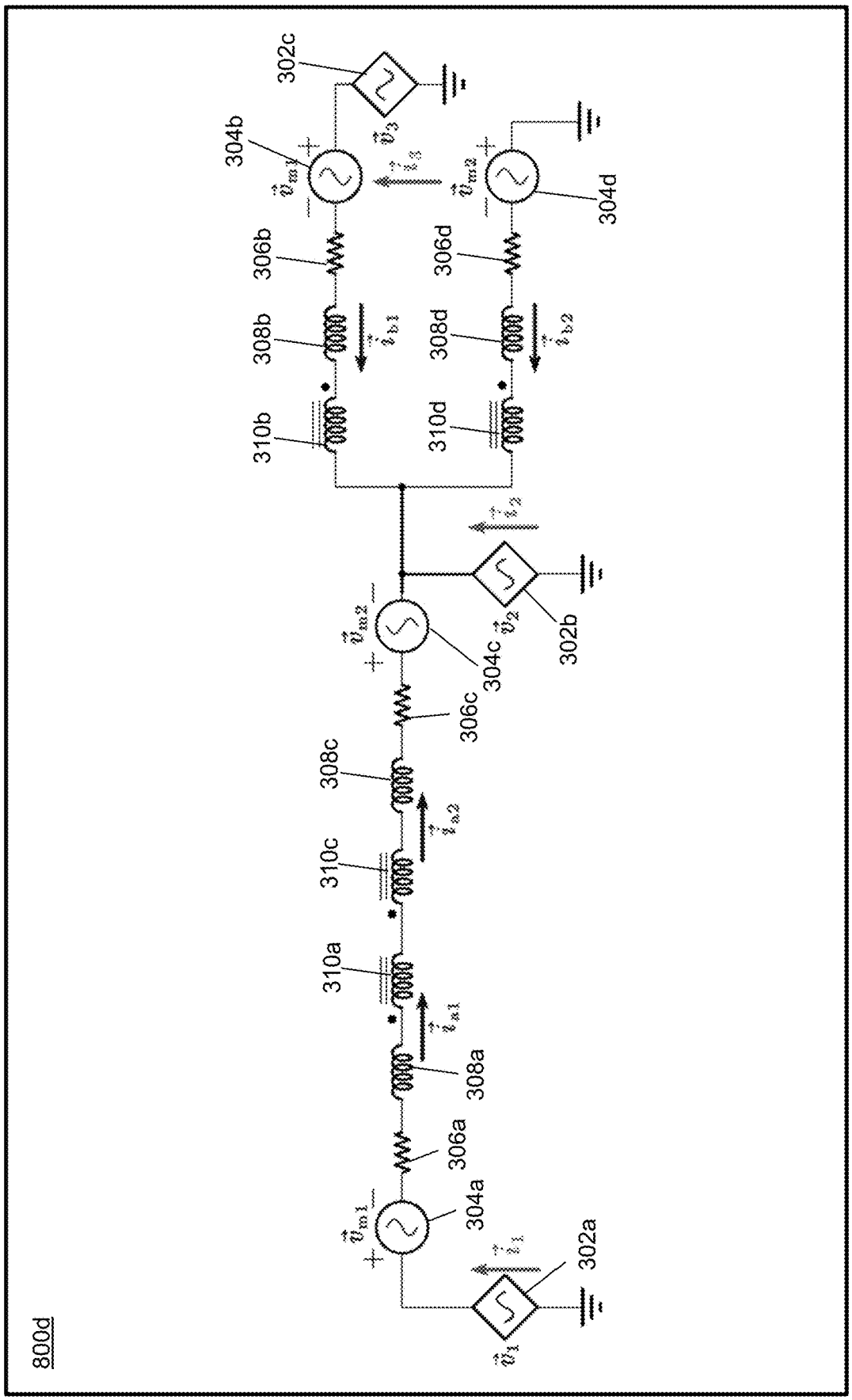

Referring to FIG. 8D, a sixth space-vector diagram 800*d* is shown for sixth stator winding connection 400*f* in accordance with an illustrative embodiment. For sixth stator winding connection 400*f*, $$T_c = \begin{bmatrix} 1 & 0 & 0 \\ 0 & 0 & 1 \\ 1 & 0 & 0 \\ -1 & -1 & -1 \end{bmatrix}$$

$$\vec{i}_{a1} = \frac{1}{4}\vec{i}_t - \frac{1}{2}\vec{i}_{s,1} - \frac{1}{2}\vec{i}_{s,2}, \vec{i}_{b1} = \frac{1}{4}\vec{i}_t + \frac{3}{2}\vec{i}_{s,1} - \frac{1}{2}\vec{i}_{s,2},$$

$$\vec{i}_{a2} = \frac{1}{4}\vec{i}_t - \frac{1}{2}\vec{i}_{s,1} - \frac{1}{2}\vec{i}_{s,2},$$

$$\vec{i}_{b2} = \frac{1}{4}\vec{i}_t - \frac{1}{2}\vec{i}_{s,1} + \frac{3}{2}\vec{i}_{s,2}$$

$$\vec{i}_1 = \frac{1}{4}\vec{i}_t - \frac{1}{2}\vec{i}_{s,1} - \frac{1}{2}\vec{i}_{s,2}, \vec{i}_2 = -\frac{3}{4}\vec{i}_t - \frac{1}{2}\vec{i}_{s,1} - \frac{1}{2}\vec{i}_{s,2},$$

$$\vec{i}_3 = \frac{1}{4}\vec{i}_t + \frac{3}{2}\vec{i}_{s,1} - \frac{1}{2}\vec{i}_{s,2}$$

Figure 4G:
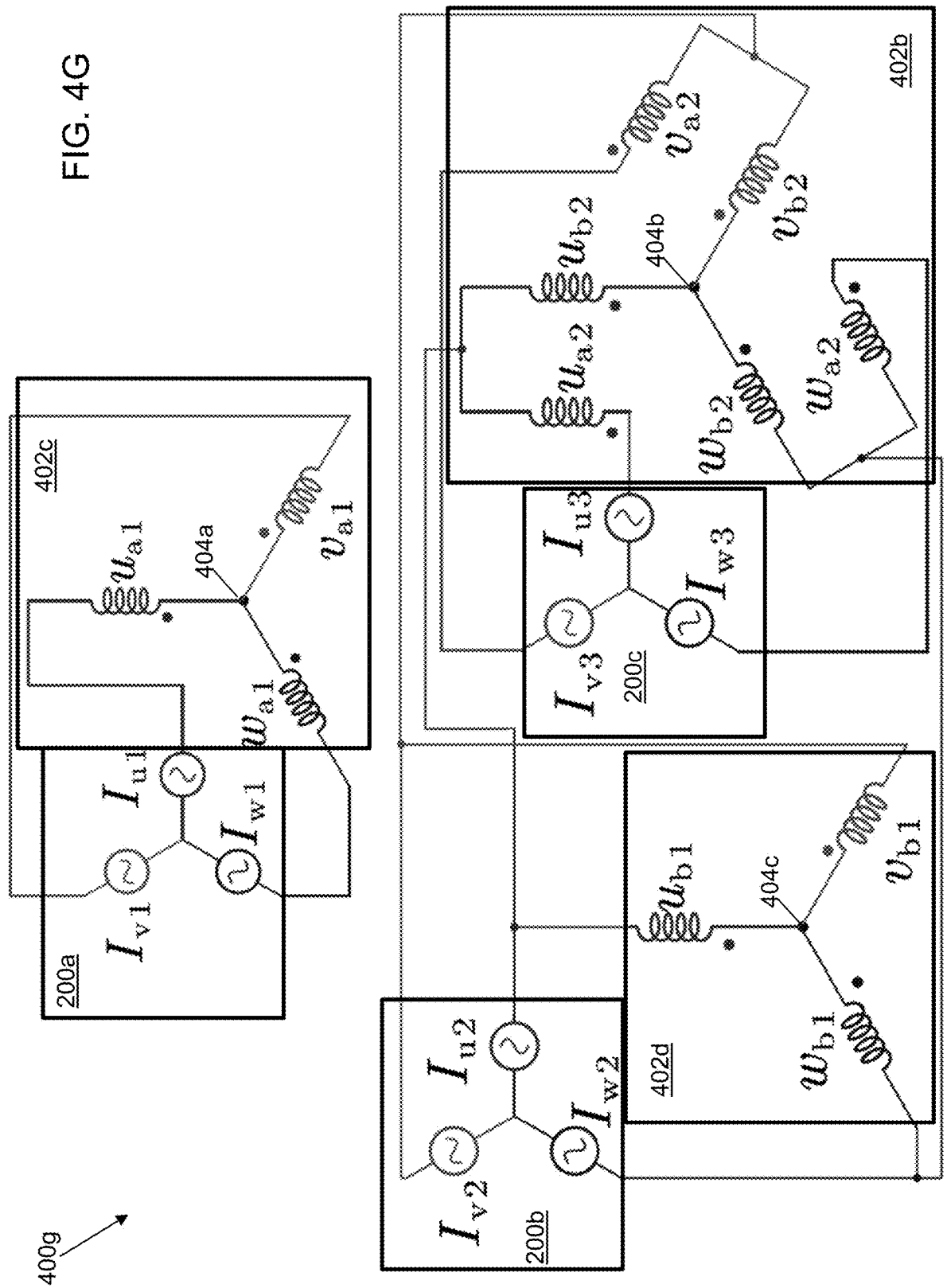

Referring to FIG. 4G, a seventh stator winding connection 400*g* is shown that includes first stator MP winding 402*c*, second stator MP winding 402*d*, and second stator winding 402*b*. First stator MP winding 402*c* connects $u_{a1}$, $v_{a1}$, and $w_{a1}$ between first inverter 200*a* and first neutral connector 404*a*. Second stator winding 402*b* connects $u_{a2}$, $u_{b2}$, $v_{a2}$, $v_{b2}$, and $w_{a2}$, $w_{b2}$ between third inverter 200*c* and the respective phase windings of second stator MP winding 402*d* and second inverter 200*b*. Second stator MP winding 402*d* connects $u_{b1}$, $v_{b1}$, and $w_{b1}$ between second inverter 200*b* and third neutral connector 404*c*. Seventh stator winding connection 400*g* is an example of sixth coil group structure 708*f*.

In first stator MP winding 402c, the negative terminal of first machine, first winding is connected to the respective phase terminal of first inverter 200a and the positive terminal of first machine, first winding is connected to first neutral connector 404a. In second stator MP winding 402d, the negative terminal of first machine, second winding is connected to a respective phase terminal of second inverter 200b and the positive terminal of first machine, second winding is connected to third neutral connector 404c. In second stator winding 402b, the positive terminal of second machine, first winding is connected to a respective phase terminal of third inverter 200c and the negative terminal of second machine, first winding is connected to the negative terminal of second machine, second winding and to the negative terminal of first machine, second winding. The positive terminal of second machine, second winding is connected to second neutral connector 404b. The positive terminal of second machine, second winding is connected to second neutral connector 404b.

Figure 8E:
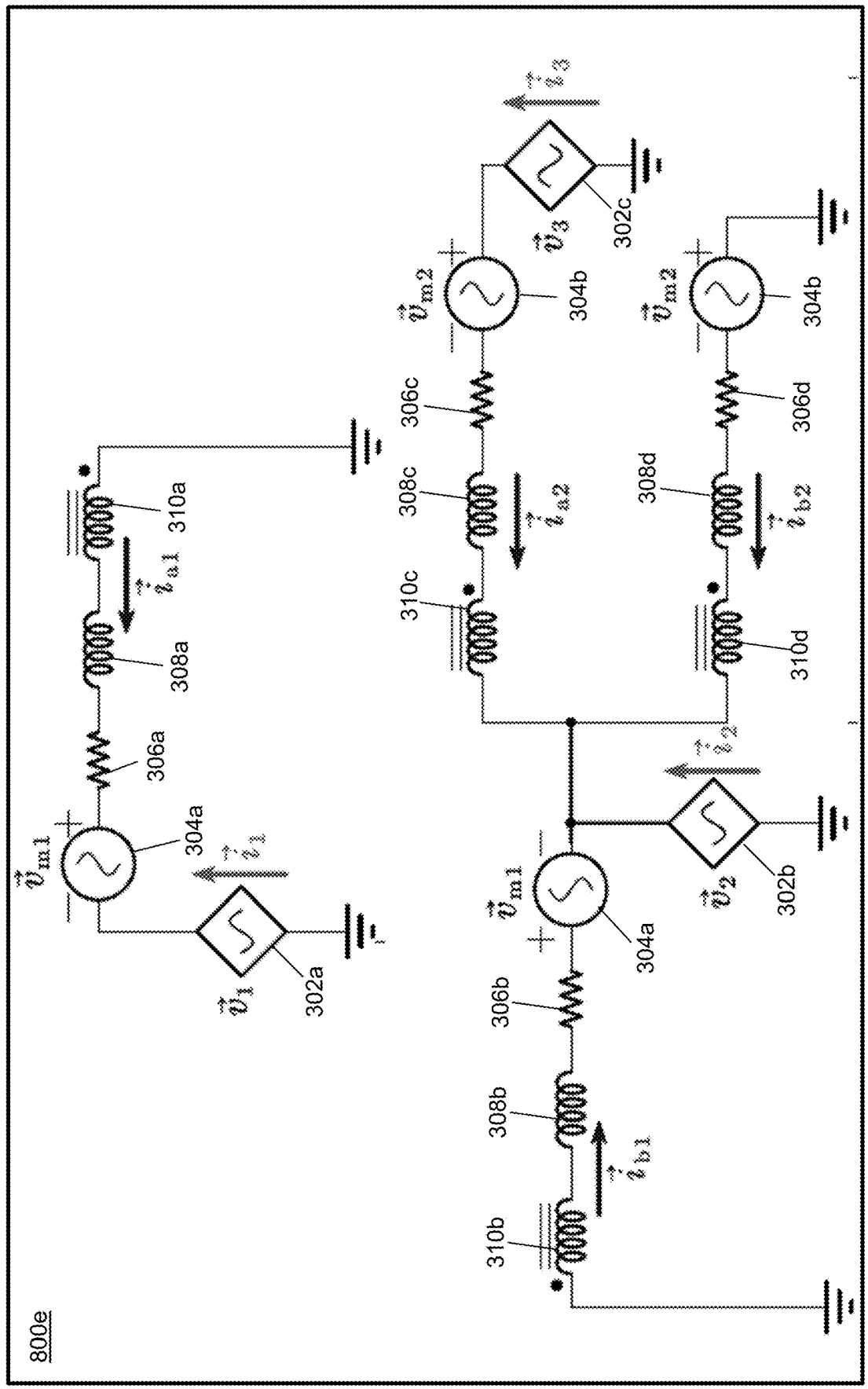

Referring to FIG. 8E, a seventh space-vector diagram 800e is shown for seventh stator winding connection 400g in accordance with an illustrative embodiment. For seventh stator winding connection 400g, $$T_c = \begin{bmatrix} -1 & 0 & 0 \\ 0 & -1/2 & -1/2 \\ 0 & 0 & 1 \\ 0 & -1/2 & -1/2 \end{bmatrix}$$

$$\vec{i}_{a1} = \frac{1}{4}\vec{i}_t - \frac{3}{2}\vec{i}_{s,1} + \frac{1}{2}\vec{i}_{s,2}, \vec{i}_{b1} = \frac{1}{4}\vec{i}_t + \frac{1}{2}\vec{i}_{s,1} + \frac{1}{2}\vec{i}_{s,2},$$

$$\vec{i}_{a2} = \frac{1}{4}\vec{i}_t + \frac{1}{2}\vec{i}_{s,1} - \frac{3}{2}\vec{i}_{s,2},$$

$$\vec{i}_{b2} = \frac{1}{4}\vec{i}_t + \frac{1}{2}\vec{i}_{s,1} + \frac{1}{2}\vec{i}_{s,2}$$

$$\vec{i}_1 = -\frac{1}{4}\vec{i}_t + \frac{3}{2}\vec{i}_{s,1} - \frac{1}{2}\vec{i}_{s,2}, \vec{i}_2 = -\frac{3}{4}\vec{i}_t - \frac{3}{2}\vec{i}_{s,1} + \frac{1}{2}\vec{i}_{s,2},$$

$$\vec{i}_3 = \frac{1}{4}\vec{i}_t + \frac{1}{2}\vec{i}_{s,1} - \frac{3}{2}\vec{i}_{s,2}$$

Figure 4H:
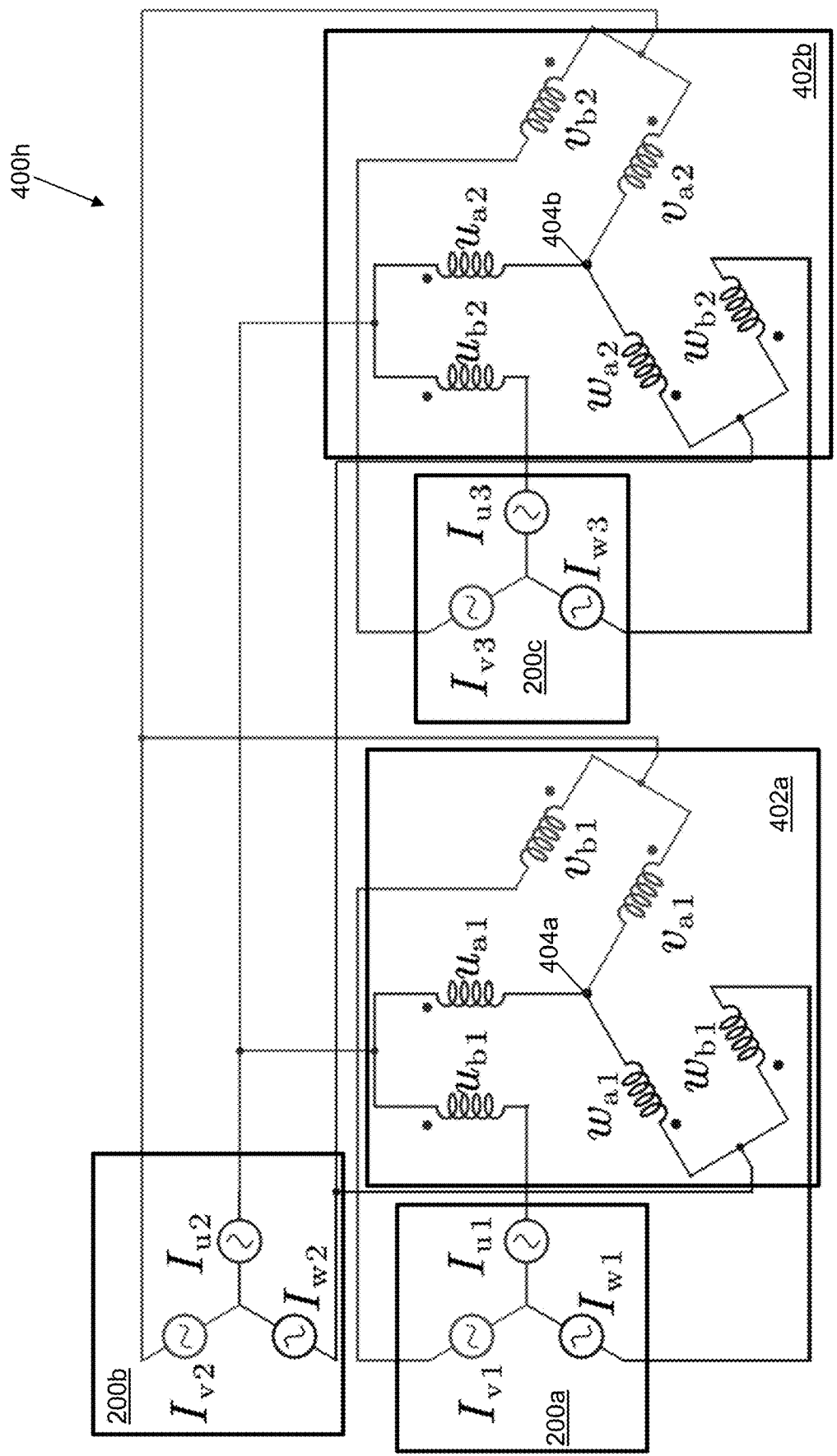

Referring to FIG. 4H, an eighth stator winding connection 400h is shown that includes first stator winding 402a and second stator winding 402b. First stator winding 402a connects $u_{a1}$, $u_{b1}$, $v_{a1}$, $v_{b1}$, and $w_{a1}$, $w_{b1}$ between first inverter 200a and second inverter 200b. Second stator winding 402b connects $u_{a2}$, $u_{b2}$, $v_{a2}$, $v_{b2}$, and $w_{a2}$, $w_{b2}$ between third inverter 200c and the respective phase windings of first stator winding 402a. Eighth stator winding connection 400h is an example of seventh coil group structure 708g.

In first stator winding 402a, the negative terminal of first machine, second winding is connected to the respective phase terminal of first inverter 200a and the positive terminal of first machine, second winding is connected to the positive terminal of first machine, first winding. The positive terminal of first machine, first winding is connected to first neutral connector 404a. The positive terminal of first machine, first winding and of first machine, second winding is also connected to the respective phase terminal of second inverter 200b. In second stator winding 402b, the negative terminal of second machine, second winding is connected to a respective phase terminal of third inverter 200c and the positive terminal of second machine, second winding is connected to the positive terminal of second machine, first winding. The negative terminal of second machine, first winding is connected to second neutral connector 404b. The positive terminal of second machine, first winding and of second machine, second winding is also connected to the respective phase terminal of second inverter 200b.

Figure 8F:
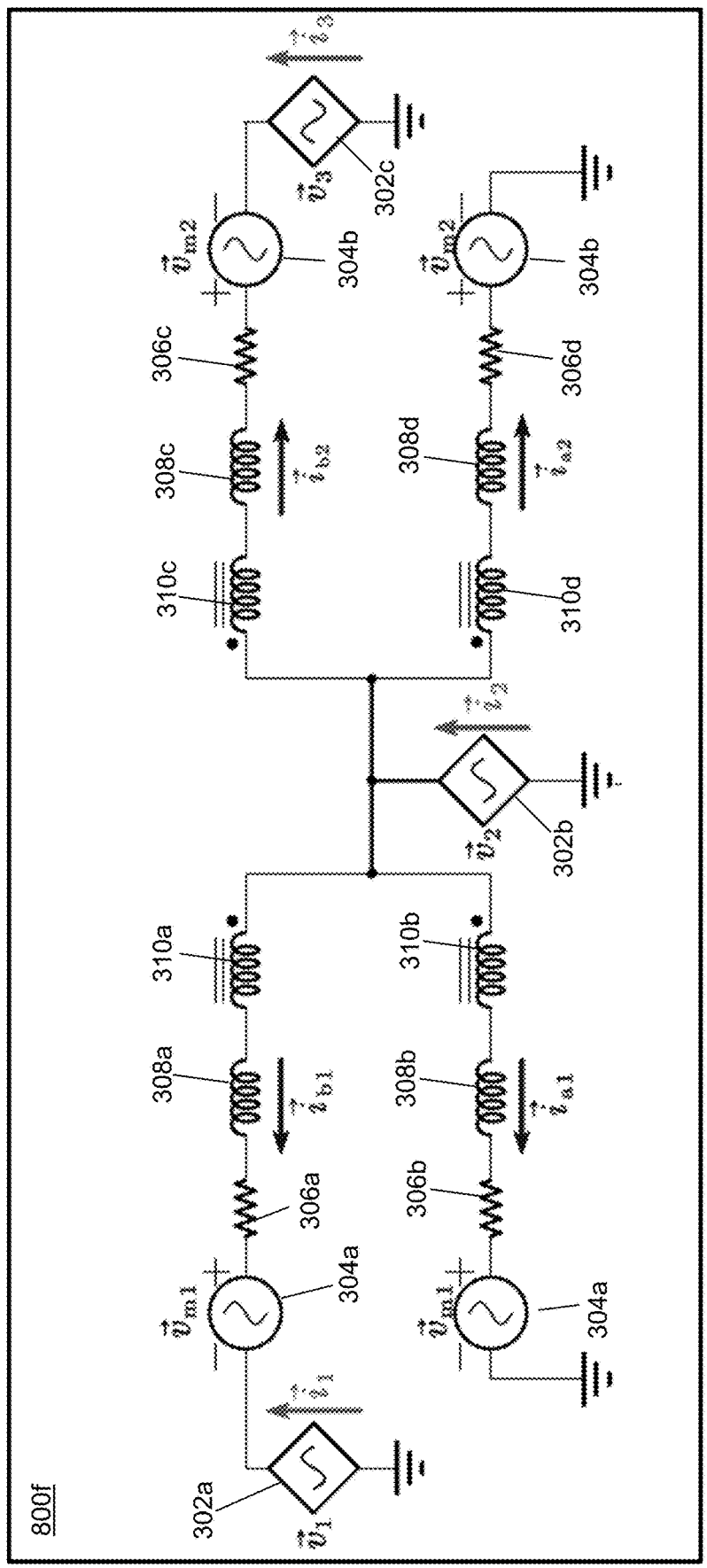

Referring to FIG. 8F, an eighth space-vector diagram 800f is shown for eighth stator winding connection 400h in accordance with an illustrative embodiment. For eighth stator winding connection 400h, $$T_c = \begin{bmatrix} 1/2 & 1/2 & 1/2 \\ -1 & 0 & 0 \\ 1/2 & 1/2 & 1/2 \\ 0 & 0 & -1 \end{bmatrix}$$

$$\vec{i}_{a1} = \frac{1}{4}\vec{i}_t - \frac{1}{2}\vec{i}_{s,1} - \frac{1}{2}\vec{i}_{s,2}, \vec{i}_{b1} = \frac{1}{4}\vec{i}_t + \frac{3}{2}\vec{i}_{s,1} - \frac{1}{2}\vec{i}_{s,2},$$

$$\vec{i}_{a2} = \frac{1}{4}\vec{i}_t - \frac{1}{2}\vec{i}_{s,1} - \frac{1}{2}\vec{i}_{s,2},$$

$$\vec{i}_{b2} = \frac{1}{4}\vec{i}_t - \frac{1}{2}\vec{i}_{s,1} + \frac{3}{2}\vec{i}_{s,2}$$

$$\vec{i}_1 = -\frac{1}{4}\vec{i}_t - \frac{3}{2}\vec{i}_{s,1} + \frac{1}{2}\vec{i}_{s,2}, \vec{i}_2 = \vec{i}_t, \vec{i}_3 = -\frac{1}{4}\vec{i}_t + \frac{1}{2}\vec{i}_{s,1} - \frac{3}{2}\vec{i}_{s,2}$$

Figure 4I:
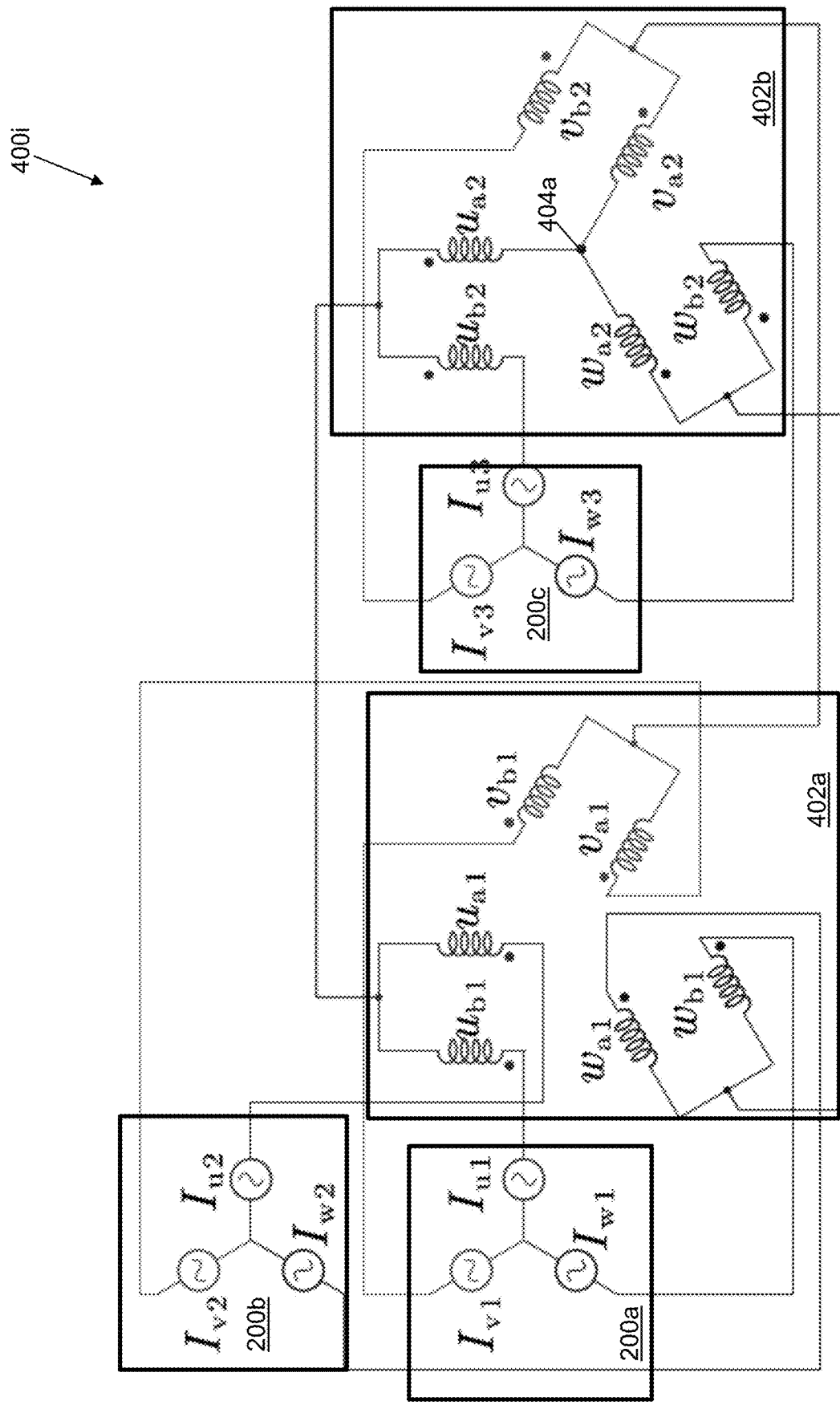

Referring to FIG. 4I, a ninth stator winding connection 400i is shown that includes first stator winding 402a and second stator winding 402b. First stator winding 402a connects $u_{a1}$, $u_{b1}$, $v_{a1}$, $v_{b1}$, and $w_{a1}$, $w_{b1}$ between first inverter 200a and second inverter 200b. Second stator winding 402b connects $u_{a2}$, $u_{b2}$, $v_{a2}$, $v_{b2}$, and $w_{a2}$, $w_{b2}$ between third inverter 200c and the respective phase windings of first stator winding 402a. Ninth stator winding connection 400i is a second example of seventh coil group structure 708g.

In first stator winding 402a, the positive terminal of first machine, second winding is connected to the respective phase terminal of first inverter 200a and the negative terminal of first machine, second winding is connected to the negative terminal of first machine, first winding. The positive terminal of first machine, first winding is connected to the respective phase terminal of second inverter 200b. The negative terminal of first machine, first winding and of first machine, second winding is also connected to a positive terminal of second machine, first winding and of second machine, second winding. In second stator winding 402b, the negative terminal of second machine, second winding is connected to a respective phase terminal of third inverter 200c and the positive terminal of second machine, second winding. The negative terminal of second machine, first winding is connected to first neutral connector 404a.

For ninth stator winding connection 400i, $$T_c = \begin{bmatrix} 0 & 1 & 0 \\ 1 & 0 & 0 \\ 1 & 1 & 1 \\ 0 & 0 & -1 \end{bmatrix}$$

$$\vec{i}_{a1} = \frac{1}{4}\vec{i}_t - \vec{i}_{s,1}, \vec{i}_{b1} = \frac{1}{4}\vec{i}_t + \vec{i}_{s,1}, \vec{i}_{a2} = \frac{1}{4}\vec{i}_t - \vec{i}_{s,2}, \vec{i}_{b2} = \frac{1}{4}\vec{i}_t + \vec{i}_{s,2}$$

$$\vec{i}_1 = \frac{1}{4}\vec{i}_t + \vec{i}_{s,1}, \vec{i}_2 = \frac{1}{4}\vec{i}_t - \vec{i}_{s,1}, \vec{i}_3 = -\frac{1}{4}\vec{i}_t - \vec{i}_{s,2}$$

Figure 4J:
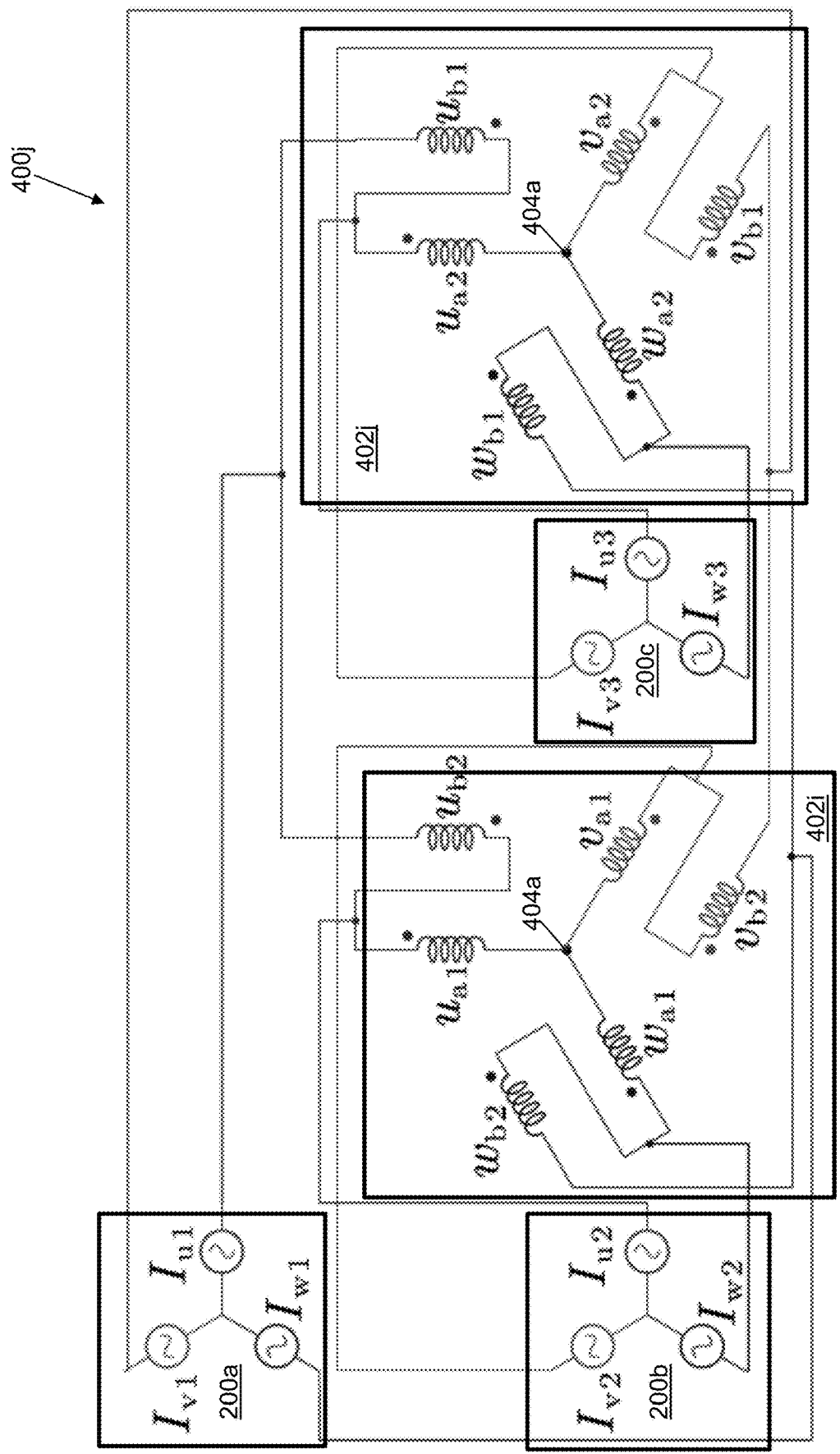

Referring to FIG. 4J, a tenth stator winding connection 400j is shown that includes first stator winding 402i and sixth stator winding 402j. Fifth stator winding 402i connects $u_{a1}$, $u_{b2}$, $v_{a1}$, $v_{b2}$, and $w_{a1}$, $w_{b2}$ between first inverter 200a and second inverter 200b. Sixth stator winding 402j connects $u_{a2}$, $u_{b1}$, $v_{a2}$, $v_{b1}$, and $w_{a2}$, $w_{b1}$ between third inverter 200c and the respective phase windings of fifth stator winding 402i. Tenth stator winding connection 400i is a third example of first coil group structure 708a.

In first stator winding 402i, the negative terminal of second machine, second winding is connected to a respective phase terminal of first inverter 200a and the positive terminal of second machine, second winding is connected to the positive terminal of first machine, first winding and to a respective phase terminal of second inverter 200b. The negative terminal of first machine, first winding is connected to first neutral connector 404a. The negative terminal of second machine, second winding is also connected to a negative terminal of first machine, second winding. In second stator winding 402b, the positive terminal of first machine, second winding is connected to a respective phase terminal of third inverter 200c and to the positive terminal of second machine, first winding. The negative terminal of second machine, first winding is connected to second neutral connector 404b.

For tenth stator winding connection 400j, $$T_c = \begin{bmatrix} 1/2 & 3/4 & 1/4 \\ -1/2 & -1/4 & 1/4 \\ 1/2 & 1/4 & 3/4 \\ -1/2 & 1/4 & -1/4 \end{bmatrix}$$

$$\vec{i}_{a1} = \frac{1}{4}\vec{i}_t - \vec{i}_{s,1}, \vec{i}_{b1} = \frac{1}{4}\vec{i}_t + \vec{i}_{s,1}, \vec{i}_{a2} = \frac{1}{4}\vec{i}_t - \vec{i}_{s,2}, \vec{i}_{b2} = \frac{1}{4}\vec{i}_t + \vec{i}_{s,2}$$

$$\vec{i}_1 = -\frac{1}{2}\vec{i}_t - \vec{i}_{s,1} - \vec{i}_{s,2}, \vec{i}_2 = \frac{1}{2}\vec{i}_t - \vec{i}_{s,1} + \vec{i}_{s,2}, \vec{i}_3 = \frac{1}{2}\vec{i}_t + \vec{i}_{s,1} - \vec{i}_{s,2}$$

Figure 6D:
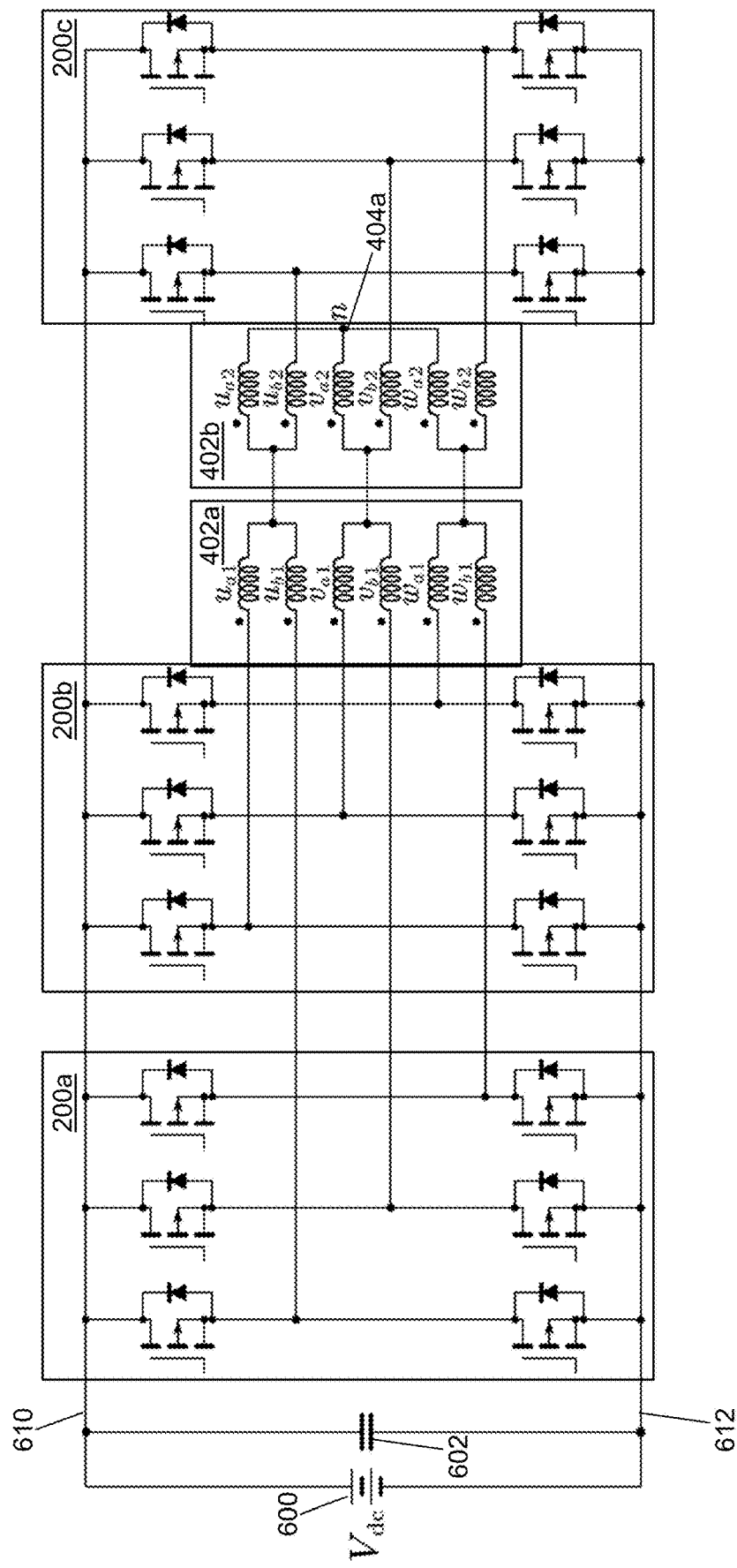
FIG. 6D depicts a circuit diagram for the winding configuration of FIG. 4I in accordance with an illustrative embodiment.

Referring to FIG. 6D, a circuit diagram is shown for ninth stator winding connection 400i in accordance with an illustrative embodiment. Ninth stator winding connection 400i includes machine voltage source 600 connected across capacitor 602, first inverter 200a, second inverter 200b, and third inverter 200a between first line 610 and second line 612. First stator winding 402a connects $u_{a1}$, $u_{b1}$, $v_{a1}$, $v_{b1}$, and $w_{a1}$, $w_{b1}$ between first inverter 200a and second inverter 200b. Second stator winding 402b connects $u_{a2}$, $u_{b2}$, $v_{a2}$, $v_{b2}$, and $w_{a2}$, $w_{b2}$ between third inverter 200c and first stator winding 402a and first neutral connector 404a.

Figure 9:
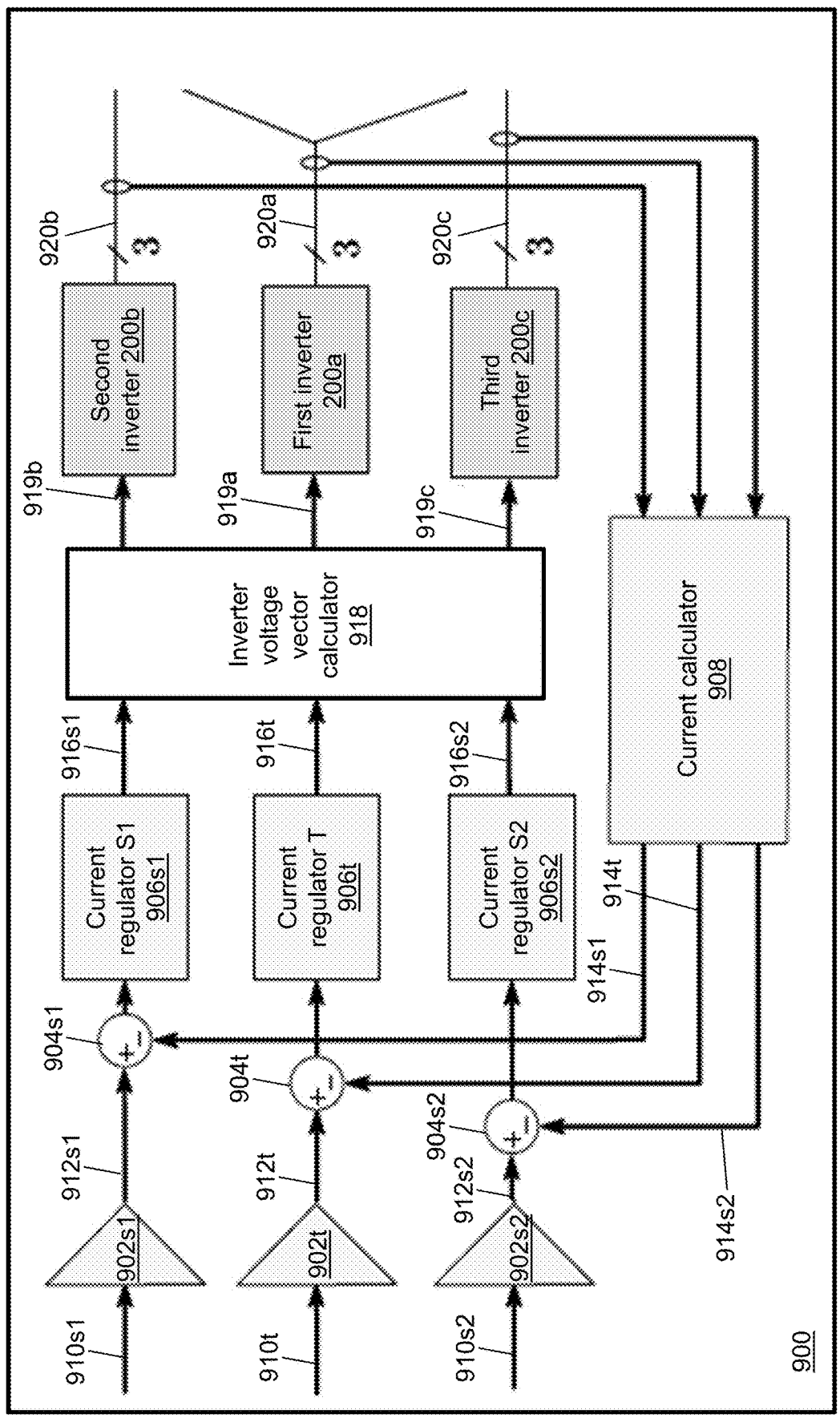
FIG. 9 depicts a block diagram of a control architecture for a drive with three inverters for the twin bearingless machine system of FIG. 1 in accordance with an illustrative embodiment.

Referring to FIG. 9, a block diagram is shown of a control architecture for a drive 900 with first inverter 200a, second inverter 200b, and third inverter 200c for twin bearingless machine system 100 with any of the coil group structures. A torque command 910t, a first suspension force command 910s1, and a second suspension force command 910s2 are provided by outer-loop speed and position regulators (not shown). Torque command 910t is input to a torque multiplier 902t, $1/k_t$ to output a torque current $\vec{i}_t^*$ 912t. First suspension force command 910s1 is input to a first suspension multiplier 902s1, $1/k_s$ to output a first suspension current $\vec{i}_{s1}^*$ 912s1. Second suspension force command 910s2 is input to a second suspension multiplier 902s2, $1/k_s$ to output a second suspension current $\vec{i}_{s2}^*$ 912s2.

Torque current $\vec{i}_t^*$ 912t is summed with a negative of a calculated torque current $\vec{i}_t$ 914t using a torque summer 904t and the summed current is input to a current regulator T 906t. First suspension force current $\vec{i}_{s1}^*$ 912s1 is summed with a negative of a calculated first suspension force current $\vec{i}_{s1}$ 914s1 using a first suspension force summer 904s1 and the summed current is input to a current regulator S1 906s1.

Second suspension force current $\vec{i}_{s2}^*$ 912s2 is summed with a negative of a calculated second suspension force current $\vec{i}_{s2}$ 914s2 using a second suspension force summer 904s2 and the summed current is input to a current regulator S2 906s2.

A torque voltage $\vec{v}_t^*$ 916t is output from current regulator T 906t and input to inverter voltage vector calculator 918 based on the coil group structure. A first suspension force voltage $\vec{v}_{s1}^*$ 916s1 is output from current regulator S1 906s1 and input to inverter voltage vector calculator 918 based on the coil group structure. A second suspension force voltage $\vec{v}_{s2}^*$ 916s2 is output from current regulator S2 906s2 and input to inverter voltage vector calculator 918 based on the coil group structure.

A first inverter voltage $\vec{v}_1^*$ 919a is output from inverter voltage vector calculator 918 and provides the first voltage source 302a to first inverter 200a. A second inverter voltage $\vec{v}_2^*$ 919b is output from inverter voltage vector calculator 918 and provides the second voltage source 302b to second inverter 200b. A third inverter voltage $\vec{v}_3^*$ 919c is output from inverter voltage vector calculator 918 and provides the third voltage source 302c to third inverter 200c.

A first inverter current $\vec{i}_1$ 920a is output from first inverter 200a and provided to first bearingless machine 200a and second bearingless machine 200b and input to current calculator 908. A second inverter current $\vec{i}_2$ 920b is output from second inverter 200b and provided to first bearingless machine 200a and input to current calculator 908. A third inverter current $\vec{i}_3$ 920c is output from third inverter 200c and provided to second bearingless machine 200b and input to current calculator 908.

Control current commands are obtained using $\vec{T}=T_d+j\tau=\overline{k}_t\vec{i}_t$, and $\vec{F}=F_x+jF_y=\overline{k}_f\vec{i}_s$ and provided to each respective current regulator to determine the torque and suspension voltages, $\vec{v}_t^*, \vec{v}_{s1}^*, \vec{v}_{s2}^*$. Inverter voltage vector calculator 918 converts the control voltages to inverter voltage commands using the appropriate relationship for each coil group structure. The inverter currents, $\vec{i}_1, \vec{i}_2, \vec{i}_3$ and position of shaft 102 are measured for control feedback, with current calculator 908 converting these measurements to control variables using equations (1) and (2) above.

Differential equations governing the inverter voltage and current space vectors can be derived from a respective space vector diagram. For example, the differential equations below are defined for second space-vector diagram 500 and have been simplified by introducing control voltage space vectors $\vec{v}_t, \vec{v}_{s1}, \vec{v}_{s2}$ that each depend upon only a single control current and are a linear combination of the inverter terminal voltages, $\vec{v}_1, \vec{v}_2, \vec{v}_3$.

$$\vec{v}_t = \vec{v}_1 - 2\vec{v}_m = \frac{R}{2}\vec{i}_t + \frac{L+M}{2}\frac{d}{dt}\vec{i}_t$$

$$\vec{v}_{s1} = \frac{1}{2}\vec{v}_1 - \vec{v}_2 = R\vec{i}_{s1} + (L-M)\frac{d}{dt}\vec{i}_{s1}$$

$$\vec{v}_{s2} = \frac{1}{2}\vec{v}_1 - \vec{v}_3 = R\vec{i}_{s2} + (L-M)\frac{d}{dt}\vec{i}_{s2}$$

As another example, the differential equations below are defined for ninth stator winding connection 400i.

$$\vec{v}_t = \vec{v}_1 + \vec{v}_2 - \vec{v}_3 - 4\vec{v}_m = R\vec{i}_t + (L+M)\frac{d}{dt}\vec{i}_t$$

$$\vec{v}_{s1} = \frac{\vec{v}_1 - \vec{v}_2}{2} = R\vec{i}_{s1} + (L-M)\frac{d}{dt}\vec{i}_{s1}$$

$$\vec{v}_{s2} = -\frac{\vec{v}_3}{2} = R\vec{i}_{s2} + (L-M)\frac{d}{dt}\vec{i}_{s2}$$

Each of these expressions are conveniently in the form of an equivalent RL load $$\vec{V} = R_{eq}\vec{i} + L_{eq}\frac{d}{dt}\vec{i}.$$

The design of current regulation for this class of load is a well-studied problem, with solutions including synchronous frame proportional-integral (PI) regulators and a complex vector current regulator.

Figure 10:
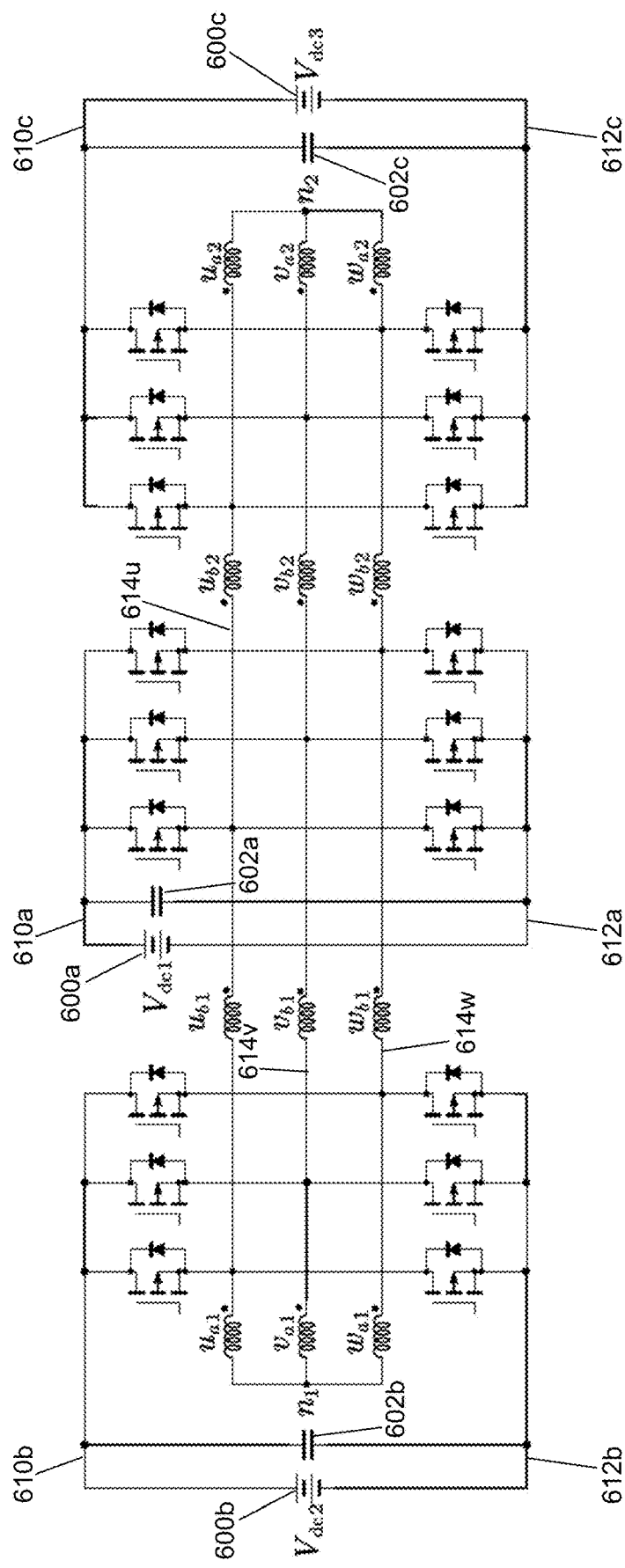
FIG. 10 depicts a circuit diagram for the winding configuration of FIG. 4A with three isolated direct current voltage sources in accordance with an illustrative embodiment.

Referring to FIG. 10, a circuit diagram is shown for first stator winding connection 400a with three direct current voltage sources in accordance with an illustrative embodiment. A first machine voltage source 600a is connected across a first capacitor 602a, and first inverter 200a between a first, first line 610a and a first, second line 612a. A second machine voltage source 600b is connected across a second capacitor 602b, and second inverter 200b between a second, first line 610b and a second, second line 612b. A third machine voltage source 600c is connected across a third capacitor 602c, and third inverter 200c between a third, first line 610c and a third, second line 612c. Each of first inverter 200a, second inverter 200b, and third inverter 200c has their own isolated DC voltage source. While the shared DC voltage approach, for example, of FIG. 6A has the obvious advantage of requiring only a single DC voltage source (reduces cost), this comes with several drawbacks. The shared DC source makes it possible for zero-sequence (or "circulating") currents to flow between the inverters, which can lead to excessive losses in the machine. For this reason, the implementation of FIG. 6A may use zero-sequence current regulation for two of the three inverters (and thereby three current sensors, instead of two current sensors, for these inverters). This also limits the use of modulation techniques to those that have a constant common mode voltage, preventing use of the space vector modulation (SVM) technique meaning that each inverter is only able to utilize half of the DC source voltage (as opposed to $$\frac{1}{\sqrt{3}}V_{DC}$$

for SVM).

When each inverter has its own DC voltage source as in FIG. 10, there is no path for zero-sequence currents to flow. As a result, SVM can be used to increase the DC bus voltage utilization. Furthermore, by employing independent DC voltages, the system is more adaptable in terms of selecting alternative DC voltage sources and switches with different voltage ratings, thereby lowering system costs. In high back-EMF machines, this can be particularly advantageous for second inverter 200b and third inverter 200c, which are exposed to half the back-EMF of first inverter 200a. In addition to these two configurations, an intermediate option is also possible where two inverters share a DC source while a third inverter does not. A particularly compelling option for this drive is to have second inverter 200b and third inverter 200c share a DC link, since these inverters are exposed to the same magnitude of back-EMF and presumably have a very low power requirement as they only provide suspension current. Further improvements are possible, such as providing the shared DC link of second inverter 200b and third inverter 200c with a floating capacitor, where power is drawn through the machine windings.

Experiment results were generated based on the circuit represented by second space-vector diagram 500 and were compared to the standard twin parallel DPNV structure. The results show that the circuit represented by second space-vector diagram 500 can actuate the same torque and suspension force as the standard twin parallel DPNV structure. The hardware setup consisted of 1) a drive composed of standard three-phase inverters with SiC MOSFETs switched at 100 kilohertz; 2) a 4× three-phase resistor-inductive load in place of a bearingless motor so that force and torque commands can be issued without concern for dynamics introduced by the shaft position controller; and 3) L=1.5 millihenries (mH), M=0 mH, R=1 ohm. Discrete time complex vector current regulators (CVCRs) were implemented.

Referring to FIG. 14A, torque currents generated using the circuit represented by second space-vector diagram 500 are shown in accordance with an illustrative embodiment. A first curve 1400 shows $i_t^{*q}$, a second curve 1402 shows $i_t^{*d}$, a third curve 1404 shows $i_t^d$, and a fourth curve 1406 shows $i_t^q$.

Referring to FIG. 14B, first suspension force currents generated using the circuit represented by second space-vector diagram 500 are shown in accordance with an illustrative embodiment. A first curve 1410 shows $i_{s1}^{*d}$, a second curve 1412 shows $i_{s1}^{*q}$, a third curve 1414 shows $i_{s1}^d$, and a fourth curve 1416 shows $i_{s1}^q$.

Figure 14C:
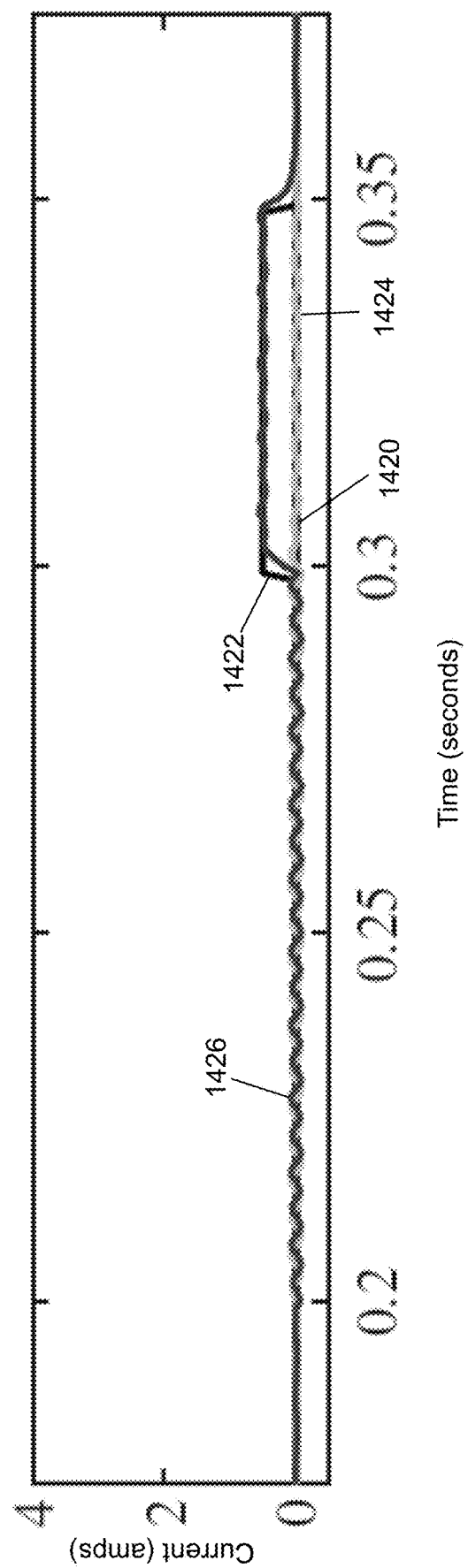
FIG. 14C shows second suspension force currents generated using the winding configuration of FIG. 4A in accordance with an illustrative embodiment.

Referring to FIG. 14C, second suspension force currents generated using the circuit represented by second space-vector diagram 500 are shown in accordance with an illustrative embodiment. A first curve 1420 shows $i_{s2}^{*d}$, a second curve 1422 shows $i_{s2}^{*q}$, a third curve 1424 shows $i_{s2}^d$, and a fourth curve 1426 shows $i_{s2}^q$. The results of FIGS. 14A-14C demonstrate that the circuit represented by second space-vector diagram 500 independently actuates torque and suspension force for the twin bearingless machine with first order responses when PI-based CVCRs are used.

Referring to FIG. 15A, phase currents generated using the circuit represented by second space-vector diagram 500 are shown in accordance with an illustrative embodiment. A first curve 1500 shows $i_{ua1}$, a second curve 1502 shows $i_{ub1}$. Referring to FIG. 15B, output inverter currents generated using the circuit represented by second space-vector diagram 500 are shown in accordance with an illustrative embodiment. A third curve 1504 shows $i_{u1}$, a fourth curve 1506 shows $i_{u2}$, and a fifth curve 1508 shows $i_{u3}$.

Referring to FIG. 15C, phase currents generated the standard twin parallel DPNV structure are shown in accordance with an illustrative embodiment. A first curve 1510 shows $i_{ua1}$, a second curve 1512 shows $i_{ub1}$. Referring to FIG. 15D, output inverter currents generated using the standard twin parallel DPNV structure are shown in accordance with an illustrative embodiment. A third curve 1514 shows $i_{u1}$, a fourth curve 1516 shows $i_{u2}$, a fifth curve 1518 shows $i_{u3}$, and a sixth curve 1520 shows $i_{u4}$.

FIGS. 15A-15D present oscilloscope measurements of current in the coil group 1 ($I_{a1}$ and $I_{b1}$) and in the u-phase terminal of inverters $I_{un}$, n=1, 2, 3, 4. By commanding identical torque and suspension current references, both implementations drive identical machine phase currents (identical actuation of the machine is achieved), but different inverter terminal currents as inverters are connected in different manners. Therefore, the experimental results prove that the circuit represented by second space-vector diagram 500 is capable of actuating a machine with identical torque and suspension forces independently as it is driven by a twin parallel DPNV configuration.

Power electronic implementation concepts for any of the coil group structures summarized in FIGS. 7A-7G reduce the number of current sensors required by two to six (depending on the implementation) as compared to the conventional four inverter drive without sacrificing the ability to independently actuate torque and suspension force. By reducing the bearingless machine system complexity and cost, twin bearingless machine system 100 has the potential to enable magnetic levitation to disrupt the large landscape of cost sensitive industrial applications, such as HVAC compressors and wastewater aeration equipment.

As used herein, the term "mount" includes join, unite, connect, couple, associate, insert, hang, hold, affix, attach, fasten, bind, paste, secure, hinge, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element) unless specified otherwise. Elements referenced as mounted to each other herein may further be integrally formed together, for example, using a molding or thermoforming process as understood by a person of skill in the art. As a result, elements described herein as being mounted to each other need not be discrete structural elements unless specified otherwise. The elements may be mounted permanently, removably, or releasably unless specified otherwise.

Use of directional terms, such as top, bottom, right, left, front, back, upper, lower, horizontal, vertical, behind, etc. are merely intended to facilitate reference to the various surfaces of the described structures relative to the orientations introduced in the drawings and are not intended to be limiting in any manner unless otherwise indicated.

As used in this disclosure, the term "connect" includes join, unite, mount, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "connected on" and "connected to" include any interior or exterior portion of the element referenced. Elements referenced as connected to each other herein may further be integrally formed together. As a result, elements described herein as being connected to each other need not be discrete structural elements. The elements may be connected permanently, removably, or releasably.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A bearingless electrical machine system comprising:
a shaft;
a first rotor mounted to rotate with the shaft;
a first stator, wherein the first stator is mounted on a side of the first rotor separated by a first air gap between a surface of the first rotor and a surface of the first stator;
a second rotor mounted to rotate with the shaft;
a second stator, wherein the second stator is mounted on a side of the second rotor separated by a second air gap between a surface of the second rotor and a surface of the second stator;
a first, first-phase coil and a second, first-phase coil of a first stator winding wound about the first stator, wherein the first stator winding is configured to provide a torque and a suspension force relative to the shaft when current is provided to the first stator winding;
a first, second-phase coil and a second, second-phase coil of a second stator winding wound about the first stator, wherein the second stator winding is configured to provide the torque and the suspension force relative to the shaft when current is provided to the second stator winding;
a first, third-phase coil and a second, third-phase coil of a third stator winding wound about the first stator, wherein the third stator winding is configured to provide the torque and the suspension force relative to the shaft when current is provided to the third stator winding;
a first, first-phase coil and a second, first-phase coil of a fourth stator winding wound about the second stator, wherein the fourth stator winding is configured to provide the torque and the suspension force relative to the shaft when current is provided to the fourth stator winding;
a first, second-phase coil and a second, second-phase coil of a fifth stator winding wound about the second stator, wherein the fifth stator winding is configured to provide the torque and the suspension force relative to the shaft when current is provided to the fifth stator winding;
a first, third-phase coil and a second, third-phase coil of a sixth stator winding wound about the second stator, wherein the sixth stator winding is configured to provide the torque and the suspension force relative to the shaft when current is provided to the sixth stator winding; and
an inverter drive system consisting of only a first inverter, a second inverter, and a third inverter, wherein each inverter of the inverter drive system comprises a first connection for a first-phase, a second connection for a second-phase, and a third connection for a third-phase, wherein each first-phase coil is connected to the first connection of the first inverter, the second inverter, or the third inverter, wherein each second-phase coil is connected to the second connection of the first inverter, the second inverter, or the third inverter, wherein each third-phase coil is connected to the third connection of the first inverter, the second inverter, or the third inverter.

2. The bearingless electrical machine system of claim 1, wherein the first, first-phase coil of the first stator winding is connected in series with the second, first-phase coil of the first stator winding, with the first, first-phase coil of the fourth stator winding, and with the second, first-phase coil of the fourth stator winding.

3. The bearingless electrical machine system of claim 2, wherein the first inverter is connected between the first, first-phase coil of the first stator winding and the second, first-phase coil of the first stator winding, wherein the second inverter is connected between the second, first-phase coil of the first stator winding and the first, first-phase coil of the fourth stator winding, wherein the third inverter is connected between the first, first-phase coil of the fourth stator winding and the second, first-phase coil of the fourth stator winding.

4. The bearingless electrical machine system of claim 2, wherein the first inverter is connected to a first end of the first, first-phase coil of the first stator winding, wherein the second, first-phase coil of the first stator winding is connected to a second end of the first, first-phase coil of the first stator winding opposite the first end, wherein the second inverter is connected between the second, first-phase coil of the first stator winding and the first, first-phase coil of the fourth stator winding, wherein the third inverter is connected between the first, first-phase coil of the fourth stator winding and the second, first-phase coil of the fourth stator winding.

5. The bearingless electrical machine system of claim 2, wherein the first inverter is connected to a first end of the first, first-phase coil of the first stator winding, wherein the second inverter is connected between the first, first-phase coil of the first stator winding and the second, first-phase coil of the first stator winding, wherein the third inverter is connected between the second, first-phase coil of the first stator winding and the first, first-phase coil of the fourth stator winding, wherein the second, first-phase coil of the fourth stator winding is connected to the first, first-phase coil of the fourth stator winding opposite the third inverter.

6. The bearingless electrical machine system of claim 2, wherein the first inverter is connected to a first end of the first, first-phase coil of the first stator winding, wherein the second, first-phase coil of the first stator winding is connected to a second end of the first, first-phase coil of the first stator winding opposite the first end of the first, first-phase coil of the first stator winding, wherein the second inverter is connected between the second, first-phase coil of the first stator winding and the first, first-phase coil of the fourth stator winding, wherein the third inverter is connected to a first end of the second, first-phase coil of the fourth stator winding, wherein a second end of the second, first-phase coil of the fourth stator winding opposite the first end of the second, first-phase coil of the fourth stator winding is connected to the first, first-phase coil of the fourth stator winding opposite the second inverter.

7. The bearingless electrical machine system of claim 2, wherein the first, first-phase coil of the first stator winding is connected between the second, first-phase coil of the first stator winding and the first, first-phase coil of the fourth stator winding, and the second, first-phase coil of the fourth stator winding is connected to the second, first-phase coil of the first stator winding.

8. The bearingless electrical machine system of claim 1, wherein the first, first-phase coil of the first stator winding is connected in series with the second, first-phase coil of the first stator winding and with the first, first-phase coil of the fourth stator winding, wherein the second, first-phase coil of the fourth stator winding is islanded from the first, first-phase coil of the first stator winding, the second, first-phase coil of the first stator winding, and the first, first-phase coil of the fourth stator winding.

9. The bearingless electrical machine system of claim 7, wherein the first inverter is connected to the second, first-phase coil of the fourth stator winding, wherein the second inverter is connected between the first, first-phase coil of the first stator winding and the second, first-phase coil of the first stator winding, wherein the third inverter is connected between the second, first-phase coil of the first stator winding and the first, first-phase coil of the fourth stator winding.

10. The bearingless electrical machine system of claim 7, wherein the first inverter is connected to the second, first-phase coil of the fourth stator winding, wherein the second inverter is connected to a first end of the first, first-phase coil of the first stator winding, wherein a second end of the first, first-phase coil of the first stator winding opposite the first end of the first, first-phase coil of the first stator winding is connected to a first end of the second, first-phase coil of the first stator winding, wherein the third inverter is connected between a second end of the second, first-phase coil of the first stator winding opposite the first end of the second, first-phase coil of the first stator winding and the first, first-phase coil of the fourth stator winding.

11. The bearingless electrical machine system of claim 7, wherein the first inverter is connected to the second, first-phase coil of the fourth stator winding, wherein the second inverter is connected between a first end of the second, first-phase coil of the first stator winding and a first end of the first, first-phase coil of the fourth stator winding, wherein a second end of the second, first-phase coil of the first stator winding opposite the first end of the second, first-phase coil of the first stator winding is connected to the first, first-phase coil of the first stator winding, wherein the third inverter is connected to a second end of the first, first-phase coil of the fourth stator winding opposite the first end of the first, first-phase coil of the fourth stator winding.

12. The bearingless electrical machine system of claim 7, wherein the first, first-phase coil of the first stator winding is connected between the second, first-phase coil of the first stator winding and the first, first-phase coil of the fourth stator winding.

13. The bearingless electrical machine system of claim 1, wherein the first, first-phase coil of the first stator winding is connected in series with the second, first-phase coil of the first stator winding and the first, first-phase coil of the fourth stator winding is connected in series with the second, first-phase coil of the fourth stator winding, wherein the first, first-phase coil of the first stator winding and the second, first-phase coil of the first stator winding are islanded from the first, first-phase coil of the fourth stator winding and the second, first-phase coil of the fourth stator winding.

14. The bearingless electrical machine system of claim 13, wherein the first inverter is connected to the first, first-phase coil of the first stator winding, wherein the second inverter is connected to the first, first-phase coil of the fourth stator winding, wherein the third inverter is connected to the second, first-phase coil of the fourth stator winding.

15. The bearingless electrical machine system of claim 1, wherein the first, first-phase coil of the first stator winding is connected in series with the first, first-phase coil of the fourth stator winding and the second, first-phase coil of the first stator winding is connected in series with the second, first-phase coil of the fourth stator winding, wherein the first, first-phase coil of the first stator winding and the first, first-phase coil of the fourth stator winding are islanded from the second, first-phase coil of the first stator winding and the second, first-phase coil of the fourth stator winding.

16. The bearingless electrical machine system of claim 1, wherein the first, first-phase coil of the first stator winding is connected in series with the second, first-phase coil of the first stator winding, wherein the first, first-phase coil of the fourth stator winding is islanded from the first, first-phase coil of the first stator winding, the second, first-phase coil of the first stator winding, and the second, first-phase coil of the fourth stator winding, wherein the second, first-phase coil of the fourth stator winding is islanded from the first, first-phase coil of the first stator winding, the second, first-phase coil of the first stator winding, and the first, first-phase coil of the fourth stator winding.

17. The bearingless electrical machine system of claim 16, wherein the first inverter is connected to the first, first-phase coil of the fourth stator winding, wherein the second inverter is connected to the second, first-phase coil of the fourth stator winding, wherein the third inverter is connected to the first, first-phase coil of the first stator winding or the second, first-phase coil of the first stator winding.

18. The bearingless electrical machine system of claim 1, wherein the first, first-phase coil of the first stator winding is connected in series with the second, first-phase coil of the first stator winding and with the first, first-phase coil of the fourth stator winding, wherein the second, first-phase coil of the first stator winding is connected in series with the second, first-phase coil of the fourth stator winding.

19. The bearingless electrical machine system of claim 1, wherein the first, first-phase coil of the first stator winding is connected in series with the second, first-phase coil of the first stator winding, wherein the first, first-phase coil of the first stator winding is connected in series with the first, first-phase coil of the fourth stator winding, wherein the second, first-phase coil of the fourth stator winding is islanded from the first, first-phase coil of the first stator winding, the second, first-phase coil of the first stator winding, and the first, first-phase coil of the fourth stator winding.

20. The bearingless electrical machine system of claim 1, wherein the first, first-phase coil of the first stator winding is connected in series with the second, first-phase coil of the first stator winding, wherein the first, first-phase coil of the fourth stator winding and the second, first-phase coil of the fourth stator winding are connected to a node between the first, first-phase coil of the first stator winding and the second, first-phase coil of the first stator winding.

* * * * *